US012631861B2

(12) United States Patent
Bangolae et al.

(10) Patent No.: US 12,631,861 B2
(45) Date of Patent: May 19, 2026

(54) LIGHT REDIRECTING PRISM, A REDIRECTING PRISMATIC WALL AND A SOLAR PANEL INCORPORATING THE SAME

(71) Applicants:Balaji Lakshmikanth Bangolae, Bangalore (IN); Lakshmi Santhanam, Bangalore (IN); Deepika Gopal, Bangalore (IN); Pradeep Jayaram Kattemalalavadi, Mysore (IN); Sidharth Janardhana Kshirsagar, Bangalore (IN); Bikash Musib, Bangalore (IN)

(72) Inventors: Balaji Lakshmikanth Bangolae, Bangalore (IN); Lakshmi Santhanam, Bangalore (IN); Deepika Gopal, Bangalore (IN); Pradeep Jayaram Kattemalalavadi, Mysore (IN); Sidharth Janardhana Kshirsagar, Bangalore (IN); Bikash Musib, Bangalore (IN)

( * ) Notice: Subject to any disclaimer, the term of this patent is extended or adjusted under 35 U.S.C. 154(b) by 461 days.

(21) Appl. No.: 17/917,892

(22) PCT Filed: Apr. 9, 2021

(86) PCT No.: PCT/IB2021/052953
§ 371 (c)(1),
(2) Date: Oct. 7, 2022

(87) PCT Pub. No.: WO2021/205390
PCT Pub. Date: Oct. 14, 2021

(65) Prior Publication Data
US 2023/0144992 A1     May 11, 2023

(30) Foreign Application Priority Data

Apr. 9, 2020    (IN) ............................. 202041015548
Apr. 14, 2020   (IN) ............................. 202041016181
(Continued)

(51) Int. Cl.
*G02B 19/00*      (2006.01)
*G02B 5/04*       (2006.01)
*H02S 40/22*      (2014.01)

(52) U.S. Cl.
CPC ......... *G02B 19/0042* (2013.01); *G02B 5/045* (2013.01); *G02B 19/0028* (2013.01); *H02S 40/22* (2014.12)

(58) Field of Classification Search
CPC ................ G02B 19/0042; G02B 5/045; G02B 19/0028; G02B 17/006; H02S 40/22;
(Continued)

(56) References Cited

U.S. PATENT DOCUMENTS 4,091,798 A    5/1978  Fletcher et al.
4,120,565 A   10/1978  Rabl et al.
(Continued)

FOREIGN PATENT DOCUMENTS

CA        2564835    *  4/2008
CA        2564835 A1 *  4/2008    .............. F24S 23/10
(Continued)

*Primary Examiner* — Tony Ko
*Assistant Examiner* — Mai Thi Ngoc Tran
(74) *Attorney, Agent, or Firm* — Sand, Sebolt & Wernow Co., LPA

(57)              ABSTRACT
The present disclosure relates to light redirecting elements in solar energy absorption systems and envisages a light redirecting prism, a redirecting prismatic wall and a solar panel incorporating the same. The light redirecting prism has three elongate surfaces. The incident surface receives incident parallel rays of light. The redirecting surface performs total
(Continued)

internal reflection of the light travelling from the incident surface through a predetermined range of angles and thus redirect the light. The transmitting surface transmits the redirected light at a predetermined angle out of the prism and directs the light towards a solar energy absorbing device. Further, a redirecting prismatic wall can be constructed to comprise redirecting prisms. The light redirecting prism or redirecting prismatic wall can be used in solar panels for enhancing quantum of light incident on the PV cell of the panel.

3 Claims, 52 Drawing Sheets

(30)          Foreign Application Priority Data

| | | | |
|---|---|---|---|
| Apr. 24, 2020 | (IN) | ............................. | 202041017713 |
| May 22, 2020 | (IN) | ............................. | 202041021540 |
| Sep. 13, 2020 | (IN) | ............................. | 202041039558 |

(58)  Field of Classification Search
CPC . H10F 77/42; F24S 2023/83; F24S 2023/874; F24S 23/10; F24S 23/70; Y02E 10/40; Y02E 10/52

See application file for complete search history.

(56)          References Cited

U.S. PATENT DOCUMENTS

| | | | |
|---|---|---|---|
| 4,154,219 A | 5/1979 | Gupta et al. | |
| 6,958,868 B1 | 10/2005 | Pender | |
| 7,873,257 B2 | 1/2011 | Morgan | |
| 9,768,725 B2 | 9/2017 | Meyer | |
| 10,205,041 B2 | 2/2019 | O'Neill et al. | |
| 2007/0125415 A1 | 6/2007 | Sachs | |
| 2017/0104121 A1 | 4/2017 | O'Neill et al. | |
| 2019/0326462 A1* | 10/2019 | Gao ..................... | G02B 5/0284 |
| 2020/0328717 A1* | 10/2020 | Nakamura .............. | F24S 20/63 |

FOREIGN PATENT DOCUMENTS

| | | |
|---|---|---|
| WO | 2015104028 | 7/2015 |
| WO | 2016077252 | 5/2016 |
| WO | 2019131087 | 7/2019 |

* cited by examiner

FIGURE 5

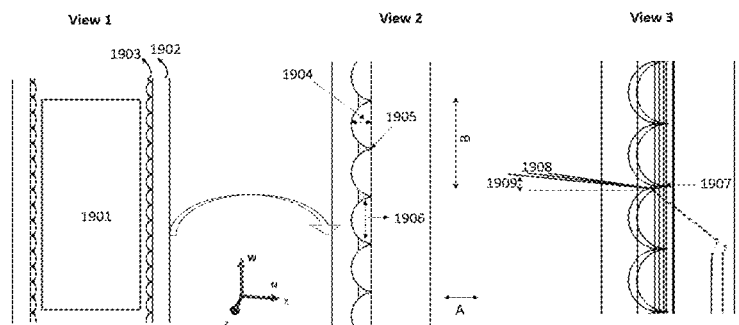
FIGURE 19A                    FIGURE 19B                    FIGURE 19C

FIGURE 21B                                        FIGURE 21C

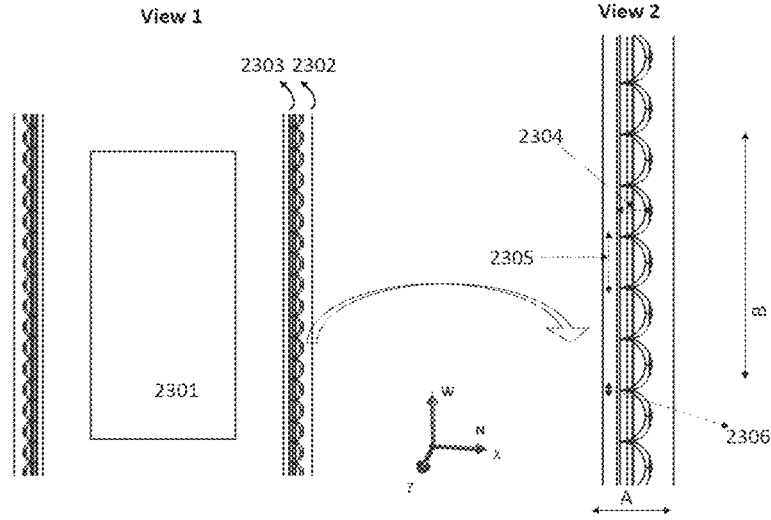
FIGURE 23A                              FIGURE 23B

3603

3639

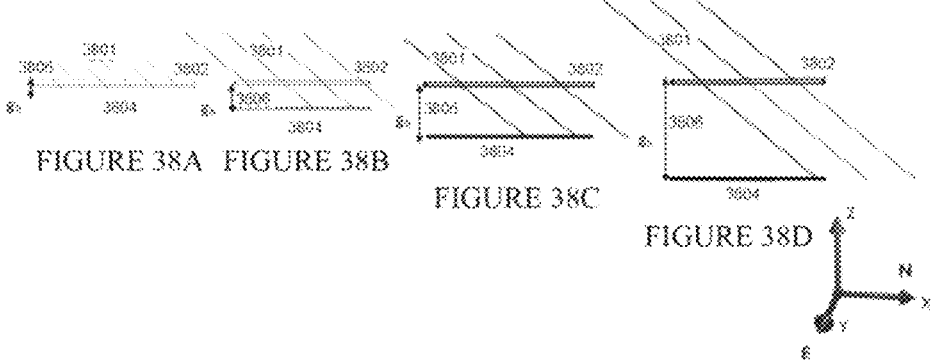
FIGURE 38A   FIGURE 38B
FIGURE 38C
FIGURE 38D
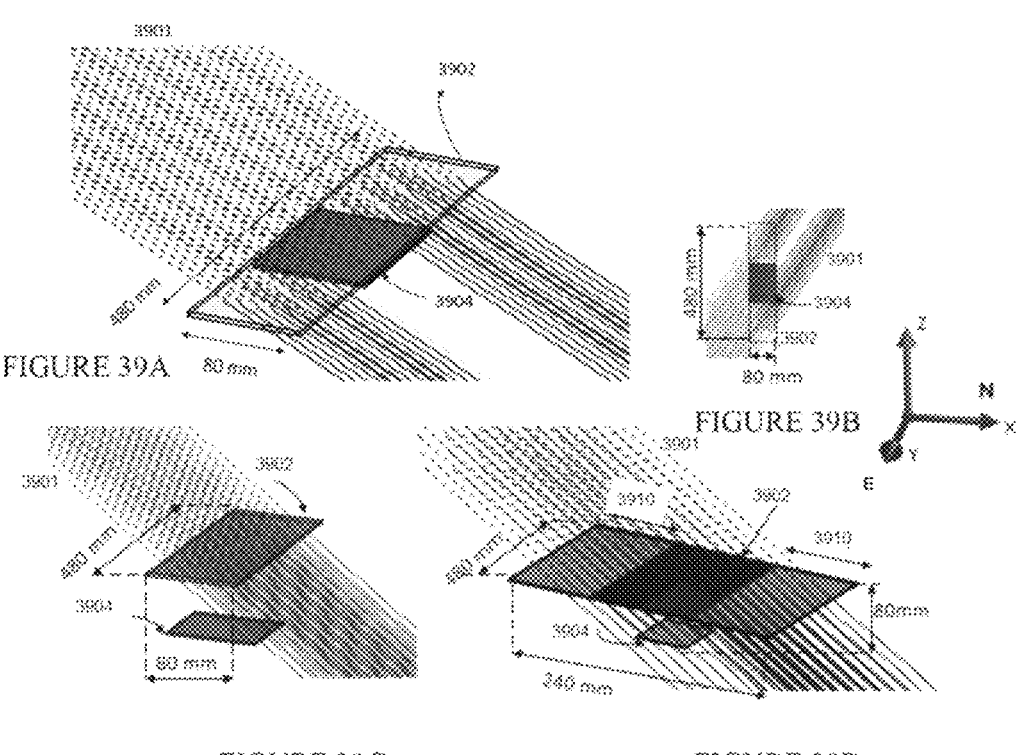
FIGURE 39A
FIGURE 39B
FIGURE 39C
FIGURE 39D Voltage Voltage

LIGHT REDIRECTING PRISM, A REDIRECTING PRISMATIC WALL AND A SOLAR PANEL INCORPORATING THE SAME

RELATED APPLICATIONS

The present specification is a cognate of the provisional specification filed under the following Indian Patent applications:

Application No. 202041015548, entitled 'A Motionless Optical Unit for Redirecting Sunlight, System and Method Thereof', filed on Apr. 9, 2020;

Application No. 202041016181, entitled 'Efficient Management of Various Losses in a Solar Energy Application' filed on Apr. 14, 2020;

Application No. 202041017713, entitled 'Light Deflector Wall assembly, and Method of Making the Same filed on Apr. 24, 2020;

Application No. 202041021540, entitled 'Optimal Surface Topography of a Light Deflector Wall Assembly in a Solar Energy (filed on May 22, 2020); and Application No. 2020041039558, entitled 'Efficient Model for Light Deflector Wall Assembly for Thermal Dissipation in a Solar Energy Application', filed on Sep. 13, 2020.

FIELD

The present disclosure relates to light redirecting elements in solar energy absorption systems.

BACKGROUND

The background information herein below relates to the present disclosure but is not necessarily prior art.

The large magnitude of solar energy available makes it a highly appealing source of energy. Solar energy is radiant light and heat from the Sun that is harnessed using a range of ever-evolving technologies such as solar heating photovoltaics, solar thermal energy, solar architecture, molten salt power plants and artificial photosynthesis.

The use of photovoltaic systems concentrated solar power and solar water heating to harness the energy are some examples of active solar techniques. Passive solar techniques include orienting sunlight inside a building, selecting materials with favorable thermal mass or light-dispersing properties, and designing spaces that naturally circulate air.

Ways to boost the efficiency of solar panels include geometric patterns on solar glass, bi-directional reflectance function (BDRF) based mirror boosters, single axis photovoltaic trackers all of which improve efficiency of conventional solar photovoltaic panel. In the space of concentrated photovoltaic also many prior arts exist that improves module efficiency with motionless tracking and total internal reflection based light trapping.

U.S. Pat. No. 9,257,580B2 discloses a monolithic transparent plate including, on at least one of its faces, at least one region textured by a plurality of geometric features in relief relative to a general plane of the face, each feature having a cross section, parallel to the general plane, which diminishes with distance from the face, from a base to a peak of the feature. The area of the zones of the textured region for which the inclination angle relative to the general plane is less than 30° C. represents less than 35% of the total area of the textured region. However, the prismatic structures may work for a small range of angle of incidence—0° to 40° of sunlight and hence may provide limited improvement over a plain solar glass. The process of making grooves may also add an additional manufacturing cost.

US 2007/0125415 discloses a crystalline silicon PV module typically use tinned flat copper wire to increase the conductivity of a bus bar metallization and to interconnect to adjacent cells. Such a flat bus wire may be patterned with shallow 'V' shaped grooves using metal forming techniques, such as rolling, stamping and drawing. The grooves are designed so that incident light is reflected up toward the glass superstrate of the module at an internal interface angle that is large enough (typically greater than about 40°) so that the light undergoes total internal reflection at the glass-air interface and is reflected onto the photovoltaic cell. However, the prismatic structure on the bus-wires may cast a marginal shadow on the photovoltaic cell and affect the efficiency improvement. Also, the technique would require expensive micro machining of the grooves on the solar bus bars.

WO2015104028A3 discloses a means of transmitting sunlight downward into a narrow alleys and streets, by using a day-lighting guiding acrylic panel that is capable of changing the direction and distribution of the incident light. The core of the proposed daylight guidance system is made up of light transmission panels that have sine wave shaped cross-section so that the panel functions as an optical diffusor perpendicular to the optical axis. However, the prismatic structures are optimized for certain Solar altitude range adopting specific conditions and the same design may not hold good for any geographic location.

US20170104121A1 discloses a light redirecting film defining a longitudinal axis, and including a base layer, an ordered arrangement of a plurality of microstructures, and a reflective layer. The microstructures project from the base layer, and each extends across the base layer to define a corresponding primary axis. The primary axis of at least one of the microstructures is oblique with respect to the longitudinal axis. The reflective layer is disposed over the microstructures opposite the base layer. However, the light redirection film is susceptible to UV radiation and the performance degrades over time and does not last for the lifetime of the panel.

U.S. Pat. No. 9,768,725B2 discloses a PV module comprising a conductive back sheet, a substantially transparent front plate, a plurality of PV cells, a plurality of conductive spacers, and a power conversion device. The PV cells can be disposed between the conductive back sheet and the front plate and can be arranged in a plurality of rows. The PV cells within each row can be connected to each other in parallel and the rows can be connected in series. The PV cells can be interconnected between the conductive spacers. The power conversion device can be redundantly connected to the PV cells via a last conductive spacer connected to a last row. However, the design may require a special micro inverter that can handle varying conversion rates.

U.S. Pat. No. 6,958,868B1 discloses an integrated solar concentrator and tracker is constructed from a beam deflector for unpolarized light in combination with a fixed optical condenser. The one-dimensional beam deflector consists of a pair of prism arrays made from a material whose refractive index can be varied by applying an electric field. Two of the one-dimensional concentrators can be arranged with their faces in contact and with their prism arrays perpendicular to construct a two-dimensional beam deflector. However, the design may involve considerable operational overhead in ensuring that electromagnetic field is applied in a manner in accordance with the movement of the sun across the sky.

This may make the module expensive to maintain over a period of time. Further, the prismatic design may improve the performance of PV panel only for 105 days on either side of the summer solstice.

U.S. Pat. No. 7,873,257B2 discloses a solar energy system that uses a light-guide solar panel (LGSP) to trap light inside a dielectric or other transparent panel and propagates the light to one of the panel edges for harvesting by a solar energy collector such as a photovoltaic cell. However, the design may be applicable for concentrated PV in which photovoltaic cells are expensive. Also, the lifetime of PMMA lens is only 8-10 years and it degrades due to UV exposure under the sun.

WO2016077252A1 discloses electronically reconfiguring the internal structure of a solid to allow precision control of the propagation of wave energy. The method allows digital or analog control of wave energy, such as but not limited to visible light, while maintaining low losses, a multi-octave bandwidth, polarization independence, large area and a large dynamic range in power handling. However, the design may be applicable for concentrated photovoltaic in which photovoltaic cells are expensive. The cost economics of the design is effective only for large-scale utility deployments due to the optical fluid and motors/controllers involved to move the liquid in a timely manner. These additional accessories also have limited warranty of 5-8 years only.

In order to overcome the problem of moving components being used to track sun, solutions are provided that may use Concentrated Photovoltaic for motion free based light redirection using Total Internal Reflection (TIR). These solutions work by concentrating the energy in one dimension to a line-like focus or point focus for solar thermal applications. Among such systems are those shown in U.S. Pat. Nos. 4,120,565A, 4,091,798, 4,154,219A. All these systems may use plurality of triangular prism surfaces to enable TIR and to reflect light from the sun onto a region to be heated, such as a fluid-filled conduit. However, these designs are valid for solar thermal application and the TIR based design involve heavy optical elements. Also, the acceptance range of TIR angles is limited for 10-20 degrees of incidence angle and the arrangement requires at least 2-3 physical adjustments throughout the year.

Therefore, there is a need of light redirection system and/or method that allows for a wide range of operation, is cost effective, has minimum human intervention requirements over seasonal variation and requires minimal maintenance.

OBJECTS

Some of the objects of the present disclosure, which at least one embodiment herein satisfies, are as follows:

It is an object of the present disclosure to ameliorate one or more problems of the prior art or to at least provide a useful alternative.

An object of present disclosure is to provide a light redirection system and/or method.

Another object of the present disclosure is to provide a light redirection system and/or method that allows for a wide range of operation.

Yet another object of this invention is to provide a light redirection system and/or method that is cost effective.

Still another object of this invention is to provide a light redirection system and/or method that has minimum human intervention requirements for seasonal variation.

Still another object of this invention is to provide a light redirection system and/or method that requires minimal maintenance.

Other objects and advantages of the present disclosure will be more apparent from the following description, which is not intended to limit the scope of the present disclosure.

SUMMARY

The present disclosure envisages a light redirecting prism. The light redirecting prism has at least three elongate surfaces including an incident surface, a redirecting surface and a transmitting surface. The incident surface is configured to receive incident parallel rays of light. The redirecting surface is configured to perform total internal reflection of the light travelling from the incident surface for a predetermined range of angles and thus redirect the light. A first angle is defined between the incident surface and the transmitting surface. The transmitting surface is configured to transmit the redirected light at a predetermined angle out of the prism and to direct the light towards a solar energy absorbing device. A second angle defined between the incident surface and the redirecting surface, thus defining a third angle defined between the redirecting surface and the transmitting surface.

Preferably, the first angle is in the range of 80°-110°, and is preferably 100°, and the second angle is in the range of 45°-55° and is preferably 49°.

In a preferred embodiment, the prism has a truncated bottom for facilitating mounting of the prism on a base and for providing mechanical stability.

According to an aspect of the present disclosure, the redirecting prism has a secondary redirecting profile on the transmitting surface. The secondary redirecting profile comprises at least one ridge or serration whose edge lies in a horizontal plane. The secondary redirecting profile spans at least a lower part of the transmitting surface and extends up to an operative lower edge of the redirecting surface. The secondary redirecting profile is provided along the horizontal length of the transmitting surface, and is configured to redirect towards the adjacent solar energy absorbing device, that component of the redirected rays which would get transmitted in a shadow region of the prism or transmitted back in the air or transmitted within the prism boundary, in the absence of the secondary redirecting profile, the shadow region being that region below the redirecting prism between the lower edge of the transmitting surface of the prism and the corresponding solar energy absorbing device. Preferably, the secondary redirecting profile comprises a plurality of parallel ridges or serrations. Preferably, the secondary redirecting profile comprises a plurality of reedings or flutings having a plurality of semi-cylindrical protrusions or depressions respectively, with axes of said protrusions or said depressions parallel to the transmitting surface of said prism.

According to another aspect of the present disclosure, the redirecting prism has a concentrating profile on the transmitting surface. The concentrating profile spans at least an upper part of the transmitting surface and extends up to an operative upper edge of the transmitting surface. In an embodiment, the concentrating profile comprises operatively vertical flutings. In another embodiment, the concentrating profile comprises operatively vertical reedings.

In an alternative embodiment, the redirecting prism has a secondary redirecting profile on the redirecting surface comprising at least one ridge or serration whose edge lies in a horizontal plane. The secondary redirecting profile spans at least a lower part of the redirecting surface and extends up to an operative lower edge of the redirecting surface. In an embodiment, the secondary redirecting profile spans over the entire redirecting surface. The secondary redirecting profile is provided along the length of the redirecting surface and is configured to redirect towards the adjacent solar energy absorbing device, that component of the redirected rays which would get transmitted in a shadow region of the prism in the absence of the secondary redirecting profile or transmitted back in the air or transmitted within the prism boundary. In an embodiment, the secondary redirecting profile comprising a plurality of parallel ridges or serrations. Preferably, the secondary redirecting profile comprises a plurality of reedings or flutings having a plurality of semicylindrical protrusions or depressions respectively, with axes of said protrusions or said depressions parallel to the transmitting surface of said prism.

In an alternative embodiment, the redirecting prism has a concentrating profile on the redirecting surface. The concentrating profile spans at least an upper part of the redirecting surface and extending upto an operative upper edge of the redirecting surface and is configured to concentrate redirected rays corresponding to the rays that are incident obliquely sideways on the incident surface. The concentrating profile comprises operatively vertical flutings or operatively vertical reedings.

According to yet another aspect, in an embodiment, the redirecting prism has a composite convex profile on the transmitting surface thereof, having a series of geometrical protruding profiles along the horizontal length thereof. Each of the geometrical profiles has a first curvature in an operative top portion and a second curvature in an operative bottom portion. The first curvature has an operative vertical axis of curvature parallel to the transmitting surface and is configured to concentrate redirected rays corresponding to the rays that are incident obliquely sideways on the incident surface. The second curvature has an operative horizontal axis of curvature perpendicular to the transmitting surface and is configured to redirect towards the adjacent solar energy absorbing device, that component of the redirected rays which would get transmitted in a shadow region of the prism or transmitted back in the air or transmitted within the prism boundary, in the absence of the second curvature.

The redirecting prism of the present disclosure is made of a material with refractive index of 1.51, the material being selected from the group consisting of polymethyl methacrylate, acrylic, styrene, polycarbonate, glass, styrene methyl methacrylate, polycarbonate, styrene, styrene acrylic copolymers or derivatives of these materials.

The present disclosure also envisages a redirecting prismatic wall, formed by vertically stacked, one on the top of another, any embodiment of the redirecting prism element as described hereinabove.

The configuration of adjacent prisms elements in said wall is defined to provide the edge corresponding to the third angle of one prism element in direct contact with the edge corresponding to the second angle of the other prism element. In another embodiment, adjacent elements in the wall are joined by means of a connecting element that connects the edge corresponding to the third angle of one prism element with the edge corresponding to the second angle of another prism element.

In an embodiment, the wall has a plurality of light redirecting prisms arranged in a flared in configuration, and the angle of flaring out per rising prism level is (x+ny)°, where 'n' is the level counted above the base level. In another embodiment, the wall has a plurality of light redirecting prisms arranged in a flared in configuration, and the angle of flaring in out per rising prism level (x−ny)°, where 'x' being the mounting angle of the prism whose input surface incident angle >0° and where 'n' is the level counted above from this prism level.

The present disclosure further envisages a solar panel having a base, at least one photovoltaic cell fixed on the base, and at least one redirecting prism fixed on the base and positioned adjacent to the photovoltaic cell. The redirecting prism is configured to redirect incident parallel rays of light towards the photovoltaic cell.

In a preferred embodiment, the solar panel has at least two redirecting prisms placed on the base besides opposite peripheral edges of the photovoltaic cell.

The redirecting prisms incorporated in the solar panel are according to any of the embodiments described hereinabove.

The solar panel may also incorporate redirecting prismatic walls described hereinabove.

The redirecting prism is fixed on the base to provide a mounting angle defined between the redirecting surface and the plane of said base. The mounting angle is in the range of 60° to 70°.

The redirecting prism is fixed on the base to provide an incident surface tilt angle between the incident surface and the plane of the base. The incident surface tilt angle is in the range of 15° to 22°.

Preferably, the solar panel is installed to have the redirecting prisms with the elongate surfaces along the east-west direction, with the misalignment from the east-west direction ranging from 0° to 30°.

Typically, in the northern hemisphere, the solar panel is installed with a southward tilt corresponding to the latitude of the location, and in the southern hemisphere, the solar panel is installed with a northward tilt corresponding to the latitude of the location.

In an embodiment, the solar panel is installed to have the redirecting prism with the elongate surfaces along the East-West direction with the misalignment ranging from 0° to 30° wherein the solar panel is with a predetermined tilt corresponding to the latitude in the range of 0° to 45°.

In another embodiment, the solar panel has pairs of redirecting prisms installed in a gabled formation with the elongate surfaces along the east-west direction, with one redirecting prism on north side and the other redirecting prism on the south side of the gabled formation, with the solar panel having a tilt towards the north-south direction determined by the latitude of the location.

The solar panel, in an embodiment, comprises a plurality of solar modules, each solar module comprising a row of photovoltaic cells and a pair of symmetrically mounted redirecting prisms in gabled formation fixed in the space between adjacent photovoltaic cells, wherein a plurality of solar modules is supported on a horizontal frame in an array formation.

Ratio of the width of the incident surface to the width of the redirecting surface is in the range of 1:1.1 to 1:2.

Ratio of the gap between the peripheral edge of photovoltaic cell closer to the redirecting prism and the vertex of the truncated redirecting prism base that is closer to the photovoltaic cell and is 0-15% of the width of a photovoltaic cell, and the gap is generally 10 mm wide.

In an embodiment, the photovoltaic cell of the present disclosure has a plurality of redirecting prism, wherein each of this redirecting prism is configured on the periphery of a photovoltaic cell array of the solar panel. The redirecting prism and the photovoltaic cell are enclosed inside a glass box that has a flat glass on the top and a glass wall that runs through the periphery of the solar panel, wherein one or more redirecting prisms are supported on the east-west sides of the glass box.

In a preferred embodiment, the photovoltaic cell of the present disclosure has a plurality of redirecting prisms, wherein each redirecting prism is configured on the periphery of a photovoltaic cell array of the solar panel and is mounted on either side of a photovoltaic cell array by means of a sealant or clamps and is configured to directly receive the incident sunlight and redirect towards the photovoltaic cell array.

BRIEF DESCRIPTION OF THE
ACCOMPANYING DRAWING

A light redirecting prism, a wall composed of a plurality of light redirecting prisms and a solar panel incorporating the light redirecting prism/wall, of the present disclosure, will now be described with the help of the accompanying drawing, in which:

FIG. 5 illustrates a side view of a redirecting prism of FIG. 4;

Figures 13A, 13B, 13C:
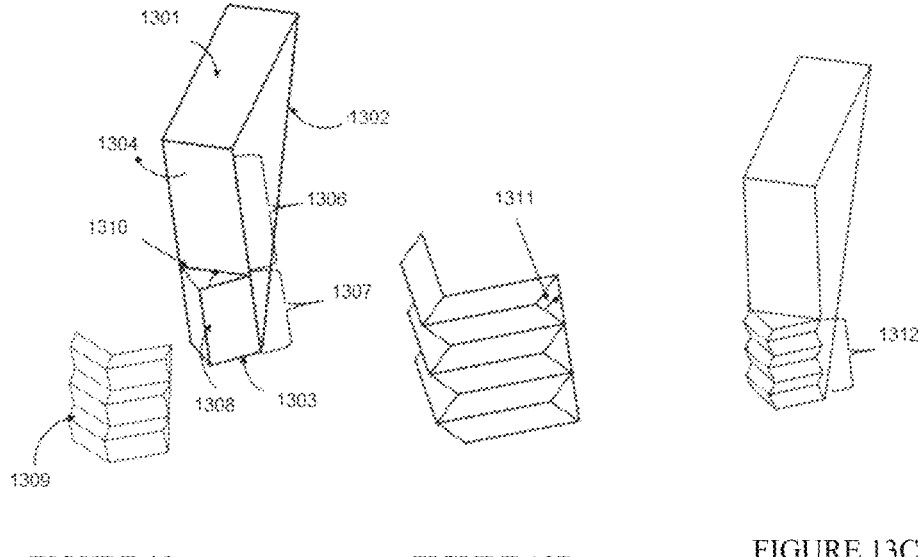
Figures 14A, 14B, 14C:
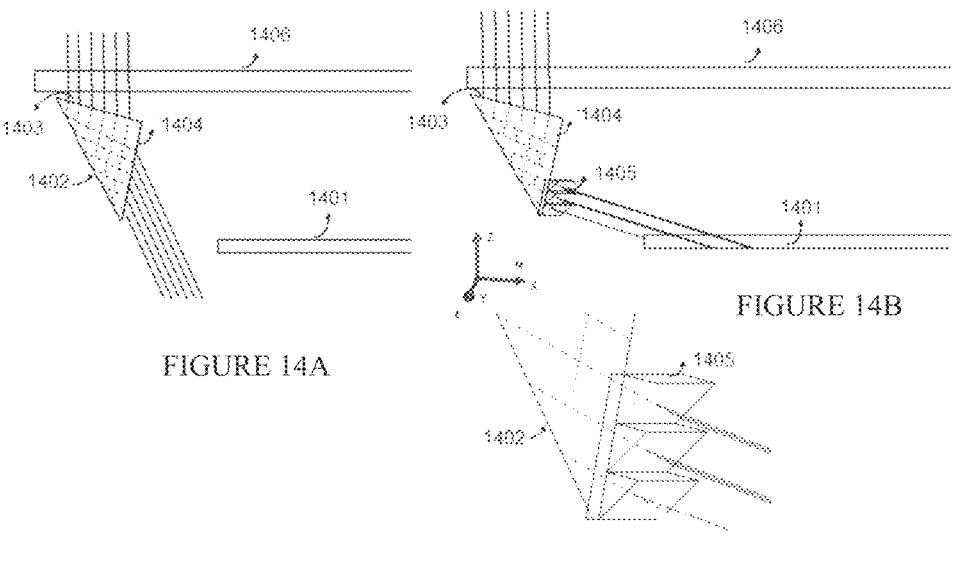

FIGS. 13A-C show the exploded view a light redirecting wall with a secondary redirecting profile consisting of three serrations or ridges present on the triangular protrusion as per an embodiment herein;

FIG. 14A shows the ray tracing of equinox in a front view of redirecting prismatic wall unit according to an embodi-

Figure 14D:
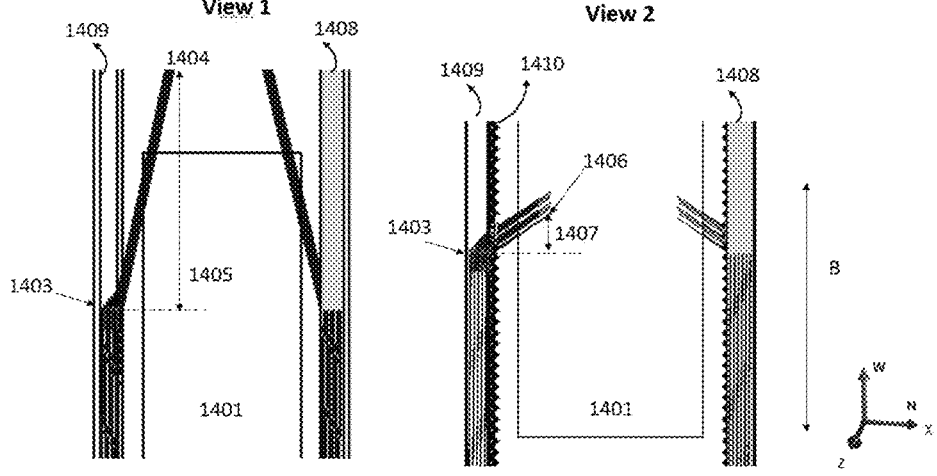
Figures 15A, 15B, 15C:
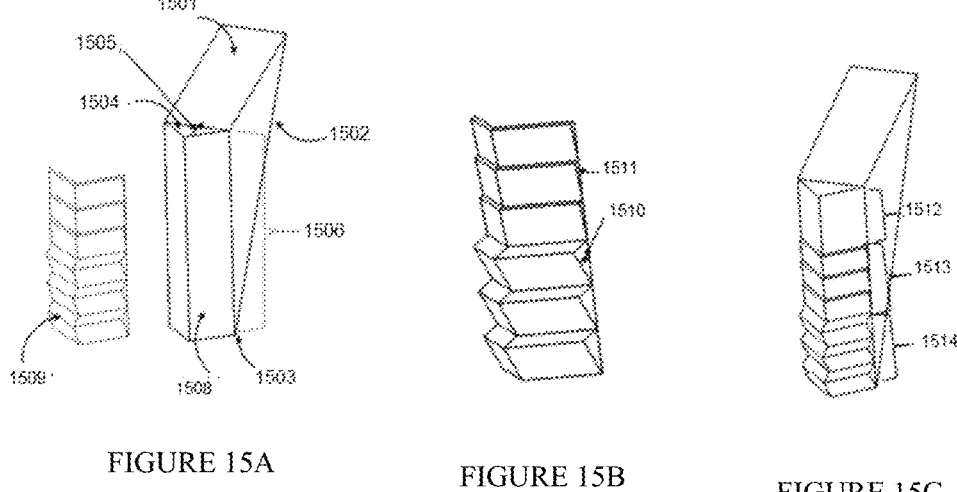
Figures 16A, 16B, 16C:
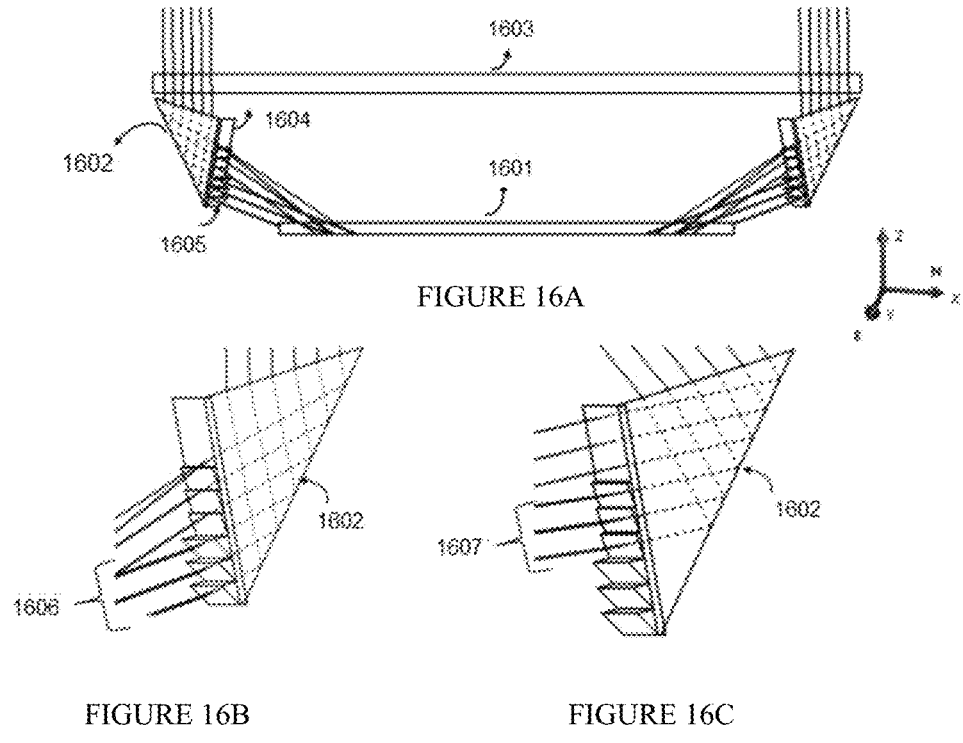
Figures 17A, 17B, 17C:
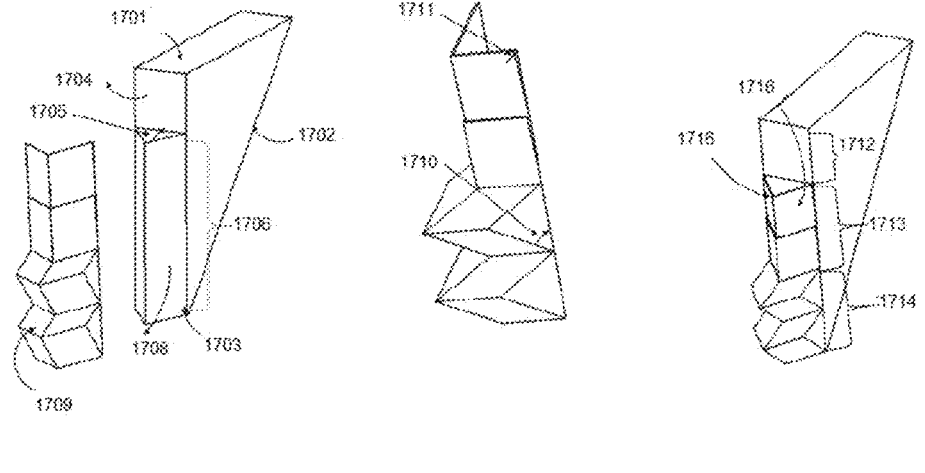
Figures 20A, 20B, 20C:
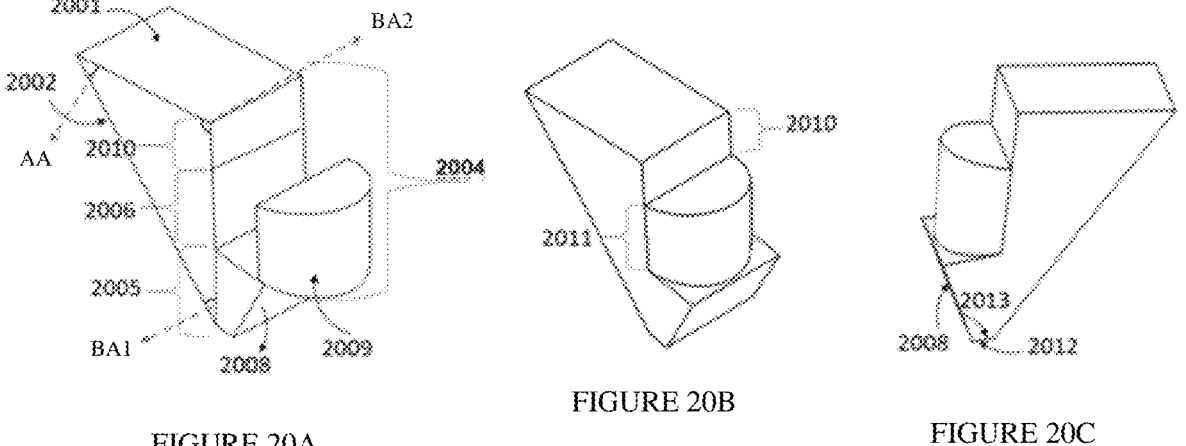
Figure 21A:
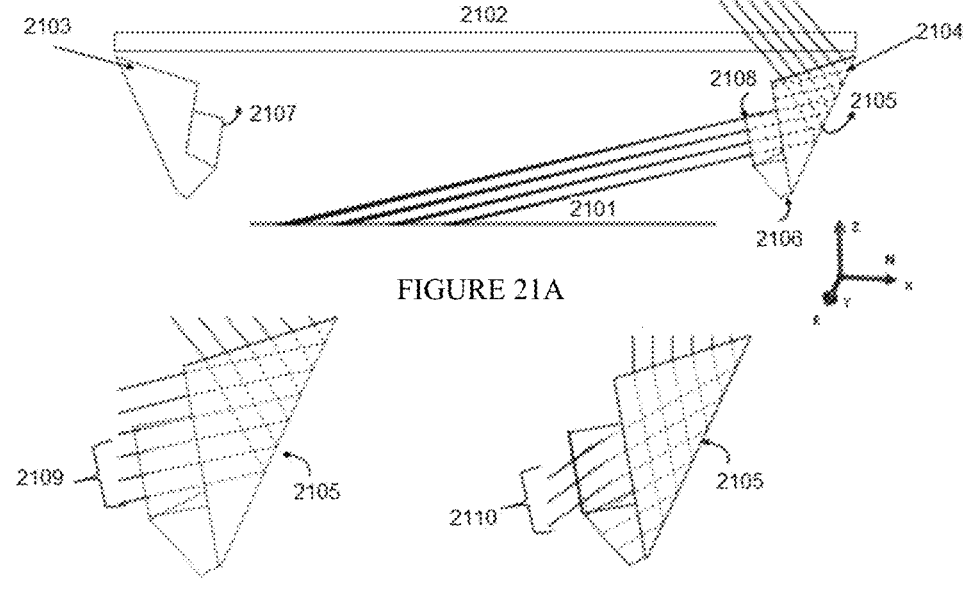
Figures 22A, 22B, 22C:
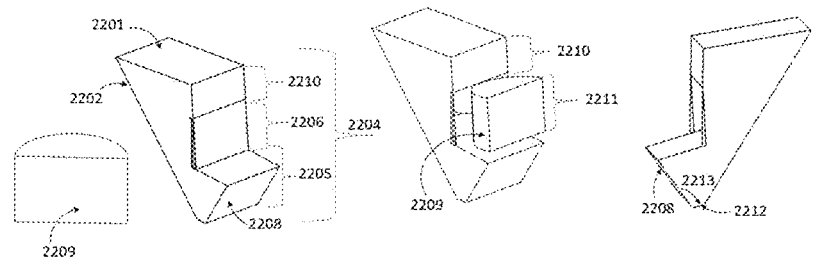
Figure 24:
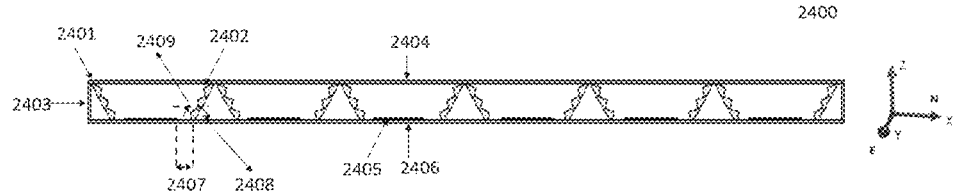
Figure 25:
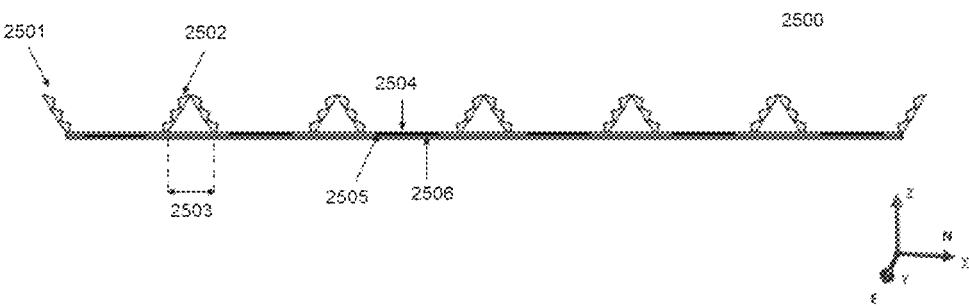
Figure 26:
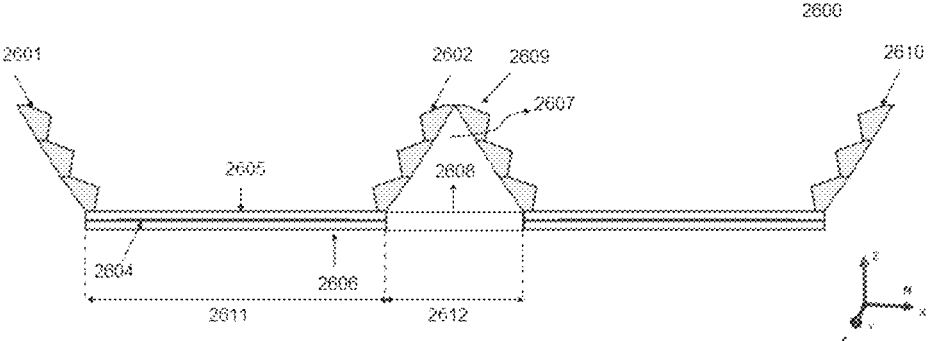
Figures 27A, 27B:
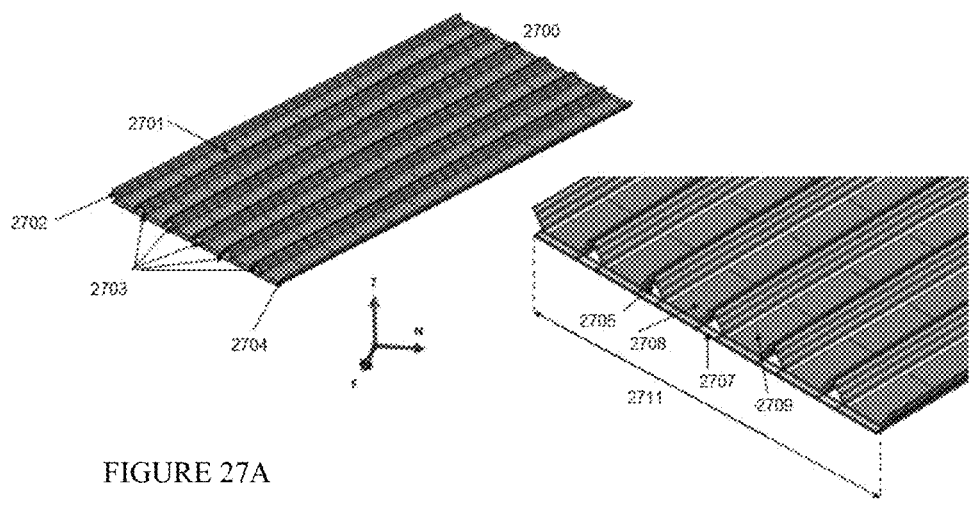
Figure 28:
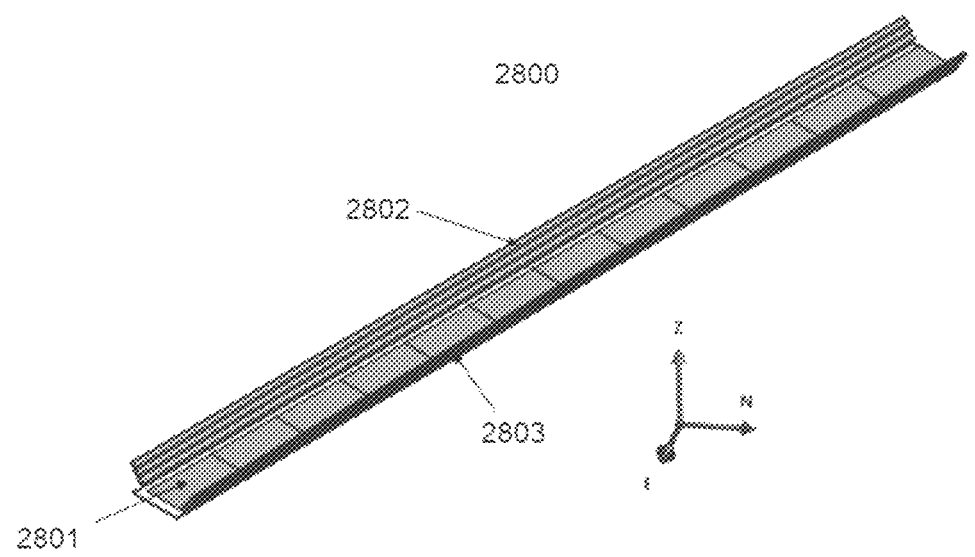
Figure 29:
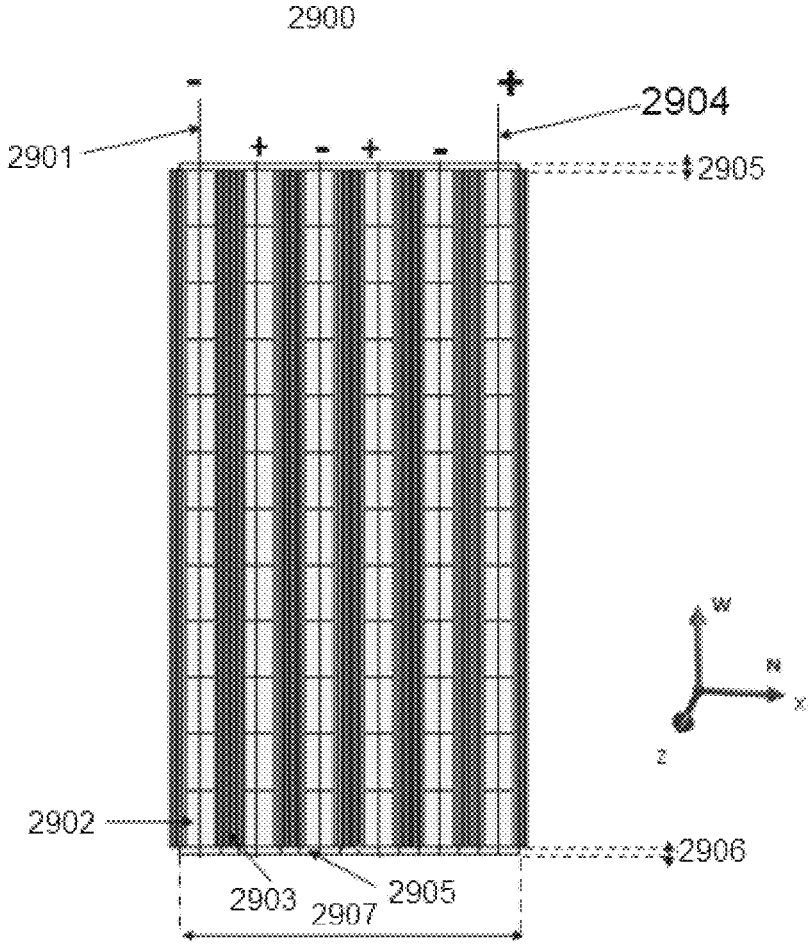
Figure 30:
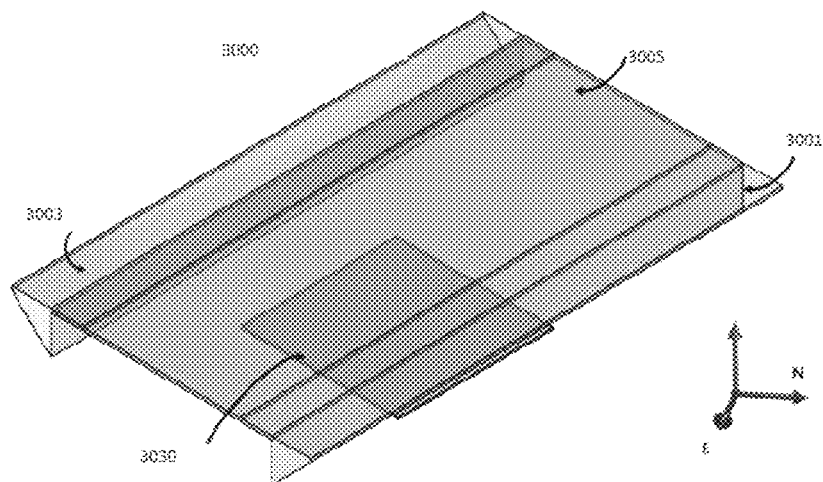
Figure 31:
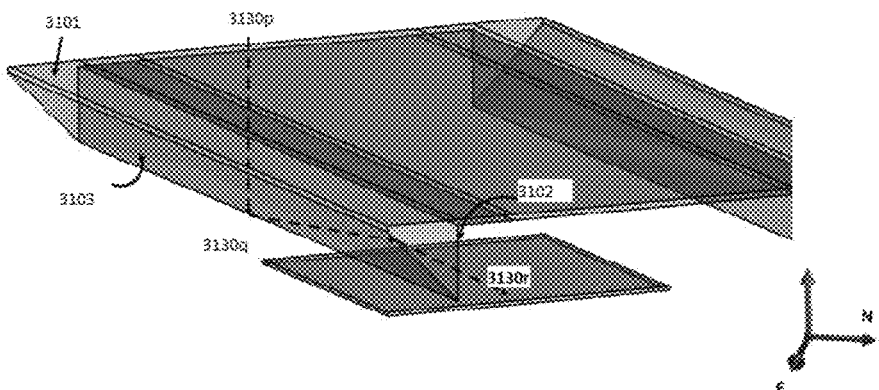
Figures 32A, 32B, 32C:
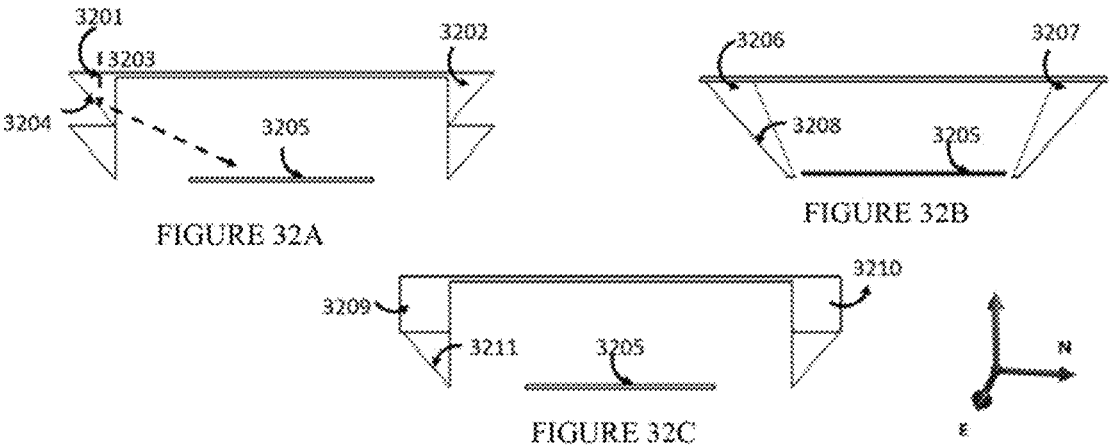
Figure 33:
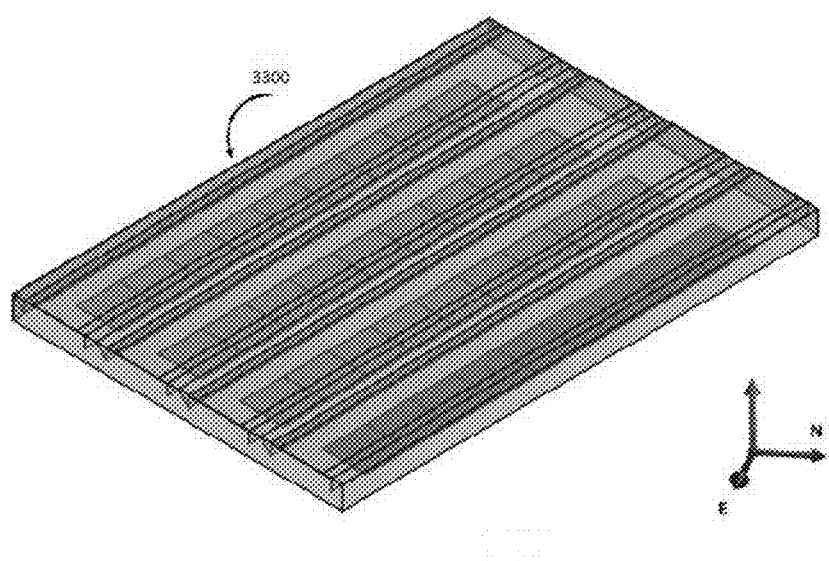
Figure 34:
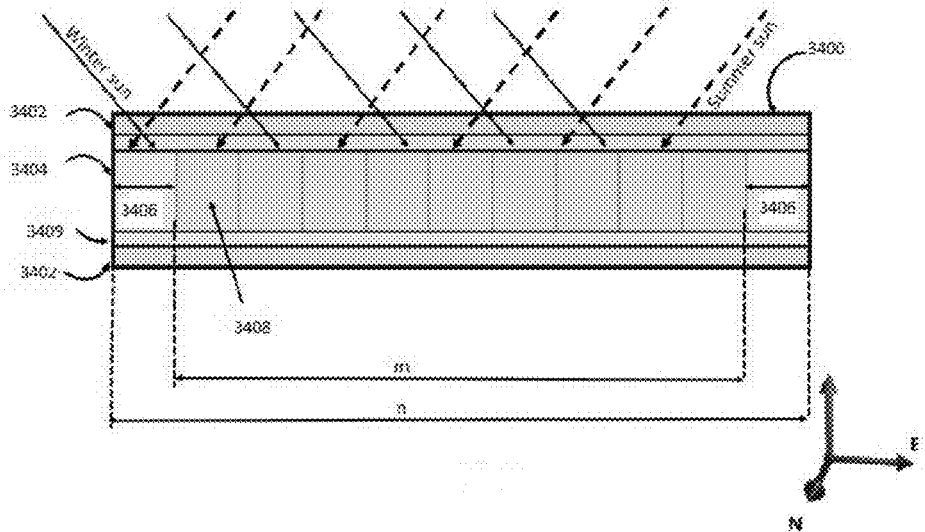
Figure 35:
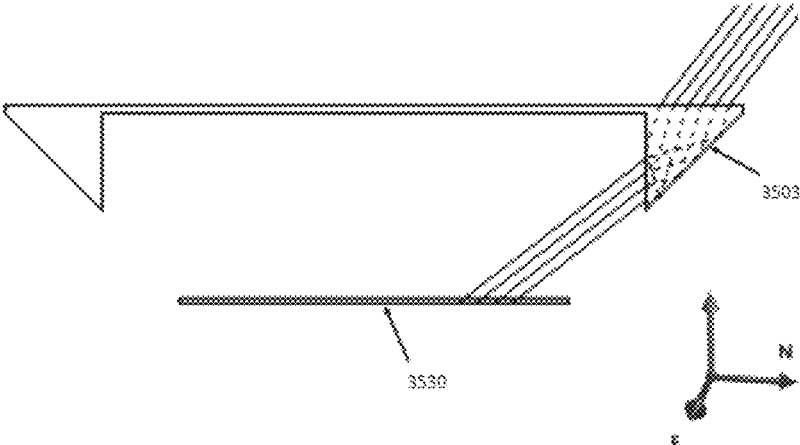
Figure 36:
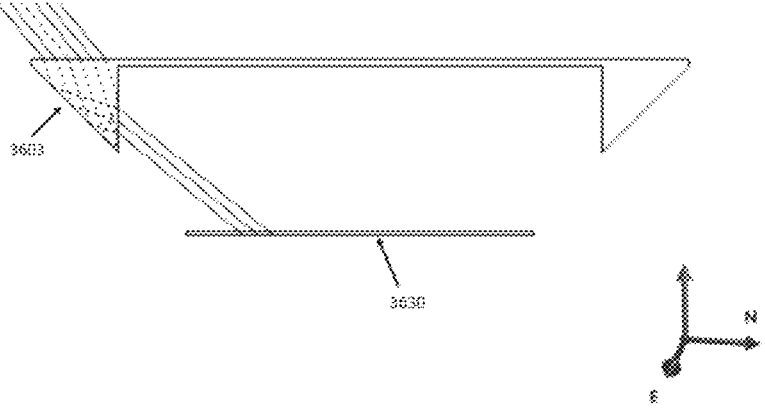
Figure 37A:
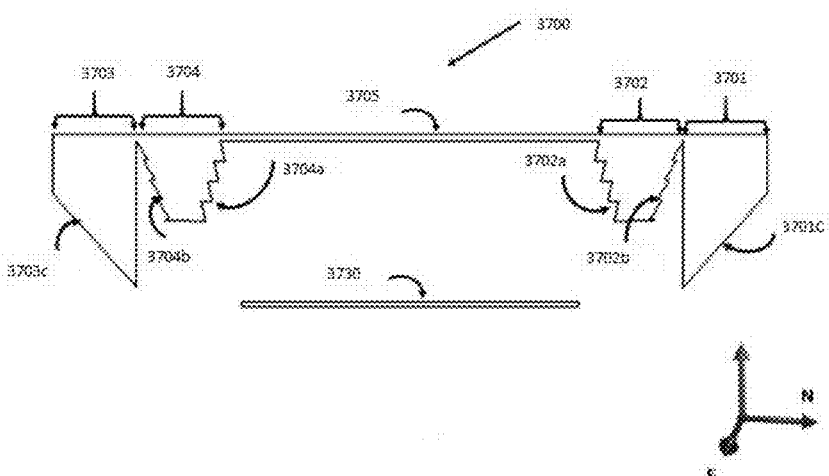
Figure 37B:
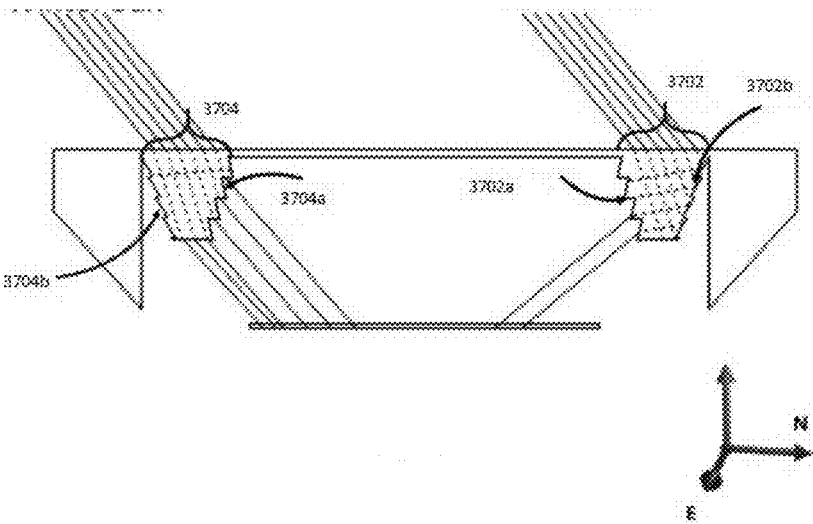
Figure 37C:
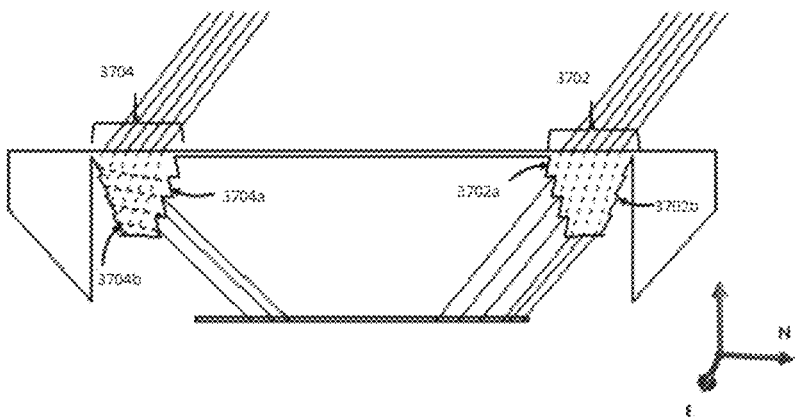
Figure 37D:
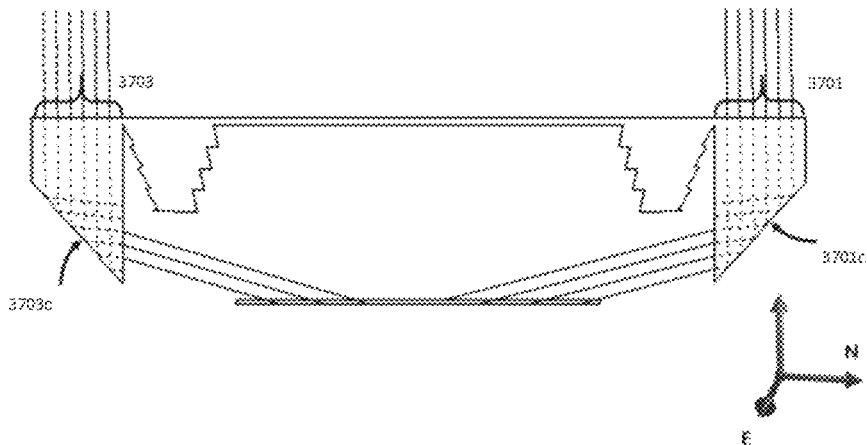
Figure 40:
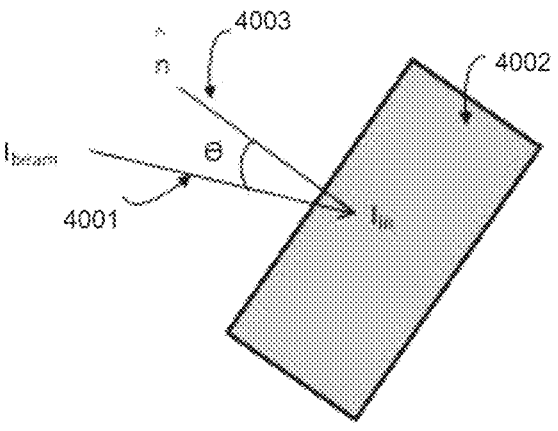
Figure 45:
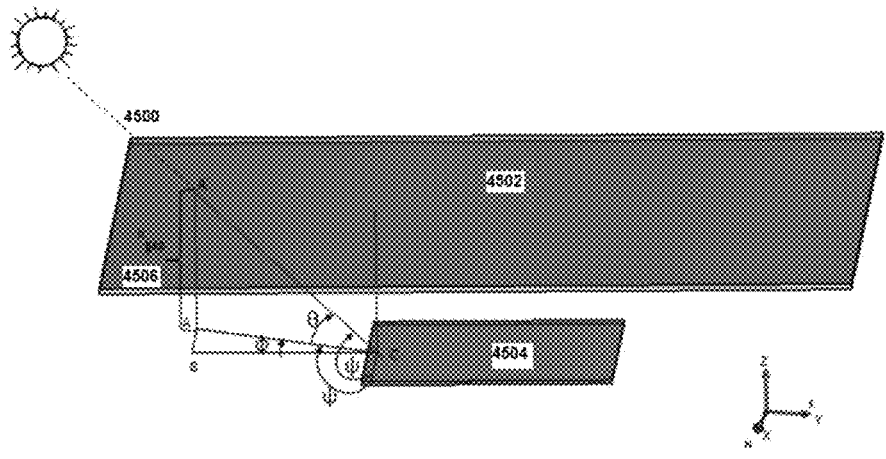
Figure 46:
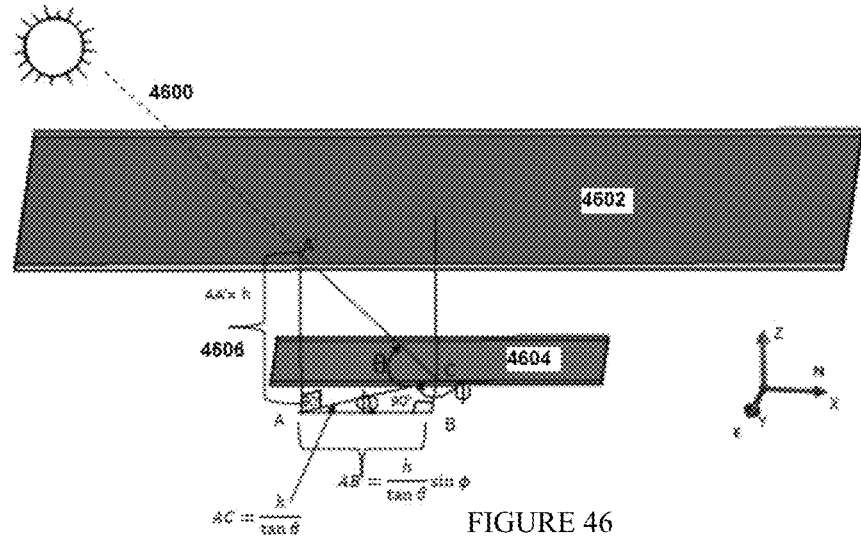
Figure 47:
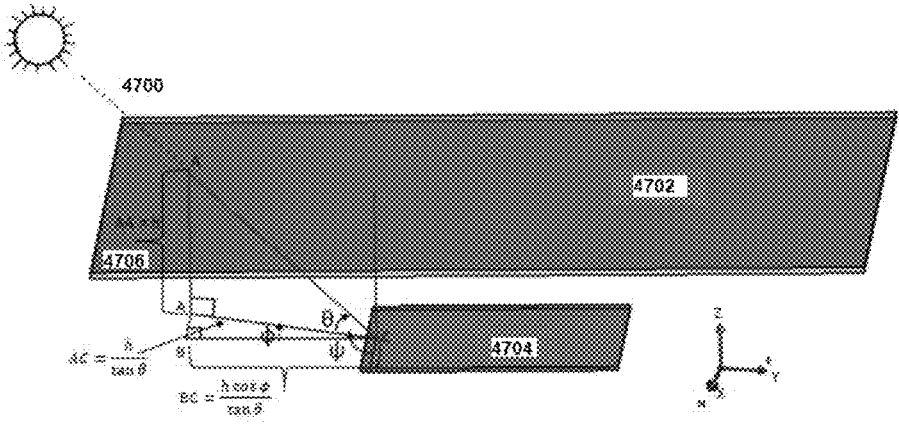
Figure 48:
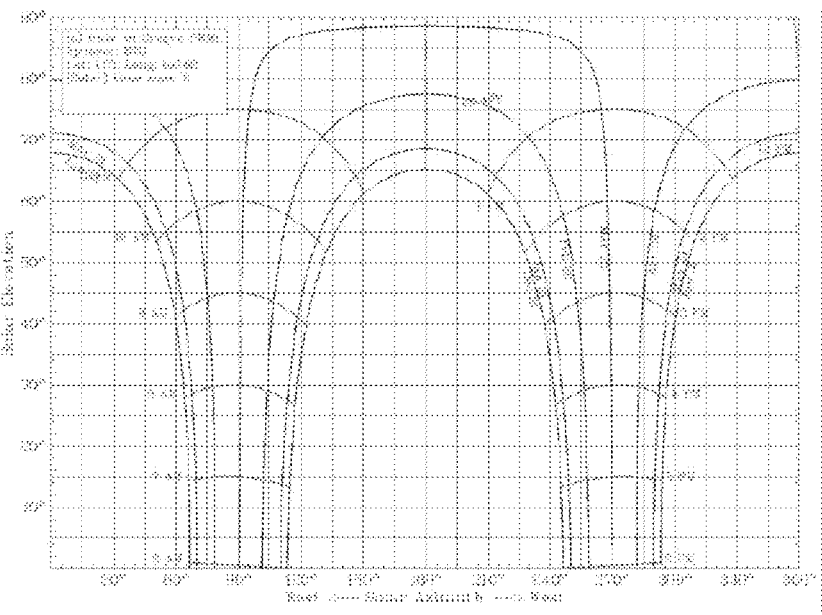
Figure 49A:
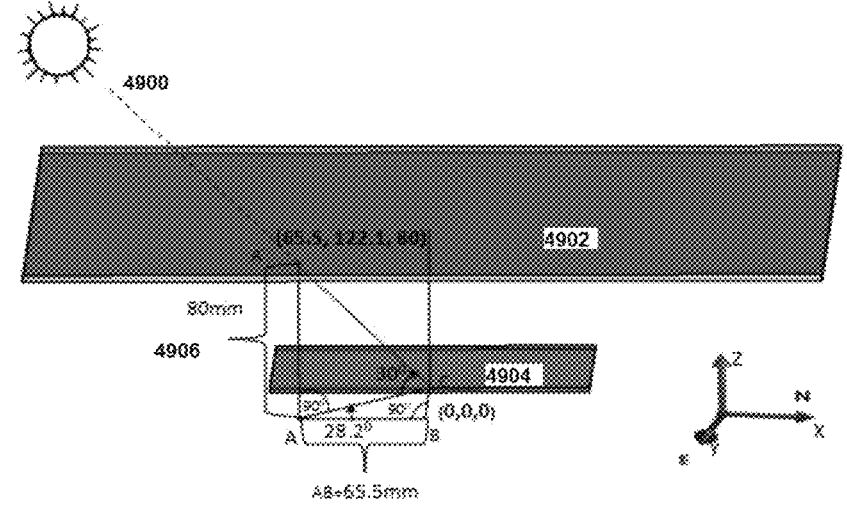
Figure 49B:
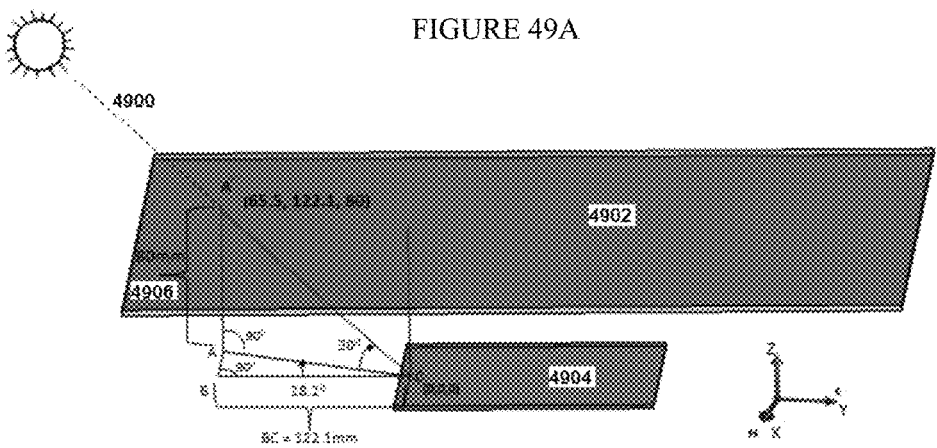
Figure 50:
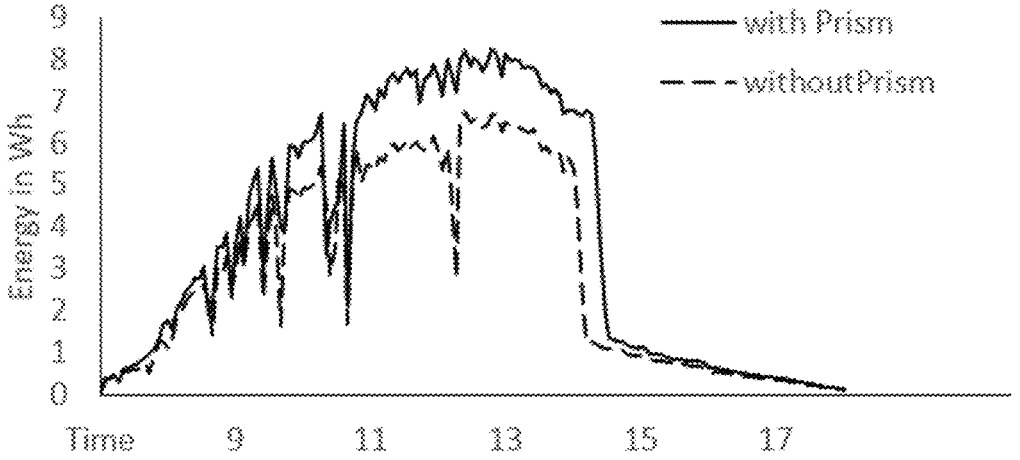
Figure 51A:
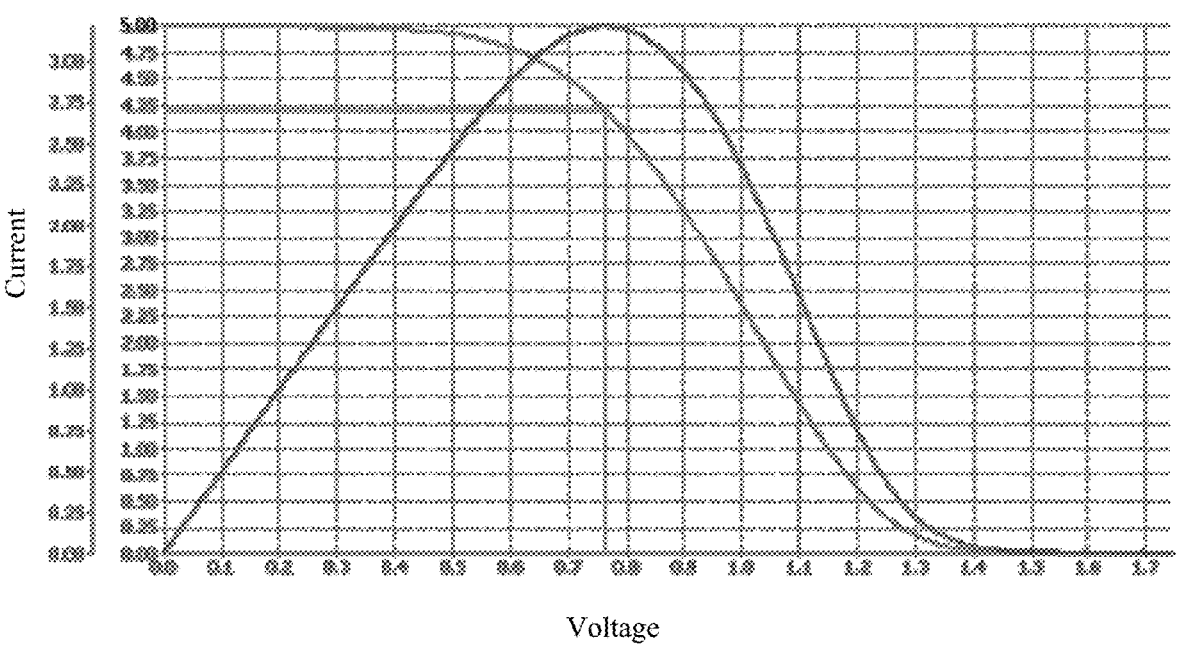
Figure 51B:
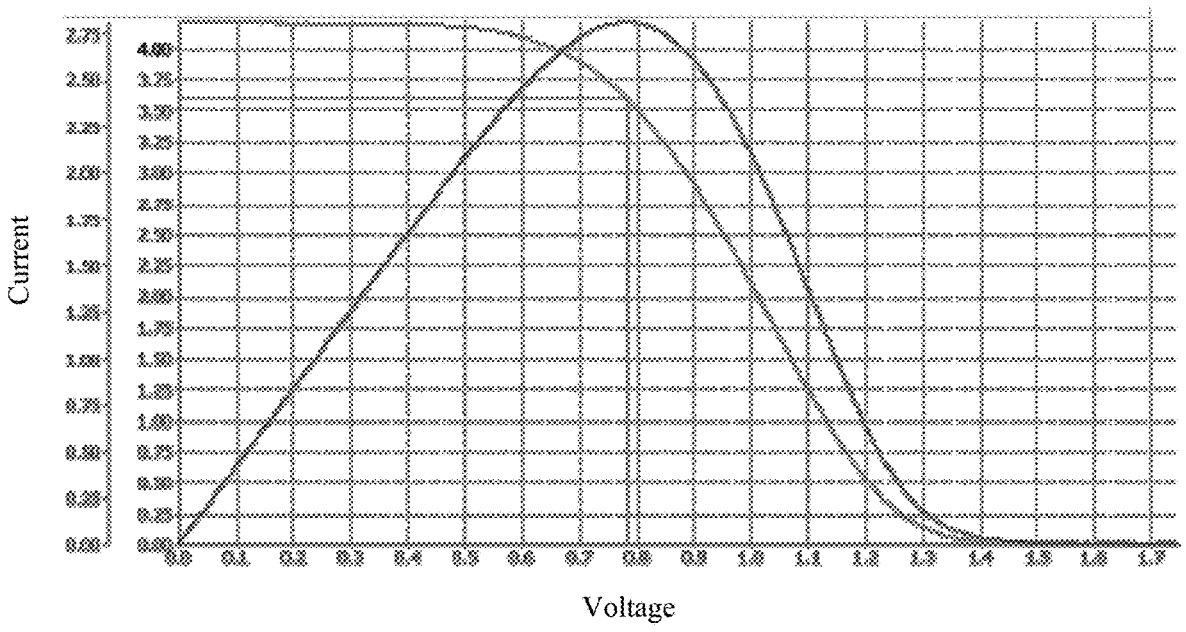

8 ment that has a completely flat and plain transmitting surface without any secondary redirecting profile in the form of a serrated profile or ridges;

FIG. 14B shows the redirection of equinox sun by a secondary redirecting profile in the form of the serrations or ridges on the transmitting surface of the redirecting prismatic wall units of FIGS. 13A-C;

FIG. 14C shows a closeup view of TIR happening at 1402 surface and how 1405 helps in steering the sunlight towards the 1401;

FIG. 14D shows the top view of a redirecting prismatic wall assembly unit with protrusions that form a triangular wave pattern in the East-West direction as per an embodiment herein;

FIGS. 15A, 15B, 15C show the exploded view of the secondary redirected profile obtained by providing serrated edges made on a single triangular protrusion that was outlined in the FIG. 14D;

FIGS. 16A, 16B, 16C show in the front view how equinox and winter sun is handled by a redirecting prismatic wall unit with serrated edges on the transmitting surface, as per an embodiment herein as per an embodiment shown in FIGS. 15A-15C;

FIGS. 17A, 17B, 17C show the exploded view of the secondary redirected profile obtained by providing serrated edges that are made on a single triangular protrusion, as per an embodiment herein;

FIGS. 18A, 18B, 18C, 18D show in the front view how equinox, summer and winter sun is handled by a redirecting prismatic wall unit with the serrated edges on the transmitting surface, as per an embodiment shown in FIGS. 17A-17C;

FIGS. 19A, 19B, 19C show the top view of a redirecting prismatic wall assembly unit with semi-cylindrical protrusions that form a semi-circular wave pattern in the East-West direction as per an embodiment herein;

FIGS. 20A, 20B, 20C show the exploded view of the semi-cylindrical protrusions, as per an embodiment herein;

FIGS. 21A, 21B, 21C show in the front view how equinox and winter sun is handled by a redirecting prismatic wall unit with semi-cylindrical protrusions, as per an embodiment herein;

FIGS. 22A, 22B, 22C show the exploded view of the semi-cylindrical depression, as per an embodiment herein;

FIGS. 23A, 23B show the top view of a redirecting prismatic wall assembly unit with semi-cylindrical depression that form a semi-circular wave pattern in the East-West direction as per an embodiment herein;

FIG. 24 shows a front view of one embodiment of a solar panel with a redirecting prismatic wall unit where in the entire unit is enclosed inside a glass wall running around its periphery and a top glass covers the photovoltaic cells and the redirecting prismatic wall unit;

FIG. 25 shows a front view of the same embodiment of a solar panel with redirecting prismatic wall unit where in the top glass covers the photovoltaic cells alone and the redirecting prismatic wall unit is kept on either side of the photovoltaic cell;

FIG. 26 shows a close-up front view of a redirecting prismatic wall, as per an embodiment herein;

FIGS. 27A, 27B show an isometric views of a solar panel with redirecting prismatic wall unit, as per an embodiment herein;

FIG. 28 shows an isometric view of a single row of solar panel with redirecting prismatic wall unit, as per an embodiment herein;

FIG. 29 shows the top view of one embodiment of a light deflector wall unit for a solar panel configuration of 12×6 with seventy-two half cut photovoltaic cells that also shows the series connection of the photovoltaic cell;

FIG. 30 shows an isometric view of a motionless optical unit for redirecting sunlight according to an embodiment herein;

FIG. 31 shows light redirection in one of the deflector unit of a motionless optical unit for redirecting sunlight according to an embodiment herein;

FIG. 32A shows a front view of an exemplary embodiment 1 of a motionless optical unit as per embodiments herein;

FIG. 32B shows a front view of an exemplary embodiment 2 of a motionless optical unit as per embodiments herein;

FIG. 32C shows a front view of an exemplary embodiment 3 of a motionless optical unit as per embodiments herein. It may be noted here that, the naming of embodiments in FIGS. 32A, 32B, and 32C are only done for illustrative purposes and are in no manner meant to limit the scope to only these three embodiments;

FIG. 33 shows an integrated solar panel of 36 cells with the motionless optical unit as per an embodiment herein;

FIG. 34 shows a top view of a single row of an integrated solar panel containing 9 cells placed in continuous arrangement in an integrated solar panel of 36 cells with the motionless optical unit as per an embodiment herein;

FIG. 35 shows a front view of a motionless optical unit depicting the redirection of a summer sunlight coming from North East direction in the morning to the solar cell as per an embodiment herein;

FIG. 36 shows a front view of a motionless optical unit depicting the redirection of a winter sunlight coming from South East direction in the morning to the solar cell as per an embodiment herein;

FIG. 37A shows a front view of a motionless optical unit having grooves in the deflector unit/s as per an embodiment herein;

FIG. 37B shows a front view of a motionless optical unit depicting redirection of winter of winter sunlight by the deflector unit/s as per an embodiment herein;

FIG. 37C shows a front view of a motionless optical unit depicting redirection of a summer sunlight by the deflector unit/s as per an embodiment herein;

FIG. 37D shows a front view of a motionless optical unit depicting redirection of an equinox sunlight by the deflector unit/s as per an embodiment herein;

FIG. 38 illustrates a cross sectional view of a contemporary solar panel with increasing heights between the top sunlight incident surface and the solar cells that results in losses of sunlight falling on the solar cell;

FIG. 39 illustrates an isometric view of a contemporary solar panel with increasing heights between the top sunlight incident surface and the solar cells and loss of sunlight falling on the solar cell;

FIG. 40 represents an incident sunlight falling on an inclined a solar cell and indicates the cosine losses occurred therefore as governed by Lambertian Cosine Law;

FIGS. 41A-41D illustrates a cross sectional view of a solar panel assembly for efficient management of various losses in a solar cell application as per an embodiment herein;

FIGS. 42A-42D illustrates a solar panel assembly with single solar cell for efficient management of various losses in a solar cell application as per an embodiment herein;

FIGS. 43A-43D illustrates a solar panel assembly with a row of 9 solar cells for efficient management of various losses in a solar cell application as per an embodiment herein;

FIGS. 44A-44D illustrates a solar panel assembly with 4 rows of 9 solar cells each for efficient management of various losses in a solar cell application as per an embodiment herein;

FIG. 45 represents a diagram helpful for explaining mathematical formulation for extra area needed for a solar panel assembly for efficient management of various losses in a solar cell application, as per an embodiment herein;

FIG. 46 represents a diagram helpful for explaining mathematical formulation for extra area needed in a north-south direction for a solar panel assembly for efficient management of various losses in a solar cell application, as per an embodiment herein;

FIG. 47 represents a diagram helpful for explaining mathematical formulation for extra area needed in an east-west direction for a solar panel assembly for efficient management of various losses in a solar cell application, as per an embodiment herein;

FIG. 48, shows the path of sun rays chart that shows the variations of azimuth and elevation angle of sun throughout the year in Singapore;

FIGS. 49A and 49B show the extra area $g_x$ and $g_y$ calculation respectively for Singapore sun, as per an exemplary embodiment herein;

FIG. 50 shows a graphical representation depicting the power generated by the solar panel, of the present disclosure, vs. the power generated by the conventional solar panel;

FIG. 51A shows a graphical representation of the current Vs. voltage generated by the solar panel, of the present disclosure; and FIG. 51B shows a graphical representation of the current Vs. voltage generated by the conventional solar panel.

LIST OF REFERENCE NUMERALS light redirecting prism 100
first side/incident surface 101
second side/redirecting surface 102
third side/transmitting surface 103
first angle 104
second angle 105
third angle 106
light redirecting prism 200
incident surface 201
redirecting surface 202
transmitting surface 203
truncated bottom 207
shadow region 208
light redirecting prism 300
incident surface 301
redirecting surface 302
transmitting surface 303
mounting angle 308
light redirecting prism 400
operative upper edge 401
transmitting surface 403
prism element 701
photovoltaic cell 704
mounting angle 708
connecting element 715
top glass 802
photovoltaic cell 804 offset tilt angle 809
gap 805
mounting angle of bottommost prism unit 808
mounting angle of topmost prism unit 809
stacking pattern 810
tilt angle 811
top glass 902
mounting angle of bottommost prism unit 908
mounting angle of topmost prism unit 909
stacking pattern 910
surface tilt angle 911
prism unit 912
photovoltaic cell 1004
incident surface 1301
redirecting surface 1302
truncated surface 1303
transmitting surface 1304
plain region 1306
non-plain region 1307
triangular protrusion 1308
serrated profile 1309
angle of triangular profile 1310
angle of serration 1311
lower region 1312
photovoltaic cell 1401
incident surface profile 1403
triangular protrusion 14031
redirecting surface 1402
transmitting surface 1404
critical angle of triangular protrusion 1405
first surface of triangular protrusion 1406
second surface of triangular protrusion 1407
north redirecting prismatic wall unit 1408
south redirecting prismatic wall unit 1409
winter sunray 1410
incident surface 1501
redirecting surface 1502
transmitting surface 1504
angle of triangular protrusions 1505
length of transmitting surface 1506
parts of serrated profile 1508, 1509
angles of ridges 1510, 1511
topmost region of the redirecting prism 1512
middle region of secondary redirecting profile 1513
photovoltaic cell 1601
redirecting profile 1602
incident surface 1603
transmitting surface 1604
secondary redirecting profile 1605
lower region 1606
middle region 1607
incident surface 1701
redirecting surface 1702
truncated surface 1703
transmitting surface 1704
angle of triangular protrusion 1705
length of transmitting surface 1706
triangular protrusion 1708
ridge 1709
angle of ridge 1710
angle of triangular protrusion 1711
topmost region of redirecting prism 1712
middle region of redirecting prism 1713
lower topmost region of redirecting prism 1717
photovoltaic cell 1801
south redirecting prism 1802
north redirecting prism 1803 redirecting surface 1805
truncated surface 1806
upper portion of the transmitting surface 1807
middle portion of the transmitting surface 1808
lower portion of the transmitting surface 1809
rays of winter sunlight exiting redirecting prism 1810
rays of equinox sunlight exiting redirecting prism 1811
rays of summer sunlight exiting redirecting prism 1812
photovoltaic cell 1901
redirecting prismatic wall assembly 1902
concentrating profile 1903
degree of protrusion (bulge) of the concentrating profile 1904
semi-cylindrical protrusion 1905
diameter of concentrating cell 1906
points on semicylindrical profile 1907, 1908
vertical displacement 1909
incident surface 2001
redirecting surface 2002
transmitting surface 2004
truncated surface 2012
operative bottom portion of transmitting surface 2005
protrusion of the transmitting surface 2008
upper region of transmitting surface 2010
height of semi-cylindrical protrusion 2011
angle of second curvature of transmitting surface 2013
photovoltaic cell 2101
south redirecting prism 2103
north redirecting prism 2104
redirecting surface 2105
truncated surface 2106
semicylindrical concentrating profile 2108
rays exiting concentrating profile 2109
equinox sun rays exiting secondary redirecting profile 2111
incident surface 2201
redirecting surface 2202
truncated surface 2212
transmitting surface 2204
lower region of transmitting surface 2205
middle region of transmitting surface 2206
protrusion of transmitting surface 2208
upper region of transmitting surface 2210
height of the semicylindrical depression 2211
depression unit 2209
angle between surfaces 2208 and 2212 2213
photovoltaic cell 2301
redirecting prismatic wall assembly 2302
semicylindrical depression 2303
radius of semicylindrical depression 2304
gap between two adjacent semi-cylindrical depression 2306
sum of diameter of the shape 2303 and gap 2306 2305
solar panel 2400
south redirecting prismatic wall 2401
north redirecting prismatic wall 2402
side wall 2403
photovoltaic cell 2404
top glass 2405
bottom glass 2406
gap 2407
redirecting prismatic wall assembly 2500
south redirecting prism wall 2501
north redirecting prism wall 2502
photovoltaic cell 2505
top glass 2504
bottom glass 2506 redirecting prismatic wall assembly 2600
redirecting prismatic wall units of first set 2601, 2602
redirecting prismatic wall units of first set 2609, 2610
photovoltaic cell 2604
top glass 2605
bottom glass 2606
air gap 2607
glass piece 2608
span of top and bottom glasses 2611
length of glass piece 2612
photovoltaic cell 2701
peripheral redirecting prismatic walls 2702, 2704
gabled arrangement of redirecting prismatic wall units
    2703
air gap 2705
glass piece 2707
photovoltaic cell rows 2708, 2709
length of glass piece 2711
photovoltaic cell 2801
redirecting prismatic wall unit 2802, 2803
solar panel 2900
photovoltaic cells 2902
redirecting prism wall units 2903
'−' lead 2901
'+' ve lead 2904
area extension of the top glass 2905
length of glass area 2907

DETAILED DESCRIPTION

The embodiments herein and the various features and advantageous details thereof are explained with reference to the non-limiting embodiments in the following description. Description of well-known components and processing techniques are omitted so as to not unnecessarily obscure the embodiments herein. The examples used herein are intended merely to facilitate an understanding of ways in which the embodiments herein may be practised and to further enable those of skill in the art to practise the embodiments herein. Accordingly, the examples should not be construed as limiting the scope of the embodiment herein.

The description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The present disclosure envisages a light redirecting prism. The light redirecting prism has at least three elongate surfaces. The three elongate surfaces include an incident surface, a redirecting surface and a transmitting surface. The incident surface is configured to receive incident parallel rays of light. The redirecting surface is configured to perform total internal reflection of the light travelling from the incident surface through a predetermined range of angles and thus redirect the light. A first angle is defined between the incident surface and the transmitting surface. The transmitting surface is configured to transmit the redirected light at a predetermined angle out of the light redirecting prism and to direct the light towards a solar energy absorbing device. A second angle is defined between the incident surface and the redirecting surface, thus defining a third angle between the redirecting surface and the transmitting surface.

The light redirecting prism is configured to be used conjunction with various light absorbing devices such as solar photovoltaic cells. The light rays received by the incident surface, redirected by the redirected surface and transmitted by the transmitted surface of the light redirecting prism are cast upon the surface of the photovoltaic cell, as a supplement to the light rays that are directly incident upon the surface of the photovoltaic cell.

Figure 1:
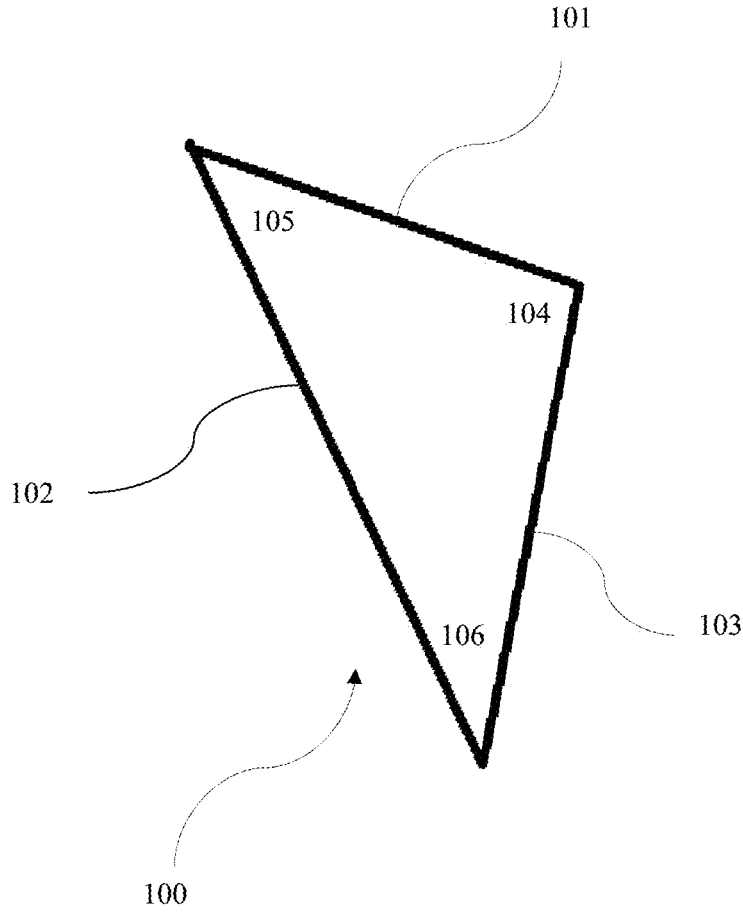
FIG. 1 illustrates a schematic cross-section of a light redirecting prism of the present disclosure.

FIG. 1 illustrates a schematic cross-section of a light redirecting prism 100 of the present disclosure. A first side 101 of the triangle represents the incident surface, a second side 102 represents the redirecting surface and a third side 103 represents the transmitting surface.

According to a preferred embodiment of the present disclosure, the light redirecting prism 100 has a first angle 104 in the range of 80°-110°, and is preferably 100°, and a second angle 105 in the range of 45°-55°, and is preferably 49°.

Figure 2:
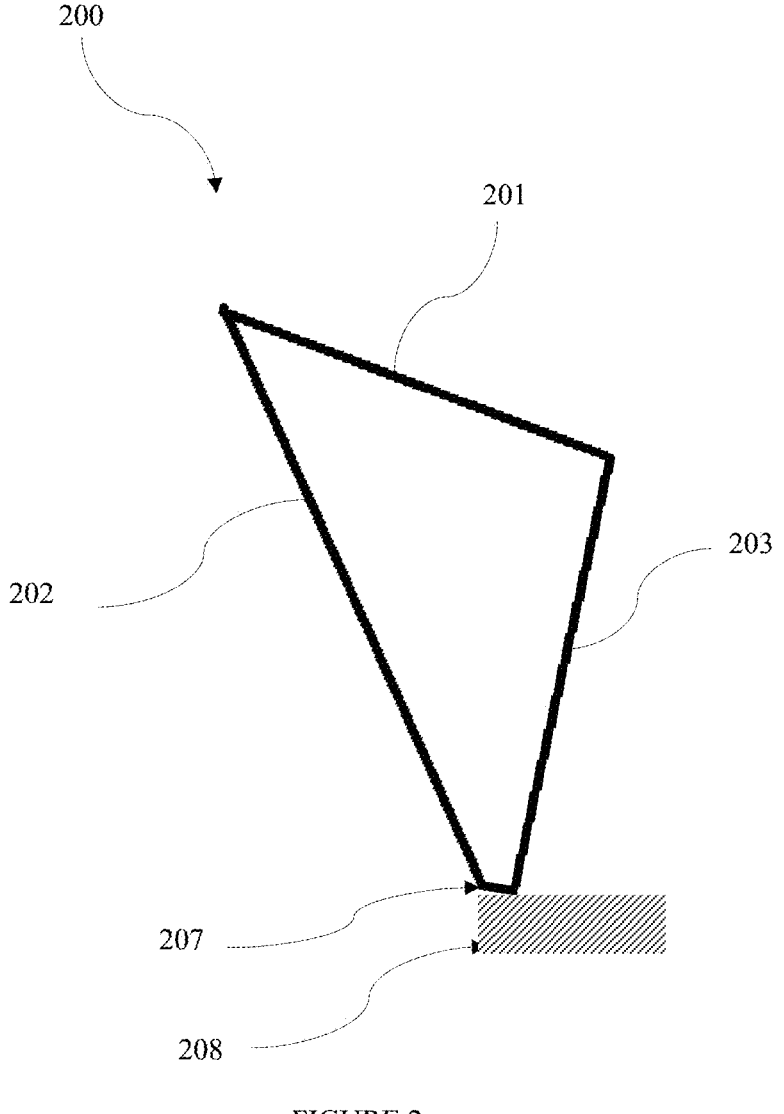
FIG. 2 shows the light redirecting prism of FIG. 1 with a truncated bottom and a shadow region.

As shown in FIG. 2, the light redirecting prism 200 has a truncated bottom 207 for facilitating mounting of the light redirecting prism 200 on a base. Preferably, the ratio of width of the truncated bottom 207 to the width of the shadow region 208 is in the range of 1:10 to 1:15.

In a preferred embodiment, the ratios of lengths of the incident surface 201, redirecting surface 202 and the transmitting surface 203 to the width of the shadow region are 1.3:2.3:1.1 respectively.

According to an aspect of the present disclosure, the redirecting prism has a secondary redirecting profile on the transmitting surface. The secondary redirecting profile comprises at least ridge whose edge lies in a horizontal plane. The secondary redirecting profile spans at least a lower part of the transmitting surface and extends up to an operative lower edge of the transmitting surface. The secondary redirecting profile is provided along the length of the transmitting surface. The secondary redirecting profile is configured to redirect towards the adjacent solar energy absorbing device, that component of the redirected rays which would get transmitted in a shadow region of the prism or transmitted back in the air or transmitted within the prism boundary, in the absence of the secondary redirecting profile. The shadow region is that region below the redirecting prism between the lower edge of the transmitting surface of the prism and the corresponding solar energy absorbing device. More preferably, the secondary redirecting profile comprises a plurality of parallel ridges. Preferably, the secondary redirecting profile comprises a plurality of reedings or flutings having a plurality of semi-cylindrical protrusions or depressions respectively, with axes of said protrusions or said depressions parallel to the transmitting surface of said prism.

Figure 3A:
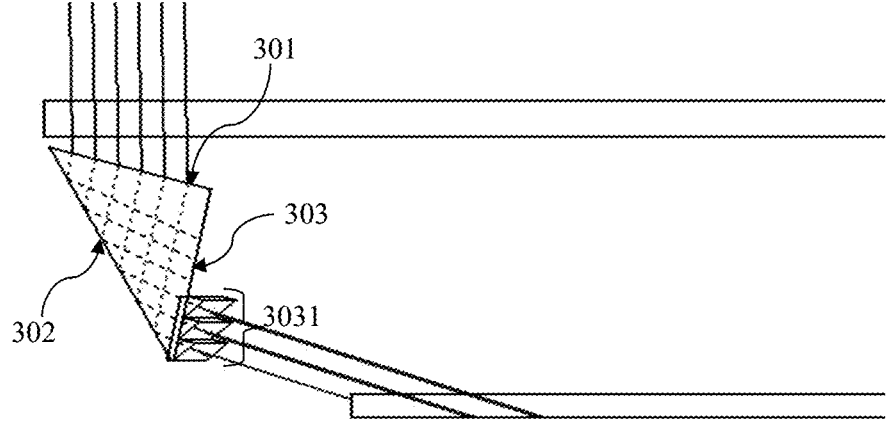
FIGS. 3A, 3B illustrate a typical ray diagram of a light redirecting prism of an embodiment with a secondary redirecting profile consisting of three serrations or ridges provided on the transmitting surface.
Figure 3B:
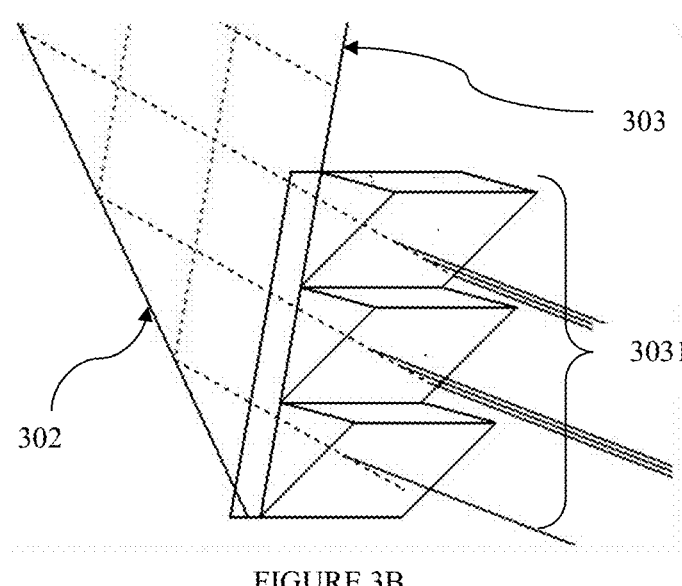

FIGS. 3A, 3B illustrate a light redirecting prism 300 with a secondary redirecting profile 3031 defined on the transmitting surface 303. The secondary redirecting profile 3031 comprises three serrations or ridges present on the triangular protrusion of the transmitting surface 303. The ridges include an operative bottommost ridge positioned to redirect the bottommost ray redirected by the redirecting surface 302, optimally for Equinox rays.

In an alternative embodiment, the redirecting prism has a secondary redirecting profile on the redirecting surface. The secondary redirecting profile comprises at least one ridge whose edge lies in a horizontal plane. The secondary redirecting profile spans at least a lower part of the redirecting surface and extends up to an operative lower edge of the redirecting surface. In an embodiment, the secondary redirecting profile extends over the entire redirecting surface. The secondary redirecting profile is provided along the length of the redirecting surface. The secondary redirecting profile is configured to redirect towards the adjacent solar energy absorbing device, that component of the redirected rays which would get transmitted in a shadow region of the prism or transmitted back in the air or transmitted within the prism boundary, in the absence of the secondary redirecting profile. More preferably, the secondary redirecting profile comprises a plurality of parallel ridges. Preferably, the secondary redirecting profile comprises a plurality of reedings or flutings having a plurality of semi-cylindrical protrusions or depressions respectively, with axes of said protrusions or said depressions parallel to the transmitting surface of said prism.

Figure 3C:
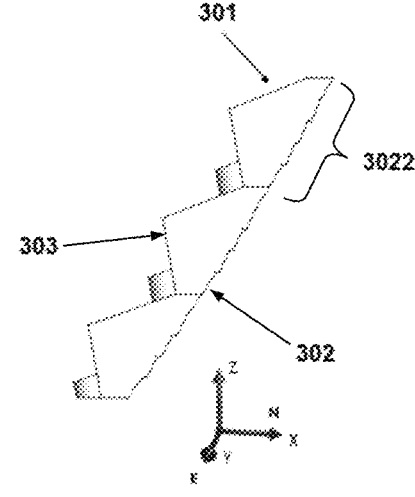
FIGS. 3C-3D illustrate a typical light redirecting prism of an embodiment with a secondary redirecting profile provided on the redirecting surface.
Figure 3D:
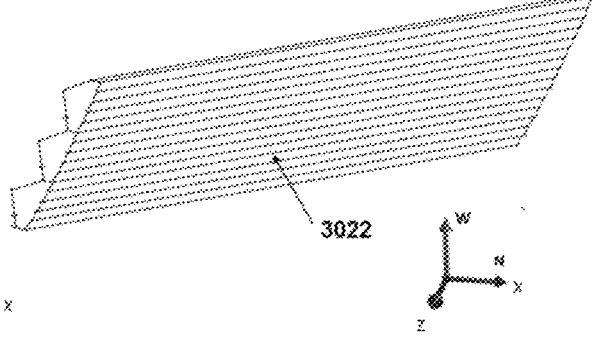

FIGS. 3C-3D illustrate a light redirecting wall incorporating an array of three light redirecting prism elements of an embodiment with a secondary redirecting profile provided on the redirecting surface of each light redirecting prism element, wherein FIG. 3C shows a side view and FIG. 3D shows an isometric view. The secondary redirecting profile 3022 formed by providing ridges running parallel to the longitudinal dimension of the light redirecting wall is the figures.

Figure 4:
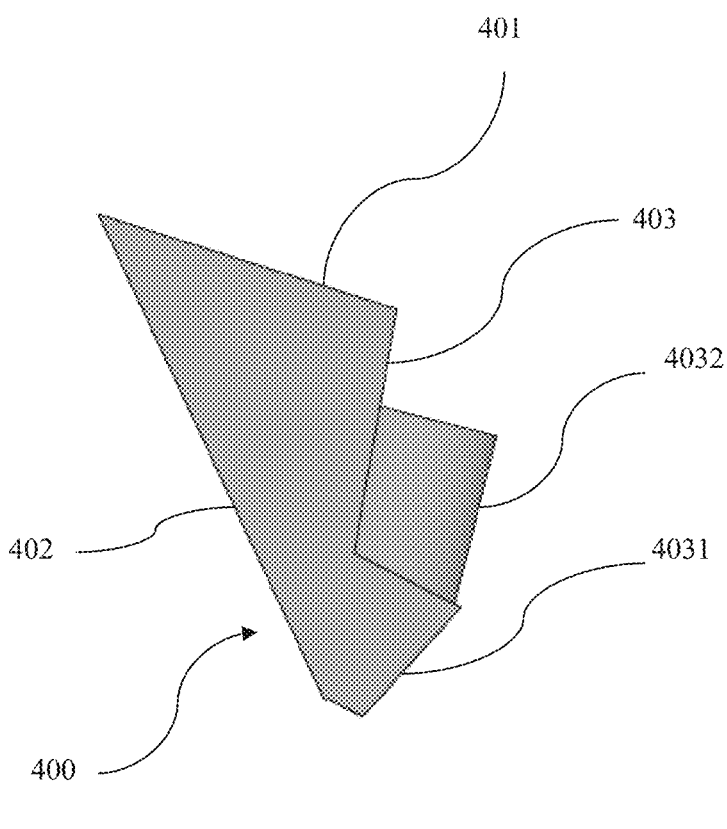
FIG. 4 illustrates a redirecting prism provided with a concentrating profile and a secondary redirecting profile on the transmitting surface.

According to another aspect of the present disclosure, as shown in an exemplary embodiment in FIG. 4, the redirecting prism has a concentrating profile on the transmitting surface. The concentrating profile 4032 spans at least an upper part of the transmitting surface and extends up to an operative upper edge 401 of the transmitting surface. In a preferred embodiment, the concentrating profile comprises operatively vertical flutings or operatively vertical reedings.

Alternatively, the redirecting prism has a concentrating profile on the redirecting surface. The concentrating profile spans at least an upper part of the redirecting surface and extends upto an operative upper edge of the redirecting surface. The concentrating profile is configured to concentrate redirected rays corresponding to the rays that are incident obliquely sideways on the incident surface.

It is to be noted that, although termed as 'concentrating profile', the concentrating profile has a focal point that is formed above the adjacent photovoltaic cell, and not on the surface of the photovoltaic cell, and further to the focal point, the diverging light falls on the photovoltaic cell.

Figure 5:
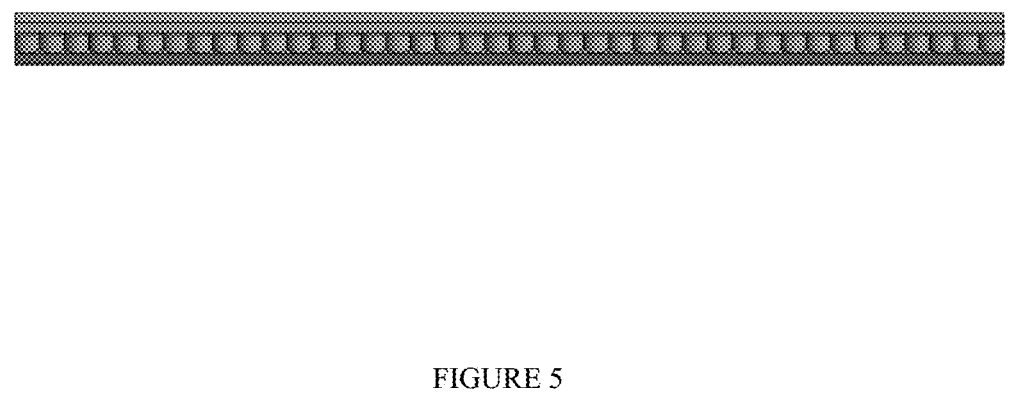
Figure 6:
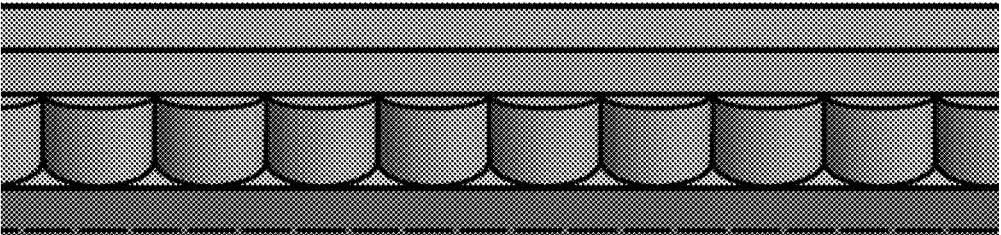
FIG. 6 illustrates a close-up view of a redirecting prism of FIG. 4.

As illustrated in FIG. 4, the redirecting prism 400 is provided with a redirecting profile 4031 and a concentrating profile 4032 on the transmitting surface 403. The preferred embodiment is illustrated in FIG. 4, wherein the concentrating profile 4032 is formed of vertical sections of semi-cylindrical protrusions as shown in FIG. 5, or in a close-up view in FIG. 6. The concentrating profile 4032 can be imagined as a series of vertical sections of semi-cylindrical protrusions pasted along the elongated transmitting surface 403.

According to another embodiment of the present disclosure, the redirecting prism of the present disclosure has a composite convex profile on the transmitting surface thereof, having a series of geometrical protruding profiles along the length thereof. Each of the geometrical profiles has a first curvature in an operative top portion and a second curvature in an operative bottom portion. The first curvature has an operative vertical axis of curvature parallel to the transmitting surface and is configured to concentrate redirected rays corresponding to the rays that are incident obliquely sideways on the incident surface. The second curvature has an operative horizontal axis of curvature perpendicular to the transmitting surface and is configured to redirect towards the adjacent solar energy absorbing device, that component of the redirected rays which would get transmitted in a shadow region of the prism or transmitted back in the air or transmitted within the prism boundary, in the absence of the second curvature.

The redirecting prism of the present disclosure is made of a material with refractive index of 1.51, the material being selected from the group consisting of polymethyl methacrylate, acrylic, styrene, polycarbonate, glass, styrene methyl methacrylate, polycarbonate, styrene, styrene acrylic copolymers or derivatives of these materials.

The present disclosure also envisages a redirecting prismatic wall, formed by vertically stacked, one on the top of another, prism elements according to the various embodiments described hereinabove. The configuration of adjacent prisms elements in the wall is defined to provide the edge corresponding to the third angle of one prism element in contact with the edge corresponding to the second angle of the other prism element, as illustrated through FIGS. 7-12.

Figure 7A:
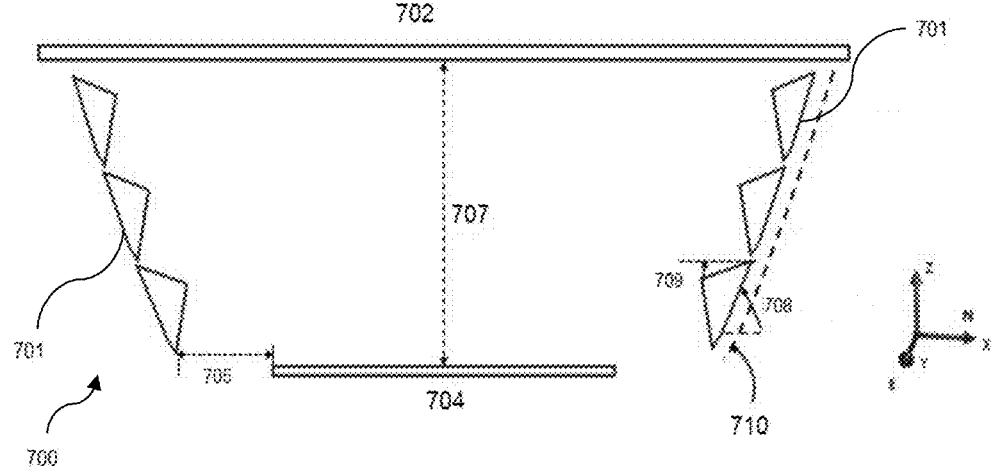
FIG. 7A represents a front view of one embodiment of a redirecting prismatic wall of the present disclosure.

FIG. 7A represents a front view of one embodiment of a redirecting prismatic wall. According to this embodiment, two parallel redirecting prismatic walls are placed on either side of a photovoltaic cell 704. The one in the north direction referred to be 'north redirecting prismatic wall' henceforth and the other in south direction referred to be 'south redirecting prismatic wall' henceforth. The north redirecting prismatic wall and south redirecting prismatic wall terminology may not necessarily mean that that the wall assembly is placed on exact north or exact south. Rather, they might cover north-west-north-east, or south-east-south-west respectively. FIG. 7A shows a wall with three redirecting prisms each having a triangular cross section, stacked over each other to obtain each of the redirecting prismatic walls. Embodiments with a number of such elements stacked up in a certain geometry may be possible and each redirecting prismatic wall can be of triangular, polygonal or cylinder cross-section or any other combination of the same.

Figure 7B:
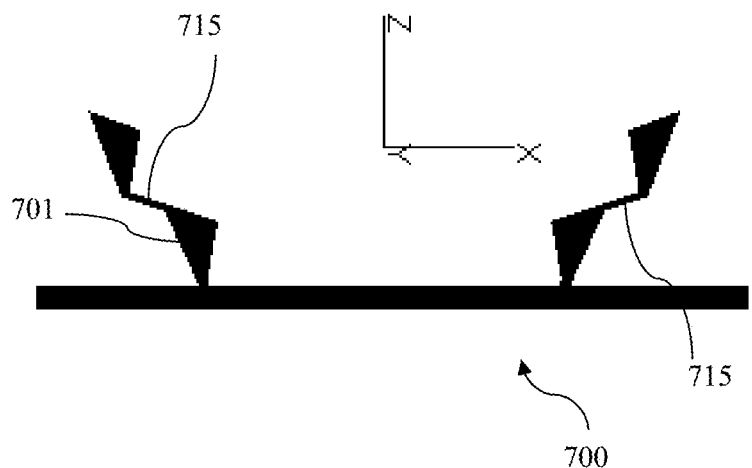
FIG. 7B represents a front view of another embodiment of a redirecting prismatic wall of the present disclosure.

In another embodiment as illustrated in FIG. 7B, adjacent elements 701 in the wall are joined by means of a connecting element 715 that connects the edge corresponding to the third angle of one prism element 701 with the edge corresponding to the second angle of another prism element 701.

Figure 8:
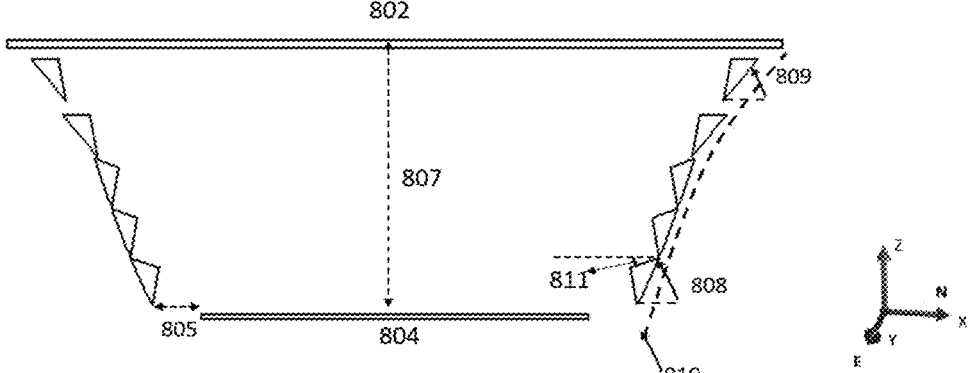
FIG. 8 shows a front view of an embodiment of the flared-out redirecting prismatic wall of the present disclosure.

In an aspect of the various embodiments, the incident surface of the redirecting prismatic wall units in FIG. 7A or FIG. 7B instead of being placed flat parallel to horizontal plane, are slightly tilted down with respect to the horizontal plane of the photovoltaic cell by specific angle in the clockwise direction. In other words, the wall has a plurality of redirecting prism elements arranged in a flared-out configuration with a plurality of levels each having a prism element, and the angle of flaring in per rising prism level is $+y°$ and thus, mounting angle of the $n^{th}$ prism level is $(x+ny)°$, where 'n' is the level counted above the base level and 'x' is the mounting angle 708 of the base level. In one embodiment, y degrees may be 2°, other embodiments with angles varying from 0° to 10° may be provided. FIG. 8 illustrates the flared-out configuration. In an exemplary embodiment the incident surface of the bottom most prism is kept at an incident surface tilt angle 811 of 17.6°. The incident surface angle 811 may be provided for increased exposure of the incident surface to the sunlight for the sunlight incident obliquely sideways on the incident surface.

Another example for 811 may be 15° and 22°. And in one embodiment, the mounting angle 808 is 65° and the angle 809 due to flaring out, is 49°.

The increasing mounting angles from lower level to upper level may cause the sunlight that might otherwise have been obstructed by the subsequent lower level to reach the photovoltaic cell 804. This may increase the efficiency of the light deflection wall assembly.

Figure 9:
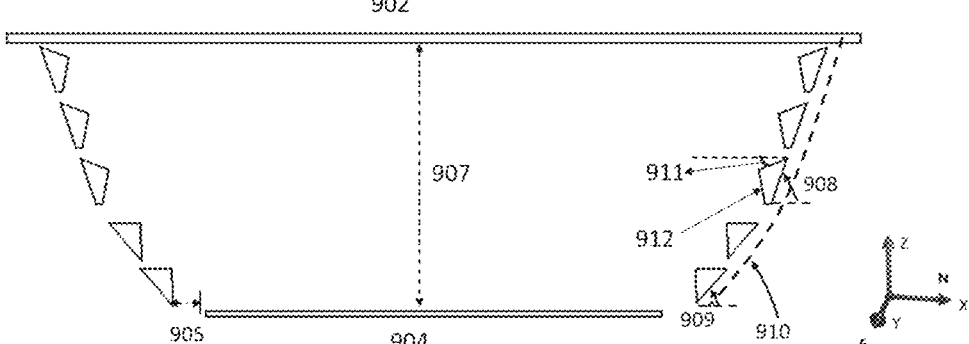
FIG. 9 shows a front view of an embodiment of the flared-in redirecting prismatic wall of the present disclosure.

Alternatively, the wall has a flared-in configuration, and the angle of flaring in per rising prism level is −y° and thus, mounting angle of the $n^{th}$ prism level is (x−ny)°, where 'n' is the level counted above 912 and 'x' is the mounting angle of the prism unit 912 shown by 908. FIG. 9 illustrates the flared-in configuration. In shown in FIG. 9, the incident surface tilt angle 911 is typically 17.6° and Another example for 911 may be 15° and 22°. And in one embodiment, the mounting 908 is 70° and the angle 909 due to flaring in, is 49°. In one embodiment y may be $2^0$ and is others varies from $0^0$ to $10°$.

In an embodiment, while the height of the redirecting prismatic wall unit of the present disclosure is kept constant, the parameter 'n', i.e., the number of prism levels, can be theoretically increased to a very large number. As a result, the thickness of an individual redirecting prism unit at every level can decrease to a very small magnitude. Such a significantly thin redirecting prismatic wall would have considerably low weight.

The redirecting prismatic wall units can also be stacked following a certain pattern of flare out or flare in structure when viewed from the front in order to segregate the seasonal handling of sunlight. In certain embodiment, one or more levels of redirecting prismatic wall units can be positioned at a different incident surface tilt angle 911 to improve the handling of sunlight that is incident perpendicular on the top glass 902.

The present disclosure further envisages a solar panel having a base, at least one solar radiation absorption device such as a photovoltaic cell and at least one redirecting prism in accordance with an embodiment as described above. The photovoltaic cell is fixed on the base. The redirecting prism is fixed on the base and is positioned adjacent to the photovoltaic cell. The redirecting prism is configured to redirect incident parallel rays of light towards the photovoltaic cell. The redirecting prism may be a singular prism element, or a redirecting prismatic wall as described above. The various embodiments have been illustrated through various Figures.

In a preferred embodiment, the solar panel comprises at least two redirecting prisms placed on the base along the opposite peripheral edges of the photovoltaic cell.

Each redirecting prism is fixed on the base to define a mounting angle between the redirecting surface and the plane of the base. The mounting angle is in the range of 60° to 70°.

Further, the redirecting prism is fixed on the base to provide an incident surface tilt angle between the incident surface and the plane of the base. The incident surface tilt angle is in the range of 15° to 22°.

Preferably, the solar panel is installed to have the redirecting prism oriented in an east-west direction with the misalignment from the east-west direction ranging from 0° to 30°.

Typically, in the northern hemisphere, the solar panel is installed with a southward tilt, wherein the angle of the southward tilt is equal to the latitude of the location. In contrast, in the southern hemisphere, the solar panel is installed with a northward tilt, wherein the angle of the northward tilt is equal to the latitude of the location.

As would be evident from the various illustrations, the solar panel has a row of photovoltaic cells and a pair of symmetrically mounted redirecting prisms in gabled formation fixed in the space between adjacent photovoltaic cells.

Further, each level of the redirecting prismatic wall unit in FIG. 7 may be optimally positioned at a specific mounting angle 708. In an exemplary embodiment, the 708 may be equal to 65° with respect to the horizontal plane of the photovoltaic cell.

As shown in FIG. 8, the various levels of redirecting prismatic wall unit may be stacked along a certain stacking pattern 810. In one embodiment the stacking pattern may be such that the bottom level is at a mounting angle of x degrees shown as 808, while the next upper levels are at an increasing angle of (x+y)° and (x+2y)° and so on. In one embodiment y degrees may be 2°, other embodiments with angles varying from 0° to 10° may be provided. Further levels (in this exemplary embodiment the upper two levels of redirecting prismatic wall units) may be flared wherein the redirecting surface of the top prism unit is kept at a decreased mounting angle 809 with respect to the horizontal plane to form a flare-out structure along the top. Hence, making the mounting angle of (x+3y−z), where z is the decrease in the mounting angle for the upper two levels. Also, the incident surface of the prism in the upper two levels are kept parallel to horizontal plane causing the incident surface tilt angle to be at 0°, to work best for sunlight during equinox. In an exemplary embodiment, the top two levels of redirecting prismatic wall unit may be kept at a mounting angle 809 of 49° with respect to the horizontal, while the bottom most prism unit has a mounting angle 808 of 65°.

FIG. 9 shows a front view of a redirecting prismatic wall assembly, consisting of a vertically stacked arrangement of five elongated redirecting prismatic units in a bowl like structure (alternatively referred to as flaring-in, occurring along the bottom). In FIG. 9, the various levels of redirecting prismatic wall unit may be stacked along a certain stacking pattern 910. In one embodiment the stacking pattern may be such that the prism unit 912 is at a mounting angle 908 of x°, while the next two upper levels are at a decreasing angle of (x−y)° and (x−2y)° respectively. In one embodiment y may be 2°, other embodiments with angles varying from 0° to 10° may be provided. In this exemplary embodiment the bottom most level of redirecting prismatic wall units may be flared in wherein the redirecting surface of the bottom prism is kept at a decreased mounting angle 909 with respect to the horizontal plane to form a flare-in or bowl-like structure along the bottom. Hence, making the mounting angle at (x−3y−z), where z is the decrease in the mounting angles for bottom most level. Also, the incident surface of the prism present in the bottom most level and one level above it are kept parallel to horizontal plane causing the incident surface tilt angle to be at 0°, to work best for sunlight during equinox. In an exemplary embodiment the bottom most levels of redirecting prismatic wall unit may be kept at a mounting angle 909 of 49°, while the topmost prism is kept at a mounting angle 908 of 71°.

Figure 10:
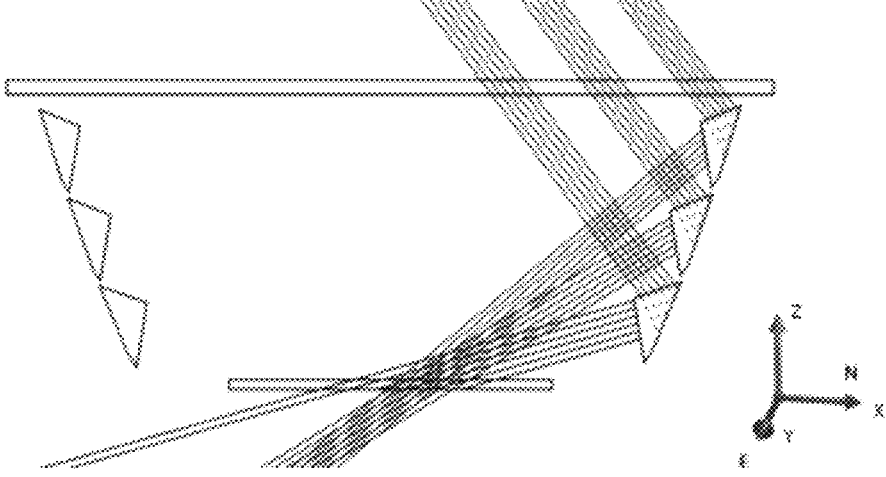
FIG. 10 shows a front view of one embodiment of a redirecting prismatic wall assembly illustrating the redirection capability of north redirecting prismatic wall for an early morning winter sun.

FIG. 10 shows a front view of one embodiment of a redirecting prismatic wall assembly illustrating the redirection capability of north redirecting prismatic wall for an early morning winter sun. Each level of redirecting prismatic wall unit redirects the winter sunlight on different regions of the photovoltaic cell 1004 lying below.

Figure 11:
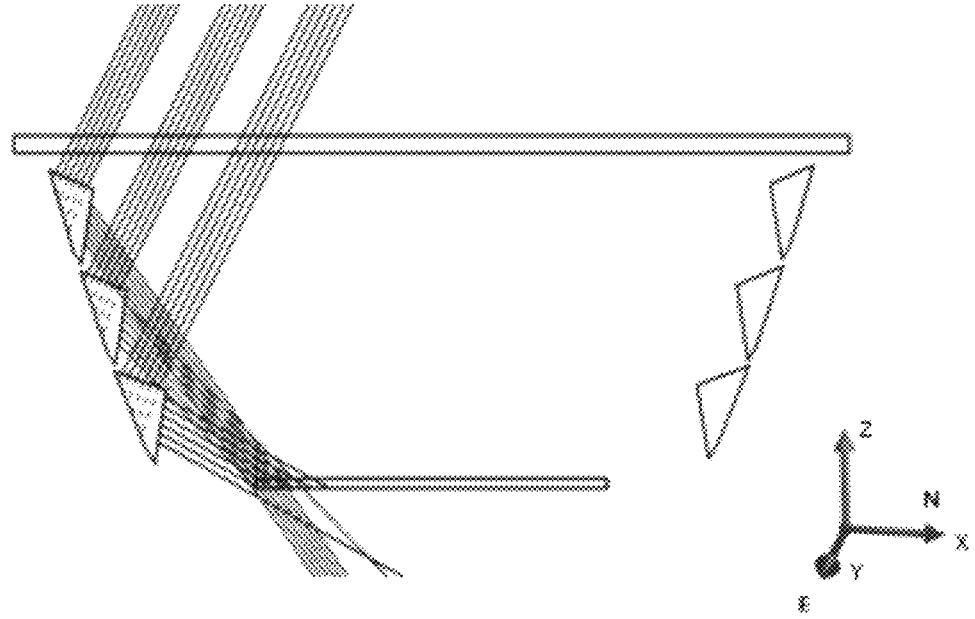
FIG. 11 shows a front view of one embodiment of a redirecting prismatic wall assembly illustrating the redirection capability of south redirecting prismatic wall for an early morning summer sun.

FIG. 11 shows a front view of one embodiment of a redirecting prismatic wall assembly illustrating the redirection capability of south redirecting prismatic wall for an early morning summer sun. The south redirecting prismatic wall may cater more to the summer sun while the north redirecting prismatic wall may cater more to the winter sun.

The north redirecting prismatic wall and South redirecting prismatic wall may be positioned after giving an extra gap 805 from the photovoltaic cell 804 to ensure that sunlight from the top glass 802 is not hindered by the redirecting prismatic wall units. The redirecting prismatic wall units are positioned on the either side of the series of photovoltaic cells that are placed continuously in the East to West direction. The placement in east to west terminology may not necessarily mean that the redirecting prismatic wall units are placed on exact east to west direction. Rather, they might be misaligned from east-west by 0° to 30°.

Figure 12:
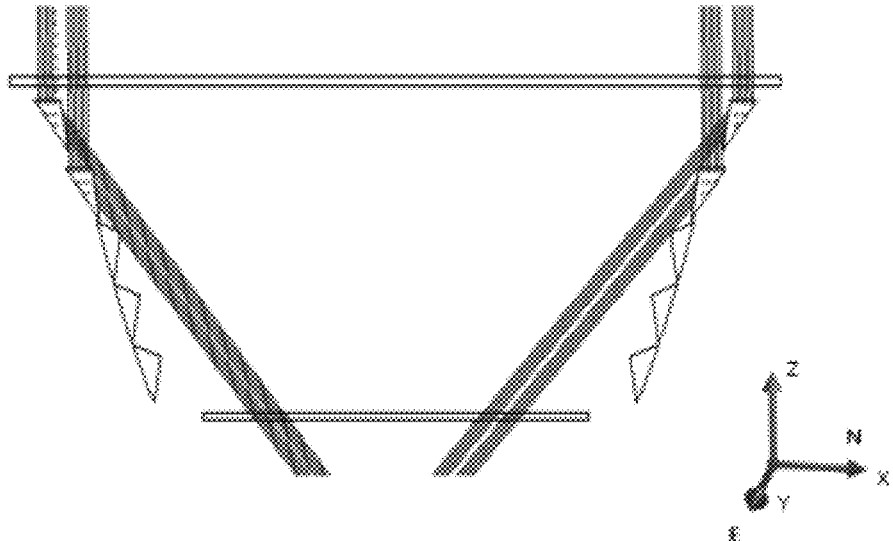
FIG. 12 shows a front view of a redirecting prismatic wall assembly, illustrating the redirection capability of the top two levels of the south and north redirecting prismatic wall for an early morning equinox sun.

FIG. 12 shows a front view of a redirecting prismatic wall assembly, consisting of a vertically stacked arrangement of five elongated redirecting prismatic units in a flare-out from the top structure, illustrating the redirection capability of the top two levels of the south and north redirecting prismatic wall for an early morning equinox sun when the sun hits the redirecting prismatic wall perpendicularly. This design is efficient for sunlight falling in perpendicular direction on the redirecting prismatic wall.

As a single level of the redirecting prismatic wall unit cannot be designed to cater equally well for winter and equinox sun, the levels of the prisms can be separated to cater to different seasons. The flaring in at the bottom captures the equinox sunshine which fails to get redirected from the upper levels. There can be other specialized embodiments possible when stacking the redirecting prismatic wall units one above the other to any number of levels to assume flare in, flare out or any other curvilinear shape possible to give seasonal improvement as against annual improvements for the better redirection of sunlight towards the photovoltaic cell.

FIGS. 13A-C show the exploded view of a secondary redirecting profile on a single triangular protrusion pattern as per an embodiment herein. This view shows the secondary redirecting profile defined by a serrated profile or ridges (which may be used interchangeably) present in the triangular protrusion on a transmitting surface of a redirecting prismatic wall. The various surfaces of the light redirecting prism are represented in FIG. 13A by 1301 (incident surface), 1302 (redirecting surface), 1303 (truncated surface), and 1304 (transmitting surface). The transmitting surface 1304 consist of two regions 1306 which is plain and 1307 which is formed by co-joining surfaces 1308 and 1309. The serrated profile 1309 consists of three V-shaped steps co-joined to form a staircase pattern. The triangular protrusion 1308 may be attached to the flat surface 1304. The angle 1310 dictates how much this triangle may be protruded. As shown in FIG. 13B, the angle 1311 of part 1309 plays a critical role in ensuring the exiting TIR ray from 1302 exits the redirecting prismatic wall unit towards the photovoltaic cell during equinox. One exemplary embodiment of 1311 is 35°. Various other exemplary ranges may exist: (exemplarily 30°-40°). FIG. 13C further which shows the complete formation of a single triangular protrusion with serrated profile in the lower region of the transmitting surface of the redirecting prismatic wall. The 1312 is the lower region of the redirecting prismatic wall unit which may be responsible for efficient redirection of the sunlight coming from 1302 towards the photovoltaic cell. 1312 is formed by superimposing part 1309 over 1308. The part 1312 is a single triangular protrusion on the transmitting surface which has the secondary redirecting profile defined by three ridges.

FIG. 14A shows the ray tracing of equinox in a front view of redirecting prismatic wall unit. FIG. 14B shows the redirection of equinox sun by serrated profile or ridges of the redirecting prismatic wall units. The equinox sun incident on 1403 undergoes TIR at 1402 (redirecting surface) and exits the redirecting prismatic wall at 1404 (transmitting surface). FIG. 14A shows an embodiment that has a completely flat and plain transmitting surface 1404 without any secondary redirecting profile. As seen in FIG. 14A, in the absence of the secondary redirecting profile, the sunrays that have undergone total internal reflection at 1402 fail to fall on the photovoltaic cell 1401 and may be thus wasted as it falls downward in the shadow region of the prism. But in FIG. 14B we see that the serrated profile 1405 on 1404 helps in steering the redirected sunrays towards the photovoltaic cell 1401, thereby increasing the module efficiency. FIG. 14C shows a closeup view of TIR happening at 1402 surface and how 1405 helps in steering the sunlight towards the 1401.

The view 1 of FIG. 14D shows the ray tracing of equinox sun in a top view of a redirecting prismatic wall unit with a transmitting surface that is plain without any secondary redirecting profile as per an embodiment herein. The south and north redirecting prismatic wall units (1409 and 1408 respectively) may be configured to redirect light towards the photovoltaic cell 1401. An equinox sunlight may fall on 1409 at the point 1403 and fails to fall on 1401 after redirection and instead falls at a faraway photovoltaic cell at point 1404. The displacement distance of the redirected sunlight in direction B is 1405. Similarly, in view 2 of FIG. 14D shows redirecting prismatic wall unit 1409 with the secondary redirecting profile defined by a triangular protrusion provided with a serrated profile marked by 1410. The south and north redirecting prismatic wall units (1409 and 1408 respectively) may be configured to redirect light towards the photovoltaic cell 1401. It shows an equinox sunlight falls on 1409 at the point 1403 and gets redirected and is incident at the point 1406 that lies on 1401. The redirected sunlight in direction B may have a displacement distance 1407. The displacement distance 1407 may be lesser than 1405. Thus, redirecting prismatic wall with triangular protrusion wave pattern reduces the need for redirecting prismatic wall unit extension in the East-West direction and saves precious space.

Figure 14E:
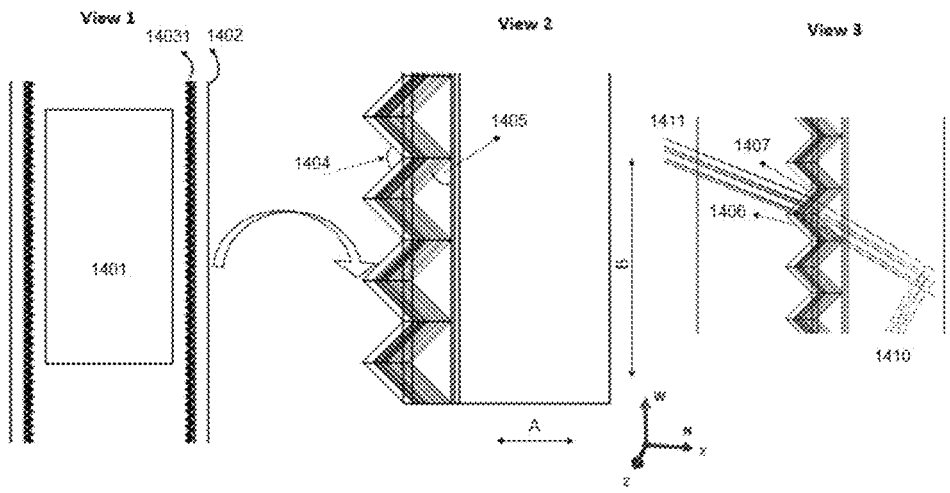

The top view 1 of FIG. 14E is one embodiment of a redirecting prism with a secondary redirecting profile 1403 that forms a triangular wave pattern (in Direction B i.e., East-West) at the transmitting surface facing the photovoltaic cell 1401 thereof.

The view 2 of FIG. 14E shows the magnified view of the triangular protrusions when viewed from top. As shown in view 3 of FIG. 14E, the triangular protrusions may have two surfaces (1406 and 1407). The triangular protrusion makes a critical angle of 45° as indicated by 1405. Various other ranges may exist: (exemplarily 40°-50°). The angle between two triangular protrusion is 90° in one embodiment as indicated by 1404. Various other ranges may exist: (exemplarily 85°-95°). The critical angle 1405 is required to ensure that a winter sunray 1410 moves parallel to the surface 1406 before hitting surface 1407. In one embodiment, the angle 1405 may be 45°. This configuration of the angle also ensures that winter morning sunlight is incident mainly on 1407 before exiting 1402 and a winter afternoon sunlight is incident mainly on 1406 before exiting 1402. Thus, the angle of 1405 expands the acceptance range of azimuth angles handled by redirecting prismatic wall unit in a day which is morning sunlight azimuth of 80-100° and evening sunlight azimuth of 260-280°.

FIG. 14A-E illustrates the significance of having a secondary redirecting profile on the transmitting surface of redirecting prismatic wall 1402 that help better steering of sunlight towards photovoltaic cell 1401, as per an embodiment herein. The secondary redirecting profile forms a triangular wave like pattern running from East to West direction and contains three operative ridges or serrated profile present on the triangular protrusion of the transmitting surface as viewed in FIGS. 14A-C. The embodiment enables efficient steering of sunlight towards 1401 for all seasons.

FIGS. 15A-C show the exploded view of another embodiment herein of a secondary redirecting profile that is provided on the transmitting surface. This view clearly shows the multiple ridges present on the triangular protrusion shown in FIG. 14. The various surfaces of the redirecting prismatic wall are represented in FIG. 15A by 1501 (incident surface), 1502 (redirecting surface), 1503 (truncated surface), and 1504 (transmitting surface). The ridges run though the length 1506 of 1504 and is formed by co-joining surfaces 1508 and 1509. The part 1509 which we call as ridges or serrated profile consists of six V-shaped steps co-joined to form a staircase pattern. The part 1508 is triangular protrusion attached to the transmitting surface 1504. The angle 1505 may be used to configure the triangular protrusions. This has elements similar to that explained in reference to FIG. 13A-C. In one exemplary embodiment, the angle 1505 may be 45°. As shown in FIG. 15B, an important angle of the secondary redirecting profile in the lower region 1514 is 1510 and this plays a critical role in ensuring that equinox sunlight is steered towards the photovoltaic cell. In one exemplary embodiment 1510 may be 35°. Various other ranges of 1510 may exist: (exemplarily 30°-40°). The ridges configured using angle 1510 however may not cater well to the other seasons. The ridges in the secondary redirecting profile in the middle region 1513 may have a different angle 1515. The ridges configured with this angle plays a critical role in ensuring that sunlight for months other than equinox and winter is steered towards 1501 effectively. In one exemplary embodiment 1511 is 10°. Various other ranges of 1511 may exist: (exemplarily 5°-15°).

The FIG. 15C further shows the complete formation of a secondary redirecting profile with ridges running through the length 1506 of the transmitting surface of the redirecting prism as per an embodiment herein. The 1512 is the topmost region of the redirecting prism which does not contain secondary redirecting profile or any superimposed part 1509 and this region is responsible for efficient steering of winter sunlight towards the photovoltaic cell. The 1514 is the lower region of the redirecting prismatic wall unit which is responsible for efficient steering of equinox sunlight towards the photovoltaic cell. The 1513 is the middle region of the redirecting prismatic wall unit which is responsible for efficient redirection of all sunlight for the rest of the year aside from equinox months and winter/summer towards the photovoltaic cell. The secondary redirecting profile shown in FIG. 15C may be similar to the one explained in reference to FIG. 13C.

FIG. 16A shows the ray tracing of equinox in a front view of redirecting prismatic wall unit as per an embodiment herein. The equinox sun incident on 1603 undergoes TIR at 1602 (redirecting surface) and exits the redirecting prismatic wall at 1604 (transmitting surface) and falls on photovoltaic cell 1601. As seen in FIG. 16A, the concentrating profile on 1605 help in steering the redirected sunrays towards the photovoltaic cell 1601 optimally for equinox month, thereby increasing the module efficiency. Both redirecting prism units may participate in steering the equinox sunlight towards 1601. FIG. 16B shows the zoomed view of the TIR happening at 1602 for an equinox sun and how the redirected rays exit from the lower region 1606 towards 1601. FIG. 16C shows a closeup view of TIR of winter sunlight happening at 1602 surface and how the serrated profile in the upper and middle region (1607) helps in pushing the sunlight towards the 1601.

FIGS. 17A-C show the exploded view of another secondary redirecting profile shown in FIGS. 15A-C as per an embodiment herein. This view in FIG. 17A clearly shows the multiple ridges 1709 present on the triangular protrusion 1708. The various surfaces of the redirecting prismatic wall are represented in FIG. 17A by 1701 (incident surface), 1702 (redirecting surface), 1703 (truncated surface), and 1704 (transmitting surface). The ridges run though the length 1706 of 1704 and is formed by co-joining surfaces 1708 and 1709. The part 1709, which is termed as ridges, consists of four V-shaped steps co-joined to form a staircase like pattern. The part 1708 is triangular protrusion of the transmitting surface 1704. The angle 1705 helps configuring the extension of protrusion. In one exemplary embodiment the angle 1705 may be 45°. Various other ranges may exist: (exemplarily 40°-50°). As shown in FIG. 17B, an important angle of the ridges in the lower region 1717 is 1710 and this plays a critical role in ensuring that equinox sunlight is steered towards 1704. In one exemplary embodiment of 1710 may be 35°. Various other exemplary ranges may exist: (30°-40°). The ridges with angle 1710 however may not provide desired results for other seasons. A different angle 1711 for the ridges in the middle region 1713 may thus be configured and these contain different angle 1711 to ensure that sunlight for months other than equinox and winter is steered towards the photovoltaic cell effectively. In one exemplary embodiment 1711 may be 5°. Various other ranges may exist: (exemplarily 1°-10°). The FIG. 17C further shows the complete formation of a secondary redirecting profile with ridges running through the length 1706 of the transmitting surface of the redirecting prism. The 1712 is the topmost region of the redirecting prismatic wall unit in one embodiment may not contain a secondary redirecting profile and this region is responsible for efficient steering of winter sunlight towards 1704. The 1717 is the lower region of the redirecting prism which is responsible for efficient steering of equinox sunlight towards 1704. The 1713 is the middle region of the redirecting prismatic wall unit which is responsible for efficient redirection of all sunlight for the rest of the year aside from equinox months and winter towards 1704.

Figures 18A, 18B, 18C, 18D:
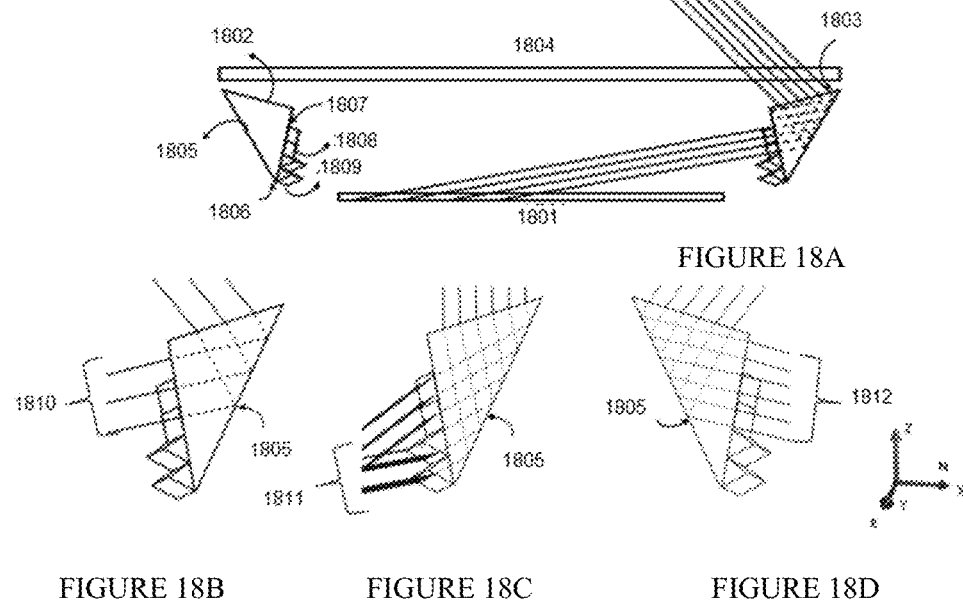

FIG. 18A shows redirection of winter sunlight in an embodiment of redirecting prismatic wall as per an embodiment herein. 1802 is the south redirecting prismatic wall unit and 1803 is the north redirecting prismatic wall unit. The north redirecting prismatic wall unit 1803 may be primarily responsible for steering the winter sunlight towards the photovoltaic cell 1801. The various surface of 1803 is represented in FIG. 18A by 1805 (redirecting surface), 1806 (truncated surface), and 1807 (transmitting surface) which has a secondary redirecting profile which consists of two ridges 1808 and 1809. FIG. 18B-D shows closeup view of the secondary redirecting profile in an embodiment of redirecting prism handling all seasons. FIG. 18B shows the ray tracing of winter sun inside 1803. The winter sunlight falls on the redirecting surface 1805 and undergoes TIR here and falls on the upper portion 1807 of the transmitting surface of redirecting prism which is left plain without secondary redirecting profile. This is configured for the winter sunlight which exits redirecting prism as denoted by rays named 1810. FIG. 18C shows the redirection of equinox sun by concentrating profile present in the lower region 1809 of 1803. Both the redirecting prisms 1802 and 1803 participate in the redirection of the equinox sunlight. The equinox sunlight undergoes TIR at 1805 (redirecting surface) and exits the transmitting rays as denoted by rays named 1811. FIG. 18D shows the ray tracing of summer sunlight inside 1802. The upper portion 1807 of the transmitting surface of redirecting prism which is left plain without a secondary redirecting profile is configured to cater to the summer sunlight and falls on the photovoltaic cell as denoted by rays named 1812, thereby increasing the module efficiency. The ridges of the secondary redirecting profile present in the middle region 1808 may be configured to cater to all other seasons except equinox, summer, and winter months. However, as seen in FIG. 18B-D it also handles some days of equinox and winter/summer months to steer sunlight towards the photovoltaic cell.

The FIGS. 19A-C shows the top view of light redirection done by the secondary redirecting profile present on the transmitting surface of the light redirecting prism. FIG. 19A as per an embodiment shows the top view of one embodiment of a redirecting prismatic wall assembly 1902 with a concentrating profile 1903 on the transmitting surface that forms a semi-circular wave pattern (in direction B i.e., East-West) when viewed from the top. Although the semi-cylindrical concentrating profile has a convex shape and acts as a concentrating lens, the focal point of the redirected sunlight is midway in the space between the prism and the photovoltaic cell. Thus, only redirected sunlight reaches the photovoltaic cell in a diffused fashion and there is no concentration of sunlight on the photovoltaic cell.

FIG. 19B shows the exploded view of the same concentrating profile 1903 shown in view 1 as per an embodiment herein. The concentrating profile has a semi-cylindrical protrusion shape. 1904 dictates the degree of protrusion (bulge) of the concentrating profile. This is dictated by the location of the operative vertical axis of semicylindrical protrusion and in the said embodiment it is parallel to the transmitting surface.

In one exemplary embodiment this distance 1904 is 4 mm. Various other ranges may exist: (exemplarily 0.1-6 mm). We can have a placement gap between two adjacent semi-cylindrical protrusion denoted as 1905. This may help to ensure that a ray exiting from one semicylindrical protrusion does not fall on the neighboring one. One exemplary embodiment of 1905 is 1 mm. Various other ranges may exist: (exemplarily 0.1-5 mm). 1906 is the diameter of the shape 1903. One exemplary embodiment of 1906 is 10 mm. Various other exemplary ranges may exist: (0.1-20 mm).

FIG. 19C shows the redirection of equinox sunray by 1903 as per an embodiment herein. We see that the sunlight incident at point 1907 on the semicylindrical concentrating profile is steered towards point 1908 that lies on the pho-tovoltaic cell 1901. There is only slight vertical displacement of 1909 from the point 1907 to 1908 measured in direction B. Thus, the semi-cylindrical protrusions help in steering the sunlight effectively towards 1901 at the closest point with respect to the transmitting surface of the redi-recting prism and minimizes the extra area requirement in the East-West direction for redirection.

FIGS. 20A-C show the exploded view of the semi-cylindrical concentrating profile embedded on the transmit-ting surface of the redirecting prism as per an embodiment herein. FIG. 20A shows the various surface of the redirect-ing prismatic wall are represented in FIG. 20A by 2001 (incident surface), 2002 (redirecting surface), 2012 (trun-cated surface) and 2004 (transmitting surface). An angle AA is defined between the incident surface 2001 and the redi-recting surface 2002. An angle BA1 is defined between the redirecting surface 2002 and the transmitting surface 2004. An angle BA2 is defined between the incident surface 2001 and the transmitting surface 2004. The transmitting surface 2004 of the redirecting prism has a composite convex profile consisting of three regions, the upper region 2010 which is a flat portion, a first curvature in an operative top portion 2006 which is a semicylindrical profile and acts as a con-centrating profile and a second curvature in an operative bottom portion 2005 which is a protrusion of the transmit-ting surface shown by 2008 and this region acts as a secondary redirecting profile. The part 2009 is superimposed in the upper region 2006 of the transmitting surface. The resultant assembled shape of redirecting prism is shown in FIG. 20B. The concentrating profile spans at least an upper part of the 2006 and extending upto an operative upper edge of the transmitting surface denoted by 2010. The concen-trating profile comprises operatively vertical flutings or operatively vertical reedings.

In one exemplary embodiment in FIG. 20B, there is a gap of 2010 for the concentrating profile as measured from 2001. This gap, for placing the semi-cylindrical protrusion on 2005, is given to allow the winter sunlight to exit uninter-rupted towards the photovoltaic cell. 2011 is the height of the semi-cylindrical protrusion. There can be various embodiments of height of 2011 which can extend towards 2001 or may extend downward towards 2005. The FIG. 20C shows the side view of the redirecting prism with a concen-trating profile shown in FIG. 20B. 2013 is the angle of the second curvature that exist on the transmitting surface. 2013 is the angle between the two surfaces 2008 and 2012. This angle ensures that the equinox sunlight that undergoes TIR at 2002 is steered towards the photovoltaic cell. One exem-plary embodiment of 2013 is 105°. Various other ranges may exist: (exemplarily 100°-110°).

FIG. 21A shows redirection of winter sunlight in an embodiment of redirecting prism as per an embodiment herein. 2103 is the south redirecting prism and 2104 is the north redirecting prism. Ray tracing inside the 2104 which is primarily responsible for steering the winter sunlight towards the photovoltaic cell 2101 may be seen. The various surfaces of 2104 are represented in FIG. 21A by 2105 (redirecting surface), 2106 (truncated surface), and 2108 is the semicylindrical concentrating profile on the transmitting surface. FIG. 21B-C shows closeup view of semicylindrical protrusion in an embodiment of redirecting prism handling all seasons. FIG. 21B shows the ray tracing of winter sun inside 2104. The winter sunlight falls on the redirecting surface 2105 and undergoes TIR here and falls on 2108 which steers it towards the photovoltaic cell. The rays exiting 2108 are shown as 2109 in FIG. 21B. FIG. 21C shows the redirection of equinox sun by the concentrating profile of 2104. Both the redirecting prism units 2103 and 2104 participate in the redirection of the equinox sunlight. The equinox sunlight undergoes TIR at 2105 (redirecting surface) and exits 2104 and is steered towards 2101 as denoted by rays named 2111.

FIGS. 22A-C shows a new embodiment of secondary redirecting surface which is concave in shape and is a diverging profile on the transmitting surface of the redirecting prism. FIGS. 22A-C show the exploded view of the semi-cylindrical depression carved on the redirecting prism as per an embodiment herein. FIG. 22A shows the various surface of the redirecting prismatic wall are represented in FIG. 22A by 2201 (incident surface), 2202 (redirecting surface), 2212 (truncated surface) and 2204 (transmitting surface). The transmitting surface 2204 has a diverging profile consisting of three regions: the lower region 2205 which is a protrusion of the transmitting surface denoted by 2208, the middle region 2206 having a diverging profile and the upper region 2210 which has a flat surface.

The diverging profile spans at least an upper part of the 2206 and extending upto an operative upper edge of the transmitting surface denoted by 2010. The diverging profile comprises operatively vertical depressions or operatively vertical reedings. The depressions on 2206 is created by subtracting a volume equal to the block volume 2209 from the upper region 2206 of 2204. The resultant assembled shape of diverging profile is shown in FIG. 22B. 2210 is the distance of the semi-cylindrical diverging profile as measured from 2201. This gap to place the semi-cylindrical depression on 2205 helps to ensure that the winter sunlight falls on the photovoltaic cell in an uninterrupted manner and is not obstructed by the depression made. 2211 is the height of the semicylindrical depression created. There can be various embodiments wherein the depression unit 2209 may extend upwards towards surface 2201 or may extend downward towards 2205. The FIG. 22C shows the side view of the diverging profile on the transmitting surface shown in FIG. 22B. 2213 is the angle between the two surfaces 2208 and 2212. This may help ensure that the equinox sunlight that undergoes TIR at 2202 is steered towards the photovoltaic cell. This is enabled by the presence of the obtuse angle 2213. In one exemplary embodiment 2213 may be 105°. Various other ranges may exist: (exemplary 100°-110°). FIGS. 23A-B shows the top of the concentrating profile explained in FIG. 22. As seen in the top view, the FIG. 23A shows the top view of one embodiment of a redirecting prismatic wall assembly 2302 with depressions on the transmitting surface that forms a semicircular wave pattern (in direction B exemplarily East-West) on the transmitting surface facing the photovoltaic cell 2301 thereof, as per an embodiment herein.

FIG. 23B shows the magnified view of the same semicylindrical depression 2303 shown in FIG. 23A. The radius of the semi-cylindrical depression 2304 dictates the depth of the semi-cylindrical depression. This is dictated by axis of the shape 2303. In the said embodiment the operative vertical axis of the semicylindrical depression is parallel to the transmitting surface of the redirecting prism. 2304 is the radius of the shape 2303 and in one exemplary embodiment this is 4 mm. Various other ranges may exist: (exemplarily 0.1-6 mm). 2306 is the gap between two adjacent semicylindrical depression which helps ensure that a ray exiting from one semicylindrical depression does not fall on the neighboring one. One exemplary embodiment of 2306 is 1 mm. Various other exemplary ranges may exist: (0.1-5 mm). 2305 is the sum of diameter of the shape 2303 and neighbor gap 2306 as viewed from the top. In one exemplary embodiment of 2305 is 10 mm. Various other ranges may exist: (exemplary 0.1-20 mm). Depending on various factors including efficiency and manufacturing capability the depression on the transmitting surface can be made of varying radius.

Thus, optimal surface topography for the secondary redirecting profile on the transmitting surface or the redirecting surface of the light redirecting unit can be made such that light is redirected maximally to the photovoltaic cell by TIR. In various embodiments, the TIR sunlight reaches the photovoltaic cell effectively and there by increases the solar panel energy generation.

As a person in the field of art may realize, a redirecting prism with a secondary redirecting profile (ridges) enables a single light deflection unit to work for the largest possible azimuth range of the incident sunlight, i.e., it can effectively handle sunlight for various seasons across the year, namely, summer, winter and equinox. This saves the need to handle different seasons with separate dedicated units of light redirecting prism and effectively saves extra cost and extra area required.

In a less preferred embodiment, which is illustrated in FIG. 24, the redirecting prism of the present disclosure is configured on the periphery of a photovoltaic cell array of a solar panel, wherein the redirecting prism and the photovoltaic cell are enclosed inside a glass box that has a flat glass on the top and a glass wall that runs through the periphery of the solar panel, wherein one or more redirecting prisms are supported on the east-west sides of the glass box. However, presence of an enclosure leads to accumulation of heat due to Greenhouse effect. Due to excessive heating of the photovoltaic cells enclosed therein, over a period, the efficiency of the photovoltaic cells drops.

FIG. 24 shows an arrangement of a solar panel with redirecting prism wall assembly where in the entire unit 2400 is an enclosed model inside a glass box such that side wall 2403 runs all through the boundary of the solar panel as a single enclosing glass wall. According to this embodiment, two parallel and symmetrical redirecting prismatic walls are placed on either side of a photovoltaic cell 2404 that form a gabled formation fixed in the space between adjacent rows of photovoltaic cells. The redirecting prismatic wall placed in the north direction referred to be 'North redirecting prismatic wall' 2402 henceforth and the other in south direction referred to be 'South redirecting prismatic wall' 2401 henceforth. The North redirecting prismatic wall and South redirecting prismatic wall terminology may not necessarily mean that that wall assembly is placed on exact north or exact south. Rather, they might cover north-west, north-east, and southeast and south-west or directions between them, respectively. Furthermore, each redirecting prismatic wall may comprise one or more redirecting prismatic wall units (redirecting prismatic wall unit). For example, the FIG. 24 shows an embodiment with three such units and it can have any of the secondary redirecting profiles as described in FIG. 13, 15 17, 21, 23 or any variation of these embodiments described herein.

Referring to FIG. 24, the top glass 2405 is placed at a height equal to the height of the redirecting prismatic wall 2401 in such a manner that the top of the solar panel has a flat surface like the existing traditional solar panel. Also, 2405 may be configured to be of an area (in an exemplary embodiment being two times) more than that of the conventional panel. Furthermore, with increasing number of levels of the redirecting prismatic wall units we can increase the efficiency of the solar module, but this also increases the area of the top glass needed as an enclosure may also increase correspondingly.

Preferably, the mounting angle between the transmitting surface of each redirecting prism wall and the surface of the base of the solar panel is in the range of 60°-70°. In an embodiment, the ratio of the width of the incident surface to the width of the redirecting surface is in the range of 1:1.1 to 1:2. Preferably, the ratio of the gap between the peripheral edge of photovoltaic cell closer to the redirecting prism and the vertex of the truncated redirecting prism base that is closer to the photovoltaic cell is 0-15% of the width of a photovoltaic cell, and the gap is generally 10 mm wide. A top glass 2405 may be present over the redirecting prismatic wall or can be placed just above the photovoltaic cell. When being assembled into an integrated solar panel assembly, a glass sidewall 2403 may run through a boundary and may seal the integrated solar panel assembly to prevent penetration of air or dust or moisture. The photovoltaic cell 2404 is encapsulated between two layers of encapsulant sheet like Ethylene Vinyl Acetate (EVA), Polyolefin Elastomer Based (POE) alternatives, Poly Vinyl Butyral (PVB) or Silicone based and may be glued to the bottom glass 2406. In one embodiment, the top glass 2405 is present directly above the photovoltaic cell 2404 which actually is sandwiched between two encapsulants. The north redirecting prismatic wall and south redirecting prismatic wall creates a certain height gap equal to the length of the side wall 2403 between the photovoltaic cell 2404 and the top glass 2405 as shown in FIG. 24. In order to compensate for the cosine losses in the sunlight introduced by the height, an extra gap 2407 may be provided as shown in FIG. 24. This extra gap ensures that the sunlight falling from an oblique incident angle on the top glass can directly illuminate the photovoltaic cell without being hindered by the redirecting prismatic wall. Even though the figure shows, for a clarity purpose, a single photovoltaic cell 2404 located only in the middle of the integrated panel 2400, a person skilled in the art may realize that the photovoltaic cell 2404 may be extend along the length of the integrated solar panel assembly as shown in subsequent figures. Further, the photovoltaic cell may be replaced by other solar energy absorption devices.

In a preferred embodiment, which is illustrated in FIG. 25, the redirecting prism of the present disclosure is configured on the periphery of a photovoltaic cell array of a solar panel and is mounted on either side of a photovoltaic cell array by means of a sealant or clamps and is configured to directly receive the incident sunlight and redirect towards the photovoltaic cell array. Such an arrangement is more preferred due to the significant heat dissipation by air provided by the open configuration of the solar panel and due to absence of Greenhouse effect that is detrimental to the performance of solar panels with glass enclosures. Furthermore, saving in weight and cost is achieved by avoiding the use of bulky and costly glass enclosure having glass top and glass side walls.

FIG. 25 represents a front view of one embodiment of a redirecting prismatic wall assembly 2500 arranged in an open wing configuration to easily dissipate heat generated from the photovoltaic cells. According to this embodiment, redirecting prismatic wall units 2501 (south redirecting prism wall) and 2502 (north redirecting prism wall) are placed on the either side of a photovoltaic cell 2505. The element 2504 is sandwiched between the top glass 2504 and a bottom glass 2506. It should be noted that 2506 can be a solar glass or toughened float glass or even a back sheet like Tedlar as per the solar panel manufacturer's choice.

A top glass 2504 may be present over the redirecting prismatic wall or can be placed just above the photovoltaic cell. When 2504 is placed directly above 2505 as shown in this embodiment, it avoids the heat built inside the photovoltaic cell and the heat is dissipated into the atmosphere and this can significantly improve the performance of solar panel or other solar energy applications. And the redirecting prismatic wall units 2501 and 2502 are attached to 2504, which ensures sufficient air circulation above the top glass and reduces the surface module temperature. 2501 and 2502 can be attached to 2504 by means of mounting elements like clamps or by gluing to it.

The photovoltaic cell 2505 is encapsulated between two layers of encapsulant sheet like Ethylene Vinyl Acetate (EVA), Polyolefin Elastomer Based (POE) alternatives, Poly Vinyl Butyral (PVB) or Silicone based and may be glued to the bottom glass 2506. In one embodiment the top glass 2504 is present directly above 2505 which in turn is sandwiched between two encapsulant sheets. Even though the front view of the figure shows a single photovoltaic cell 2505 located only in the middle of the integrated panel 2500, a person skilled in the art may realize that the photovoltaic cell 2505 may be extended along the length of the integrated solar panel assembly as shown in subsequent figures. Further, the photovoltaic cell may be replaced by other solar energy absorption devices.

FIG. 26 shows a close-up front view of one embodiment of a redirecting prismatic wall assembly 2600 for two photovoltaic cell arrays as per an embodiment here in. There are two sets of redirecting prismatic wall units: Set 1 (2601 and 2602) and Set 2 (2609 and 2610) placed on either side of the photovoltaic cell array. 2604 is the photovoltaic cell that is sandwiched between the top glass 2605 and a bottom glass 2606. It should be noted that the length of 2606 and 2605 is for the span as denoted by 2611. The hollow air gap that exists between 2602 and 2609 is denoted by 2607. The glass piece 2608 is introduced for electrical interconnection connecting two adjacent photovoltaic cell array, and is not present along the length of the photovoltaic cell array. The length of 2608 is denoted by 2612 and the width of 2608 is in the range of 5-20 mm.

FIG. 27A shows the cross-sectional view of one embodiment for a solar panel configuration of 12×6 with 72 half cut photovoltaic cells. As seen in the figure, the photovoltaic cell denoted by 2701 are laid in a continuous manner in the East-West direction. There exist six rows of photovoltaic cell array, where every row consists of twelve photovoltaic cells. Every row of photovoltaic cell array has a pair of redirecting prism wall units placed on its either side. The peripheral redirecting prismatic wall is 2702 and 2704 which are single light redirecting prism units that exist for the boundary photovoltaic cell array and in the middle, there exists a pair of redirecting prismatic wall units that form a gabled arrangement in space as shown by 2703. Every row of 2701 is interspersed with 2703. FIG. 27B, shows the exploded cross-sectional view of the same embodiment to better understand the gabled arrangement of 2703. As seen here, when two redirecting prismatic wall units in the middle region are joined, they form a gabled arrangement and 2705 is the air gap that exists between them. This allows for easy air flow in the panel and enables better heat dissipation in the photovoltaic cells and always keeps the module temperature lower and thereby improves the solar panel efficiency. The glass piece 2707 is the slight extension of the glass created in the East-West direction given for electrical busbar interconnection to move from one photovoltaic cell row 2708 to another photovoltaic cell row 2709. The length of 2707 is denoted by 2711 and width of this is in the range of 5-20 mm.

FIG. 28 shows the cross-sectional view of one embodiment for a solar panel with a single photovoltaic cell array and a redirecting prismatic wall unit on either side. In this embodiment, twelve photovoltaic cells denoted by 2801 are placed continuously in the East-West direction and redirecting prismatic wall units denoted by 2802 and 2803 are placed on either side of 2801. 2801 is sandwiched between two layers of glass for protection against environmental degradations.

FIG. 29 shows the top view of one embodiment for a solar panel with 72 half cut photovoltaic cells laid in 12×6 configuration. The photovoltaic cells are denoted by 2902 are laid continuously in the East-West direction. The electrical busbar connection for the solar panel denoted by 2901 runs over the photovoltaic cells 2902. The redirecting prism wall units denoted by 2903 are placed on either side of the 2902. The photovoltaic cells 2902 are connected in serial fashion and 2901 is '−' lead and 2904 is the '+' ve lead. 2905 is an area extension of the top glass in the East-West direction where electrical busbars of one row are interconnected to another. The width of glass area 2905 is denoted by 2906 and the length of 2905 is denoted by 2907.

Thus, the placement of redirecting prismatic wall assembly above the top glass in an efficient arrangement which results in cooler module temperature has been discussed hereinabove. In various embodiments, the TIR sunlight from the redirecting prismatic wall assembly reaches the photovoltaic cell effectively and thereby increases the module energy generation capacity. Also, a redirecting prismatic wall can consist of one or more levels of redirecting prismatic wall units that are vertically stacked one above other to increase the light gathering capacity of a solar module. The redirecting prismatic wall embodiment shown here is a representative one the several embodiments discussed from FIG. 1 to FIG. 28.

Also envisaged as an aspect of the present disclosure, is a motionless optical unit for redirecting sunlight using total internal reflection in a solar panel having an array of solar cells, an integrated solar panel, a system and method thereof is described. In one embodiment arrays of elongated deflector units are placed along the length of solar cell arrays and configured to direct sunlight using total internal reflection to the solar cells. In one embodiment the arrays of deflector units are configured to add more sunlight falling on the solar cells only at certain times of day and not cross one sun illumination. In another embodiment the arrays of deflector units are configured to add more sunlight falling on the solar cells, which is more than one sun illumination, for example in the case of Low-concentration photovoltaic cells.

FIG. 30 shows an isometric view of a motionless optical unit 100 for redirecting sunlight according to an embodiment herein.

In an embodiment the motionless optical unit may comprise of a deflector unit 3003 connected to a surface 3005. Further, another deflector unit 3001 may be connected to the surface 3005. The position of a solar energy absorption device such as for example a solar cell may be represented by a placeholder surface 3030. A person skilled in the art may realize that the motionless optical unit may be manufactured/sold with or without a solar energy absorption device such as for example a solar cell. Both the deflector units are configured to direct sunlight towards placeholder surface 3030. The solar energy may be absorbed by a solar cell or a heat absorbing element such as fluid content, water pipe or gas pipes.

In an embodiment, the motionless optical unit may be placed such that in spite of the daytime motion of the sun maximum amount of sunlight may be allowed to be incident on the solar energy absorption device for maximum duration of time. In one embodiment the deflector unit 3003 and 3001 may be elongated in a direction other than the direction perpendicular to daytime motion of the sun. In one exemplary scenario the elongated deflector units are placed in an east-west direction. In this exemplary scenario, the elongated deflector units may be placed in a north-south direction with respect to each other. Variations allow elongated deflector units to be elongated along northeastsouthwest direction or a northwest-southeast direction.

Furthermore, the placement of the deflector unit 3001 and 3003 may be symmetrical with respect to the placeholder surface 3030. For example, the line of symmetry of the placeholder surface may be equidistant from each deflector unit. In another exemplary embodiment one deflector unit (say 3001) may be further from the center of the placeholder surface 3030 as compared to the other deflector unit (say 3003).

FIG. 31, shows the light redirection in one of the deflector unit of a motionless optical unit for redirecting sunlight according to an embodiment herein.

Each deflector unit may comprise of at least three surfaces. An input surface 3101 may be configured to have sunlight 230*p* first incident thereon. A reflector surface 3103 may be configured to allow total internal reflection of the incident sunlight 3130*p*. An output surface 202 of the deflector unit may be configured to allow the sunlight 3130*q* that is totally internally reflected incident thereupon to exit as output sunlight 2130*r*.

FIG. 32*a* shows a front view of an exemplary embodiment 1 of a motionless optical unit as per an embodiment herein. In this exemplary embodiment, the deflector unit may have a stacked triangular cross-section. The light falling on the input surface of the deflector unit undergoes TIR at the outermost surface (as in 3103) that is farthest from the solar cell and is redirected to the solar cell. In another exemplary embodiment as shown in FIG. 32*b* the deflector unit may have another polygonal cross-section (triangular cross-section being a polygonal cross-section as well). The surface of the deflector unit that is closest to the solar cell acts as the output surface. In yet another embodiment, the cross section of the deflector unit may comprise of a combination of two geometric shapes such as for example triangle and rectangular as shown in FIG. 32*c*. The light falling on the input surface of the deflector unit undergoes TIR at the reflector surface that is farthest from the solar cell and is redirected to the solar cell. A person skilled in the art may realize that circular and polygonal cross-sectional shapes may either alone or in combination with other polygonal or circular cross-sectional shapes may give rise to such cylindrical, spherical, polygonal three-dimensional deflector unit/s.

Furthermore, in one embodiment one deflector unit may be of the same cross-section as the other deflector unit. In another embodiment, the deflector units may be of different cross sections.

FIG. 33 shows an integrated solar panel of 36 cells with the motionless optical unit as per an embodiment herein. Each deflector unit may be repeated over the length thereof to form an array of elongated deflector unit. Multiple such arrays may be combined. One such example shown in FIG. 33 represents a 36-cell MFOT solar panel arrangement. In one exemplary embodiment, the orientation of the integrated solar panel may be as shown in the FIG. 33. In that embodiment, the elongated deflector units may run along east-west directions. Whereas, the deflector units may be placed in a first direction with respect to each other. For example, north-south direction with respect to each other. Variations allow elongated deflector units to be elongated along northeastsouthwest direction or a northwest-southeast direction.

The integrated solar panel 3300 may be tilted at an angle with respect to the horizontal, tilted at an optimal angle depending on the latitude of a location where the integrated solar panel is present. For example, the optimal tilt of solar panel for London may be 51.5 degrees. In one embodiment the tilt angle may not be modified throughout the year. In another embodiment seasonal changes in tilt may be allowed. The tilt may be such to allow one deflector unit be closer to the ground as compared to the other deflector unit. FIG. 34 shows a top view of a single row 3400 of an integrated solar panel containing 9 cells placed in continuous arrangement an integrated solar panel of 36 cells with the motionless optical unit as per an embodiment herein.

In one embodiment as shown in FIG. 34, an additional gap 3406 at either end of the panel may be present. As seen in the top view no solar cells may be placed in that area, however deflector unit/s (3401, 3403) may extend beyond the peripheral solar cells 3408. This gap may help accommodate the azimuth spread of the sun as it moves from East to West and a morning Winter sun or a morning Summer sun is redirected by the deflector unit to the solar cell/s present along the periphery of the integrated solar panel. Further, a prism-cell gap 3409 may be present between the cell and the next deflector unit. Various deflector units 3402 may be attached to a top glass 3404. FIG. 35 shows a front view of a motionless optical unit depicting the redirection of a summer sunlight coming from North East direction in the morning to the solar cell as per an embodiment herein Due to seasonal variation, the sunlight may be in incident from a northeast direction rather than east. As in FIG. 35, a summer sun from north-east directions falls on the reflector surface 3503 may redirect the sunlight incident thereupon using total internal reflection. The sunlight may thus get redirected to a heat/light absorbing element present at a placeholder surface 3530.

FIG. 36 shows a front view of a motionless optical unit depicting the redirection of a winter sunlight coming from South East direction in the morning to the solar cell as per an embodiment herein. During winter, the sunlight may be in incident from a south-east direction rather than east. The reflector surface 3603 may redirect the sunlight incident thereupon using total internal reflection. The sunlight may thus get redirected to a heat/light absorbing element present at a placeholder surface 3630. FIG. 37A shows a front view of a motionless optical unit having grooves in the deflector unit/s as per an embodiment herein.

A first deflector 3701 unit and a second deflector 3702 unit may be placed next to each other. While a third deflector unit 3703 may be placed right next to a fourth deflector unit 3704. The first deflector unit 3701 and the third deflector unit 3703 may be of a polygonal cross section while the second deflector unit 3702 and the fourth deflector unit 3704 may comprise of an outer surface (3702*b*, 3704*b*) and an inner surface (3702*a*, 3704*a*) respectively each. The deflector unit 3701 and 3702 may be closer to the north direction while the deflector units 3703 and 3704 may be closer to the south direction. The deflector units 3702 and 3704 being closer to the absorbing elements (in this case a solar cell) may be considered inner deflector units as compared to the deflector units 3703 and 3701, which may be regarded as outer deflector units.

The motionless optical unit may be designed to accommodate varied azimuthal angle of sunlight and may redirect the sunlight throughout the day. This arrangement may be configured to work throughout the year without any seasonal adjustments for the latitude tilt. In this exemplary embodiment, both the inner deflector units (3704, 3702) may be effective in redirection of sunlight. The motionless optical unit may be configured to ensure that one sun illumination is not crossed during the noon and is effective for early morning and late afternoon sunlight when the intensity of sunlight is less.

The inner deflector units 3702 and 3704 may have grooves on the outer surface (3702*b*, 3704*b*) and the inner surface (3702*a*, 3704*a*). These grooves may be formed in a staircase cross section. Other configurations may be possible such as curved or aspherical cross section for the grooves. Winter morning sunlight (exemplarily depicted in FIG. 37B) may be redirected by the outer surface 3702*b*. The grooves on surface 3704*a* of the south inner prism are configured to allow winter rays to pass through without significantly altering the path of the sunlight. Similarly, grooves on surface 3702*b* of the deflector unit 3702 and the deflector unit 3704 may be configured to perform TIR of the winter rays towards the absorption element (for example: solar cell). The grooves on the surface 802*a* are configured to not cause hindrance for TIR rays from surface 3702*b* by not altering its path.

Further, in case of summer season (exemplarily depicted in FIG. 37C), the sunlight from the North East direction may be redirected by the fourth deflector unit and second deflector unit 3702. The grooves on the surface 3704*b* may help in TIR of summer rays towards the solar cell and grooves on the surface 3704*a* may be configured to provide an unaltered path to the TIR rays from reaching the solar cell. The grooves on surface 3702*a* and 3702*b* of the second deflector unit may be configured to allow an unaltered path for the summer rays.

Further, an equinox sunray coming directly at 90-degree angle may be handled by the first deflector unit 3701 and third deflector unit 3703 (exemplarily depicted in FIG. 37D). The surface 3703*c* and 3701*c* are configured to enable TIR of equinox rays. In one exemplary implementation this embodiment may generate 13% more energy compared to a similar conventional solar panel annually.

In one exemplary embodiment redirection of morning sunlight of 80-100 degrees and evening sunlight of 260-280 degrees of azimuth variations and an acceptance angle of at least 30-60 degrees for the elevation angle of the sun may be provided. Further, the placement of the first, second, third and forth deflector units, may be symmetrical with respect to the placeholder surface 3730. For example, the center of the placeholder surface may be equidistant from each deflector unit. In another exemplary embodiment, one deflector unit (say 801 and 3702) may be further from the center of the placeholder surface 3730 as compared to the other two deflector unit 3703 and 3704.

The model may additively increase the efficiency of a panel in the winter by generating up to 30% more energy when compared to a standard panel of similar configuration.

According to yet another aspect of the present disclosure, a solar panel assembly for efficient management of various losses in a solar energy application and method of making the same is described. In one embodiment the losses occurred due to placement of a top glass of a solar panel assembly placed at a height H with respect to the solar cells beneath, are compensated by introduction of an extra area in the top glass panel assembly.

In one embodiment cosine losses occurred due to the elevation angle of the sunlight incident upon a solar cell are also compensated by introduction of extra area in the top glass surface. In one embodiment, this allows maintaining a "one sun illumination" requirement of the solar cell used.

The various embodiments may be provided as a standalone top glass assembly or integrated with the solar cells to form a solar panel assembly.

Reference to glass also includes references to various other materials that may be used in place of the glass such as for example Poly (methyl methacrylate), acrylic, styrene, polycarbonate, glass, NAS or derivatives of these.

FIG. 41A to 41D illustrates a front view of a solar panel assembly 4100 for efficient management of various losses in a solar cell application. As per embodiments herein the top glass 4102 may be placed at a height $g_h$ 4106 with respect to the solar cell assembly 4104.

In one embodiment herein, a top glass maybe configured to compensate losses incurred due to a given height gap 4106 by providing extra area in the top glass 4102. In various embodiments as shown in FIGS. 41B, 41C and 41D, as 4106 increases, extra area may be introduced in the top glass increasingly to compensate the loss as denoted by the location A, B, C and D respectively.

Figures 41A, 41B, 41C, 41D:
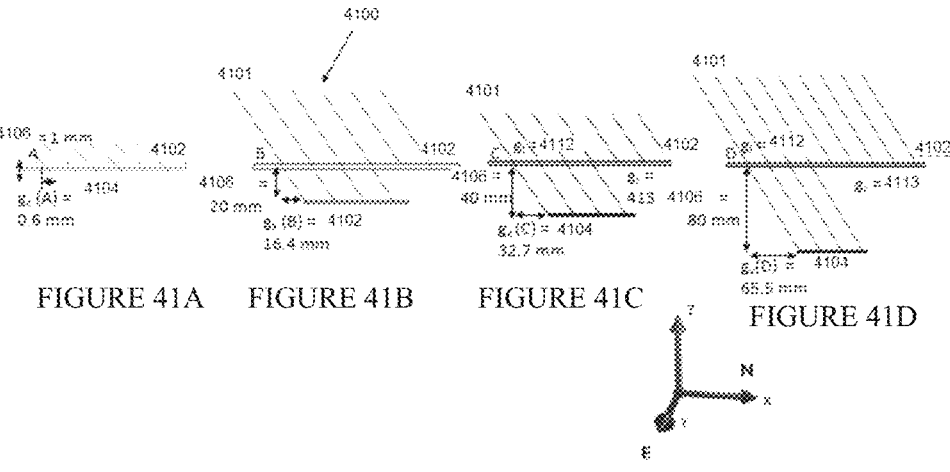

Each of the embodiment in FIG. 41B to FIG. 41D represent embodiments with a varying height 106, with FIG. 41A providing for reference height gap of 1 mm. For example, in FIG. 41A to 41D this height may be gh1, gh2, gh3, and gh4 respectively. In these exemplary embodiments the height gaps are such that gh1<gh2<gh3<gh4.

FIG. 42, shows the top view of the top glass 4202, with increased area for a single solar cell as per an embodiment herein. This may be done with increased length of the top glass denoted by (4210a and 4210b) and increased breath of the top glass denoted by (4209a and 4209b).

The area on the top glass may be increased to compensate for the loss of early morning sunlight falling on the solar cell (which occurs as a result of height gap $g_h$ increase), as seen progressively in the FIGS. 41A to 41D. As seen in the front view of FIG. 41D a loss of sunlight due to the increased height may be compensated by extending the left end of the top glass panel $g_l$ 4112 till the point D. This extension of the glass ensures that the early morning sunlight falls on the solar cell kept at a certain height gap beneath the top glass. Another noteworthy point is this extension compensates cosine losses for all elevation angle of sun >300 to 600. With increase in height the amount of extension required on the left of the top glass may follow:

$$g_x(A)<g_x(B)<g_x(C)<g_x(D).$$

Figures 42A, 42B, 42C, 42D:
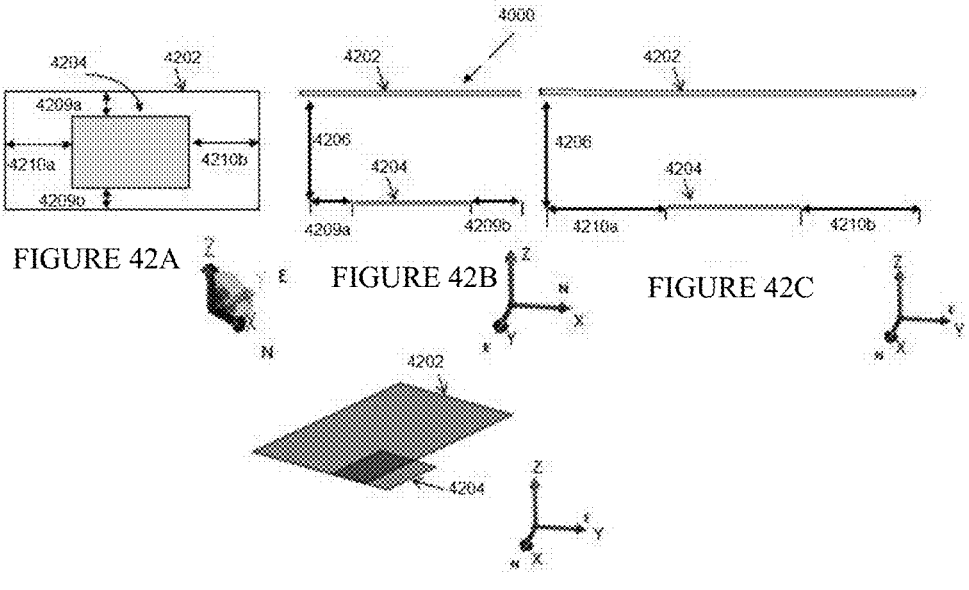

In one embodiment having a single solar cell as shown collectively in FIG. 42A and FIG. 42B, the top glass 4202 may have extra area due to increase in length on two sides of a solar cell 4204. These increased lengths are due to the increased length 4210a and the increased breadth 4210b. Further, the increased breadths are due to the increased breadth 4209a and the increased breadth 4209b. These give rise to increase in an overall area of the top glass. This increased area required for the top glass may be represented by two vector components gx 4208a and gy 4208b FIG. 43A and FIG. 43B, represents the increased top glass area in a series of 9 solar cells placed next to each other thus forming a row, as per an embodiment herein.

Figures 43A, 43B, 43C, 43D:
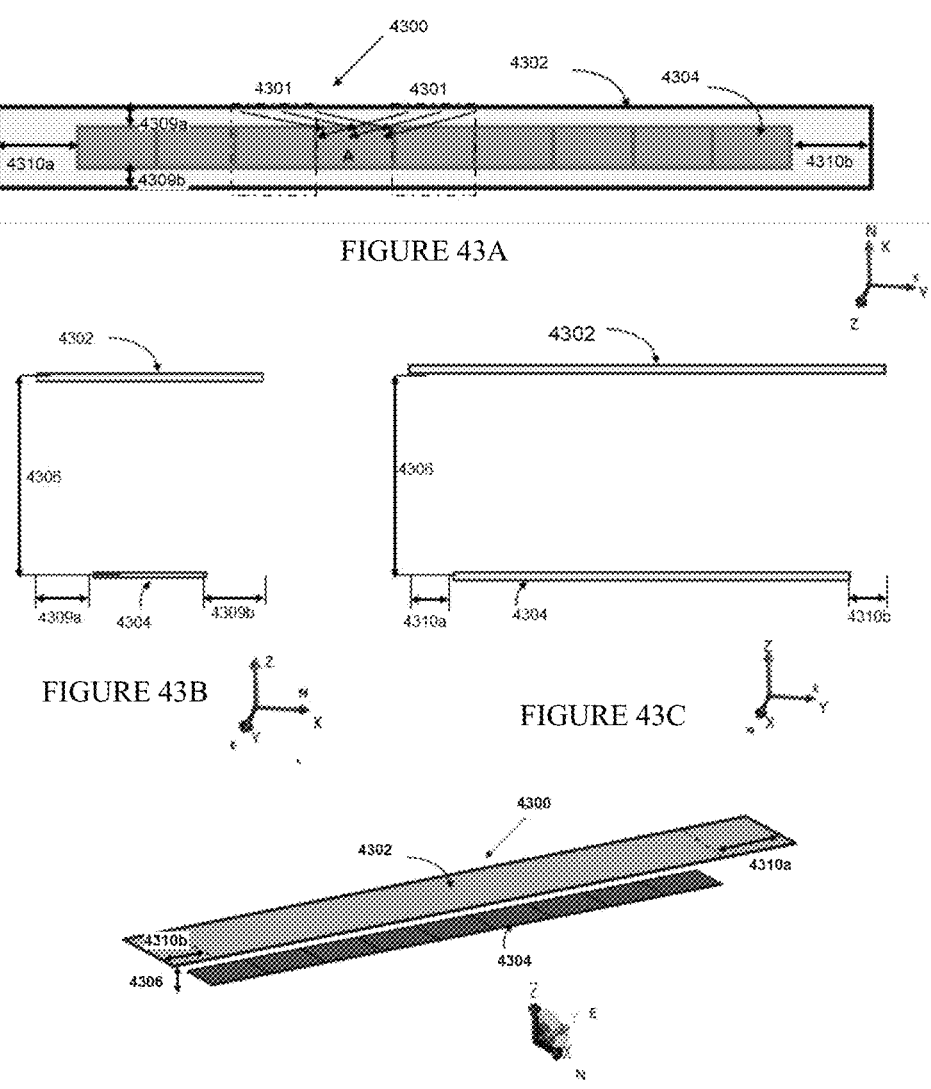
Figures 44A, 44B, 44C, 44D:
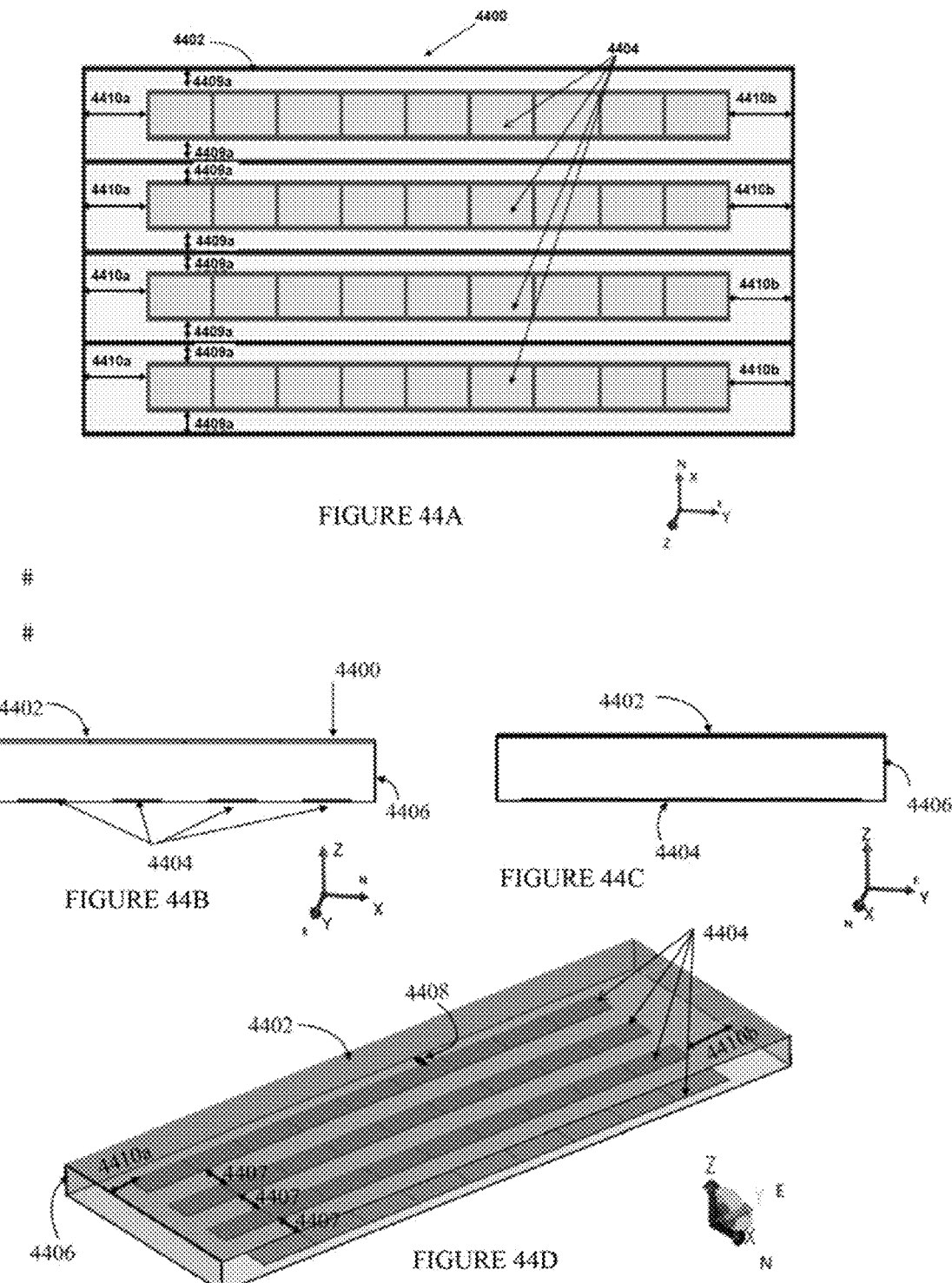

As compared to the single cell implementation shown in embodiment with reference to FIGS. 42A and 42B, 42C and 42D, this exemplary implementation shown in reference to FIGS. 43A, 43B, 43C, and 43D may be optimized by configuring each solar cell to capture the part of the sunlight being lost using increase length of top glass 4302. This embodiment provides for placement of solar cells continuously along the length of the solar cell. Since the sunlight 4301 from adjacent cells (area marked with dotted line) fall on the middle solar cell marked as A, the extra length in the y direction $g_y$ 4310a and 4310b may be provided for the boundary solar cells alone. FIG. 43A shows the top view of single row of 9 solar cells 4304 placed continuously in the E-W direction, FIG. 43B shows the front view, FIG. 43C shows the side view and FIG. 43D shows the cross-sectional view of the same model. The solar panel herein allows for matching of the baseline performance of conventional panel with $h_{gap}$=1 mm (that doesn't take any extra area). This may satisfy the one sun illumination requirement of a solar cell.

FIGS. 44A, 44B, 44C and 44D illustrates a solar panel assembly 4400 having 9 solar cells (704) by 4 row configuration as per an embodiment herein, for efficient management of various losses in a solar cell application. The extra length of the top glass 4402 needed is 4410a and 4410b, which may be provided for the boundary solar cells alone. Similarly, between two rows of solar cells there exist a gap of 2\*4409a and the boundary cells in the panel may have an increased breadth of 4409a.

A person in the field of art may realize that as shown in various embodiments here the same learning could be applied to any panel with 9, 36 or 72 solar cells. Further, this may be extended to n×m panel with a height gap of $h_{gap}$, (where n is the number of rows, m is the number of cells in a given row, cellx is the size of solar cell in X direction and $cell_y$ is the size of the solar cell in Y direction) where the interrow gap will be $2g_x$, the length of the panel in the X direction will be $n*cell_x+2g_x*n$ and the length of the panel in the Y direction will be $m*cell_y+2g_y$.

The provision of extra area explained above may be optimized since there is an extra area in the North South direction between two rows of solar cell and this area may be used to compensate the cosine losses of elevation angle which is introduced due to the increased height between solar cell and top glass.

It may be noted further that in one embodiment as shown in FIGS. 44A-D there may be no extra length (4410a, 4410b) in the East West direction between two solar cells in a given row and hence no extra area. Furthermore, there may be an extra area at the peripheral boundaries in the East West direction between the peripheral solar cell and the boundary of the panel.

The top glass may extend beyond the boundary of the solar cells placed. This may help ensures that the light redirection is uniform across all solar cells in a given row. This may further help in generating uniform current in single row of solar cells.

FIG. 45 represents a diagram helpful for explaining mathematical formulation for extra area needed for a solar panel assembly for efficient management of various losses in a solar cell application, as per an embodiment herein.

Further, FIG. 46 represents a diagram helpful for explaining mathematical formulation for extra area needed in a north-south direction for a solar panel assembly for efficient management of various losses in a solar cell application, as per an embodiment herein.

Furthermore, FIG. 47 represents a diagram helpful for explaining mathematical formulation for extra area needed in a east-west direction for a solar panel assembly for efficient management of various losses in a solar cell application, as per an embodiment herein.

The mathematical formulation for calculating extra area needed may be explained with reference to FIGS. 45, 46 and 47. As seen in FIG. 45 a sunray incident on the glass and the solar cell at a given location for a given time may be denoted by the azimuth angle ($\psi$) and elevation angle ($\theta$) (X axis represents North) falling on the top glass at A' and hitting the solar cell at point C, where h gap is the height gap between the top glass and the solar cell. If the ray A'C makes an angle of ψ and the projection of A'C on the XY plane denoted by AC also has the same azimuth angle.

In the FIG. 45, A'C represents the sunray falling on the solar cell at an angle θ (measured wrt. XY plane). For simplicity consider the point C as the system origin (0,0,0). Let us consider A' coordinate as (x, y, h) in the 3d plane. A represents the mirror of A' in the XY plane and its coordinates are (x, y, 0). We consider X direction as the North and ψ represents the azimuth angle of the sunray A'C. Let us denote φ as the angle between the projected line AC and the line BC passing through the origin. The relation between φ and ψ is as show below.

$$\phi = \Psi - 900 \tag{3}$$

FIG. 46 represents another cross-sectional view of the embodiment seen in FIG. 45, as per an embodiment herein. X may be the North from which the azimuth angle is measured for incident sunlight A'C. If AA' is h, the AC can be expressed from a basic trigonometric equation for a right angle as or $$\tan\theta = \frac{h}{AC} \text{ or} \tag{4}$$

$$AC = \frac{h}{\tan\theta}$$

If A is (x, y, 0)□B is a point on the Y axis represented as (0, y, 0). As ABC is again a right-angled triangle, $$\sin\phi = \frac{AB}{AC} \rightarrow AB = AC\sin\phi$$

Substituting Equation 4 in the above formula, we get $$AB = \frac{h}{\tan\theta}\sin\phi \tag{5}$$

FIG. 47 represents another cross-sectional view of the embodiment seen in FIG. 45, as per an embodiment herein. Similarly, or $$\cos\phi = \frac{BC}{AC} \rightarrow BC = AC\cos\phi \tag{6}$$

or $$AB = \frac{h}{\tan\theta}\cos\phi$$

Combining the equations (3), (4), (5) and (6), Y=BC and X=AB. Thus, the coordinates of the point of intersection of the sunray with the top glass at A' is $$\left(\frac{h\sin\phi}{\tan\theta}, \frac{h\cos\phi}{\tan\theta}, h\right) \tag{7}$$

And the extra area needed in the X and Y direction is $$g_x = \frac{h}{\tan\theta}\sin\phi \tag{8}$$

-continued and $$g_y = \frac{h}{\tan\theta}\cos\phi \tag{9}$$

In the above equation (8) and (9),

When ψ=maximum (For December 21st—Winter Solstice)

g_x=maximum

When ψ=minimum (For March 21st—Vernal Equinox)

g_y=maximum

Also, as h tends to 0, gx tends to 0 and gy tends to 0 and hence at 1 mm height gap there is need to give extra area to compensate for cosine loss.

This may be further understood with reference to an exemplary location, say, Singapore. FIG. 48, shows the sunpath chart that shows the variations of azimuth and elevation angle of sun throughout the year in Singapore.

As may be seen from the below chart, the maximum azimuth angle for a 30 solar elevation angle is on winter solstice December 21st at 1180 and the minimum azimuth angle for 300 solar elevation angle occurs on summer solstice January 21st at 640. This may be considered as extreme direction of sunray to be brought down to the solar cell for a height gap h_{gap}. Since the azimuth spread in Singapore is [640-1180], we may calculate the extra area needed for these range of azimuth angle.

FIG. 49A shows the extra area g_x calculation for Singapore sun on December 21st winter solstice date for a sunray (with angles θ=30° and ψ=118.2°) falling on the top glass kept at height h=80 mm above a 160 mm solar cell, as per an exemplary embodiment herein.

Applying the formula in Equation 6, we get g_x as 65.51 mm. This is the extra area needed in the North-South direction for a sunray to fall on the solar cell from a height gap of 80 mm. Now the new area needed for the top glass is (2g_x+160)=291 mm which is about 81.8% more than the original length of the top glass. Hence the length of a 36-cell solar panel (9 by 4) in the North South direction is (2g_x+80*4)=291+320=611 mm.

If we take (θ, ψ)=(40°, 123°) and considers h=80 mm. Applying the formula in Equation 8, we get gx as 36.6 mm which is less than 65.51 mm derived in the previous step for redirecting a 30°. Hence, we can say that gx=65.51 mm is enough to handle all elevation angle >30°

Applying this for various height consideration of the new panel, Table 2 here shows the increase in extra area in N-S direction of top glass for different height gap. We can conclude that the area needed is 11% more for a 10 mm height gap between the solar cell and the top glass. We can also conclude that for a solar cell size of 160 mm with every 10 mm increase in height gap, there is approximately 10% increase in extra area gx needed in the N-S direction.

TABLE 2

| Extra area needed in N-S (gx) direction for various height gap as per an embodiment herein | | |
| --- | --- | --- |
| Height gap h_{gap} between the solar cell and the top glass | Extra area g_x needed in N-S direction (in mm) | % increase in extra area g_x in N-S direction for a given solar cell size of 160 mm (2 gx)/160 |
| 10 mm | 8.8 | 11% |
| 20 mm | 16.4 | 20.5% |

TABLE 2-continued

| Extra area needed in N-S (gx) direction for various height gap as per an embodiment herein | | |
|---|---|---|
| Height gap $h_{gap}$ between the solar cell and the top glass | Extra area $g_x$ needed in N-S direction (in mm) | % increase in extra area $g_x$ in N-S direction for a given solar cell size of 160 mm (2 gx)/160 |
| 30 mm | 24.6 | 30.7% |
| 40 mm | 32.7 | 40.9% |
| 50 mm | 40.9 | 51.5% |
| 60 mm | 49.2 | 61.4% |
| 70 mm | 57.3 | 71.6% |
| 80 mm | 65.5 | 81.8% |

FIG. 49B shows the extra area $g_y$ calculation for Singapore sun on December 21st winter solstice date for a sunray (with angles θ=30° and ψ=118.2°) falling on the top glass kept at height h=80 mm above a 160 mm solar cell, as per an exemplary embodiment herein.

Applying the formula in Equation 9, we get $g_y$ as 122.12 mm. This is the extra area needed in peripheral boundary of the solar panel in the East West direction. If this area is not given, the light redirected in peripheral solar cells will not be same as the intermediate solar cells. This can lead to undesirous effect of nonuniform current and degenerate the panel performance. Hence the length of a 36-cell solar panel (9 by 4) in the East West direction is (2$g_x$+160*9)=244+1440=1684 mm.

Table 3 shows the minimum and maximum extra area $g_x$ needed in the top glass kept at different height above a 160 mm solar cell for Singapore (θ=20°, θ=30°, θ=40° and θ=60°).

TABLE 3

| Extra area needed in N-S (gx) direction for various height gap as per an embodiment herein | | | | | | | |
|---|---|---|---|---|---|---|---|
| | Maximum $g_x$ (in mm) | | | | Minimum $g_x$ (in mm) | | |
| Height gap $h_{gap}$ | Ψ = 115.6°, θ = 20° | Ψ = 118.2°, θ = 30° | Ψ = 130.3°, θ = 40° | Ψ = 146.8°, θ = 60° | Ψ = 90.2°, θ = 20° | Ψ = 90.5°, θ = 30° | Ψ = 90.8°, θ = 40° | Ψ = 91.8°, θ = 60° |
| 10 mm | 11.9 | 8.8 | 7.7 | 4.8 | 0.1 | 0.2 | 1.7 | 0.2 |
| 20 mm | 23.8 | 16.4 | 15.4 | 9.7 | 0.2 | 0.3 | 0.3 | 0.4 |
| 30 mm | 35.7 | 24. | 23.1 | 14.5 | 0.3 | 0.5 | 0.5 | 0.5 |
| 40 mm | 47.6 | 32.7 | 30.8 | 19.3 | 0.4 | 0.6 | 0.7 | 0.7 |
| 50 mm | 59.5 | 40.9 | 38.5 | 24.2 | 0.5 | 0.8 | 0.8 | 0.9 |
| 60 mm | 71.4 | 49.1 | 46.3 | 29 | 0.6 | 0.9 | 1 | 1.1 |
| 70 mm | 83.3 | 57.3 | 54 | 33.8 | 0.7 | 1.1 | 1.2 | 1.3 |
| 80 mm | 95.2 | 65.5 | 61.7 | 38.7 | 0.8 | 1.2 | 1.3 | 1.4 |

40

Table 4 shows the maximum and minimum extra area gy needed in the top glass kept at different height above a solar cell for Singapore (θ=20°, θ=30°, θ=40° and θ=60°).

TABLE 4

| Extra area needed in E-W (gy) direction for various height gap as per an embodiment herein. | | | | | | | |
|---|---|---|---|---|---|---|---|
| | Maximum $g_y$ (in mm) | | | | Minimum $g_y$ (in mm) | | |
| Height gap $h_{gap}$ | Ψ = 90.2°, θ = 20° | Ψ = 90.5°, θ = 30° | Ψ = 90.8°, θ = 40° | Ψ = 91.8°, θ = 60° | Ψ = 115.6°, θ = 20° | Ψ = 118.2°, θ = 30° | Ψ = 130.3°, θ = 40° | Ψ = 146.8°, θ = 60° |
| 10 mm | 27.5 | 17.3 | 11.9 | 5.8 | 24.8 | 15.3 | 83.9 | 5.5 |
| 20 mm | 54.9 | 34.6 | 23.8 | 11.5 | 49.6 | 30.5 | 16.8 | 10.9 |
| 30 mm | 82.4 | 52 | 35.7 | 17.3 | 74.4 | 45.8 | 25.2 | 16.4 |
| 40 mm | 109.8 | 69.3 | 47.6 | 23.1 | 99.2 | 61.1 | 33.6 | 21.9 |
| 50 mm | 137.3 | 86.6 | 59.6 | 28.9 | 124 | 76.3 | 41.9 | 27.4 |
| 60 mm | 164.7 | 103.9 | 71.5 | 34.6 | 148.8 | 91.6 | 50.4 | 32.9 |
| 70 mm | 192.2 | 121.2 | 83.4 | 40.4 | 173.6 | 106.9 | 58.7 | 38.3 |
| 80 mm | 219.6 | 138.6 | 95.3 | 46.2 | 198.4 | 122.1 | 67.1 | 43.8 |

Table 5 shows the maximum and minimum area needed for the top glass kept at different height for Singapore for various elevation angles ($\theta=20°$, $\theta=30°$, $\theta=40°$ and $\theta=60°$).

TABLE 5

| Maximum and Minimum area recommendation for various height gap as per an embodiment herein | | | | | | | | |
|---|---|---|---|---|---|---|---|---|
| | Maximum Extra Area = max $g_x$ * max $g_y$ (in mm) | | | | Minimum Extra Area = min $g_x$ * min $g_y$ (in mm) | | | |
| Height gap $h_{gap}$ | $\theta = 20°$ | $\theta = 30°$ | $\theta = 40°$ | $\theta = 60°$ | $\theta = 20°$ | $\theta = 30°$ | $\theta = 40°$ | $\theta = 60°$ |
| 10 mm | 1.3 | 1.2 | 1.2 | 1.1 | 1 | 1 | 1.2 | 1 |
| 20 mm | 1.7 | 1.5 | 1.4 | 1.3 | 1.1 | 1.1 | 1 | 1 |
| 30 mm | 2.1 | 1.7 | 1.7 | 1.4 | 1.1 | 1.1 | 1 | 1 |
| 40 mm | 2.5 | 2.0 | 1.9 | 1.5 | 1.1 | 1.1 | 1.1 | 1 |
| 50 mm | 3.0 | 2.3 | 2.1 | 1.7 | 1.2 | 1.1 | 1.1 | 1.1 |
| 60 mm | 3.4 | 2.5 | 2.4 | 1.8 | 1.2 | 1.1 | 1.1 | 1.1 |
| 70 mm | 3.9 | 2.8 | 2.6 | 1.9 | 1.3 | 1.1 | 1.1 | 1.1 |
| 80 mm | 4.4 | 3.1 | 2.9 | 2.1 | 1.3 | 1.1 | 1.1 | 1.1 |

Furthermore, just as illustrated in Table 5 if the location changes to Boston, USA, the extra area needed for a height gap of 80 mm between the solar cell and top glass can vary according to the mathematical formulation and may go upto 6 times more area to compensate for the height losses.

The present invention will now be described with the help of the following experiments:

Experiment 1

The solar panel, of the present disclosure, provided with the light redirecting prisms clamped on either sides of the solar panel, and a conventional solar panel were fitted on mounts tilted at 13 degrees recommended for a latitude tilt for Bangalore (12.9716° N, 77.5946° E). Both the solar panels had a power capacity of 8 Wp, and were manufactured from the same batch of poly-crystalline solar cells at the same manufacturing facility. The solar cells for both the solar panels had an exactly identical configuration in terms of dimensions and power generation without the prism.

On Apr. 4, 2022, power generated by the solar panels was measured. FIG. 50 illustrates a graph representation depicting the respective power generated by the solar panel of the present disclosure vs. the power generated by the conventional solar panel. The graph represents Energy generated (in Wh) against time (in hours). It was observed that the solar panel of the present disclosure generated a maximum power of about 8 Wh after a time period of 12-13 hours, whereas the maximum power generated by the conventional solar panel after the same time period of 12-13 hours was about 6.5 Wh. It can therefore be inferred from the graph that the redirecting prisms helped in increasing the power generated by the solar panel by 10-20% when compared to the conventional solar panels.

Experiment 2

In a second exemplary embodiment, an indoor lab setup was created to study the power generated by the same set of solar panels. The solar panels were exposed to a Xenon lamp vertically mounted on a wall. The solar panels were vertically mounted on a structure that could be adjusted such that the angle of incidence of light falling on the solar panels could be precisely controlled. FIGS. 51A and 51B illustrate graphical representations of the Current Vs Voltage generated by the solar panel, of the present disclosure, and the Current Vs Voltage generated by a conventional solar panel, respectively. The solar panel, of the present disclosure, generated a maximum power of 3.21 W with 4.20 A current and 0.76V voltage; whereas the conventional solar panel generated a maximum power of 2.81 W with 3.60 A current and 0.78V voltage at the maximum power. Therefore, it can be concluded, from the graphs, that the efficiency of the solar panel having redirecting prisms, in accordance with the present invention, is approximately 13% more than the conventional solar panel (without redirecting prisms).

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

Technical Advancements

The present disclosure described herein above has several technical advantages including, but not limited to, the realization of a light redirection system which includes a light redirecting prism, a redirecting prismatic wall and a solar panel incorporating the same, to provide an efficient light harvesting solar panel arrangement, which:

can capture sunlight for all seasons;
improve the energy generation of a solar panel;
allows for a wide range of operation;
is cost-effective;
has minimum human intervention requirements over seasonal variation; and
requires minimal maintenance.

The foregoing disclosure has been described with reference to the accompanying embodiments which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Throughout this specification the word "comprise", or variations such as "comprises" or "comprising", will be understood to imply the inclusion of a stated element, or group of elements, but not the exclusion of any other element, or group of elements.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A light redirecting prism having at least three elongate surfaces including:
   a. an incident surface configured to receive incident parallel rays of light;
   b. a redirecting surface configured to perform total internal reflection of the light travelling from the incident surface through a predetermined range of angles and thus redirect the light, a first angle defined between the incident surface and a transmitting surface, said first angle being in the range of 80°-100°; and
   c. said transmitting surface configured to transmit the redirected light at a predetermined angle out of said prism and to direct the light towards a solar energy absorbing device, a second angle defined between the incident surface and the redirecting surface, thus defining a third angle defined between the redirecting surface and the transmitting surface, said second angle being in the range of 45°-55°; and
   wherein, said transmitting surface includes a secondary redirecting profile provided thereon, said secondary redirecting profile spanning at least a lower part of said transmitting surface and extending up to an operative lower edge of said transmitting surface, said secondary redirecting profile provided along the length of said transmitting surface, said secondary redirecting profile being configured to redirect towards the adjacent solar energy absorbing device, that component of the redirected rays coming from said transmitting surface which would get transmitted in a shadow region of said prism or transmitted back in the air or transmitted within the prism boundary in the absence of said secondary redirecting profile, said shadow region being that region below said redirecting prism between the lower edge of the transmitting surface of said prism and the corresponding solar energy absorbing device.

2. The redirecting prism as claimed in claim 1, wherein said secondary redirecting profile comprises at least one ridge whose edge lies in a horizontal plane or a plurality of reedings or flutings having a plurality of semicylindrical protrusions or depressions respectively, with axes of said protrusions or said depressions being parallel to the axis of the transmitting surface of said prism.

3. The redirecting prism as claimed in claim 1, wherein said redirecting prism is made of a material with a refractive index of 1.51, the material being selected from the group consisting of polymethyl methacrylate, acrylic, styrene, polycarbonate, glass, styrene methyl methacrylate, polycarbonate, styrene, styrene acrylic copolymers or derivatives of these materials.

* * * * *